US 11,661,473 B2

(12) United States Patent
Tanaka et al.

(10) Patent No.: US 11,661,473 B2
(45) Date of Patent: May 30, 2023

(54) BLOCKED POLYISOCYANATE COMPOSITION AND USE THEREOF

(71) Applicant: ASAHI KASEI KABUSHIKI KAISHA, Tokyo (JP)

(72) Inventors: Eiko Tanaka, Tokyo (JP); Yuichi Miwa, Tokyo (JP); Masakazu Yamauchi, Tokyo (JP); Kie Shinomiya, Tokyo (JP)

(73) Assignee: ASAHI KASEI KABUSHIKI KAISHA, Tokyo (JP)

( * ) Notice: Subject to any disclaimer, the term of this patent is extended or adjusted under 35 U.S.C. 154(b) by 450 days.

(21) Appl. No.: 16/649,815

(22) PCT Filed: Sep. 27, 2018

(86) PCT No.: PCT/JP2018/036058
§ 371 (c)(1),
(2) Date: Mar. 23, 2020

(87) PCT Pub. No.: WO2019/065890
PCT Pub. Date: Apr. 4, 2019

(65) Prior Publication Data
US 2020/0308338 A1  Oct. 1, 2020

(30) Foreign Application Priority Data

Sep. 28, 2017 (JP) .............................. JP2017-187525
Dec. 13, 2017 (JP) .............................. JP2017-239083
Mar. 28, 2018 (JP) .............................. JP2018-062035
Aug. 20, 2018 (JP) .............................. JP2018-154117
Aug. 20, 2018 (JP) .............................. JP2018-154118
Aug. 20, 2018 (JP) .............................. JP2018-154119

(51) Int. Cl.
| | |
|---|---|
| *C08G 18/80* | (2006.01) |
| *C08G 18/28* | (2006.01) |
| *C08G 18/34* | (2006.01) |
| *C08G 18/73* | (2006.01) |
| *C08G 18/75* | (2006.01) |
| *C09D 175/04* | (2006.01) |
| *C09J 175/04* | (2006.01) |

(52) U.S. Cl.
CPC ....... *C08G 18/8045* (2013.01); *C08G 18/282* (2013.01); *C08G 18/348* (2013.01); *C08G 18/73* (2013.01); *C08G 18/755* (2013.01); *C09D 175/04* (2013.01); *C09J 175/04* (2013.01)

(58) Field of Classification Search
CPC ....................................................... C08G 18/80
See application file for complete search history.

(56) References Cited

U.S. PATENT DOCUMENTS

| | | | |
|---|---|---|---|
| 4,068,086 A | 1/1978 | Dalibor | |
| 4,132,843 A | 1/1979 | Dalibor | |
| 4,345,057 A | 8/1982 | Yamabe et al. | |
| 4,640,966 A | 2/1987 | Mitani et al. | |
| 5,239,028 A | 8/1993 | Nakagawa et al. | |
| 5,621,063 A | 4/1997 | Wolf et al. | |
| 6,274,693 B1 | 8/2001 | Poth et al. | |
| 10,604,673 B2 * | 3/2020 | Takeno | C08G 18/73 |
| 2002/0165335 A1 | 11/2002 | Kobata et al. | |
| 2006/0276611 A1 | 12/2006 | Katamura et al. | |
| 2012/0189832 A1 | 7/2012 | Kawasaki et al. | |
| 2012/0316291 A1 | 12/2012 | Yamauchi et al. | |
| 2015/0056376 A1 | 2/2015 | Ishikura et al. | |
| 2018/0282574 A1 | 10/2018 | Takeno et al. | |

FOREIGN PATENT DOCUMENTS

| | | |
|---|---|---|
| GB | 1 523 103 | 8/1978 |
| JP | 51-118721 | 10/1976 |
| JP | 52-116417 | 9/1977 |
| JP | 52-116447 | 9/1977 |
| JP | 52-116448 | 9/1977 |
| JP | 57-034107 | 2/1982 |
| JP | 61-275311 | 12/1986 |
| JP | 01-261409 | 10/1989 |
| JP | 03-006273 | 1/1991 |
| JP | 08-319332 | 12/1996 |
| JP | 2001-521956 | 11/2001 |
| JP | 2002-153806 | 5/2002 |
| JP | 2002-322238 | 11/2002 |
| JP | 2006-335954 | 12/2006 |
| JP | 2007-253512 | 10/2007 |
| JP | 2011-256217 | 12/2011 |
| JP | 2014-070151 A | 4/2014 |
| JP | 2017-052917 | 3/2017 |

(Continued)

OTHER PUBLICATIONS

European Search Report, EPO, Application No. 18862486.0, dated Oct. 22, 2020.
ISR issued in International Patent Application No. PCT/JP2018/036058, dated Dec. 25, 2018, English translation.
Written Opinion issued in International Patent Application No. PCT/JP2018/036058, dated Dec. 25, 2018, English translation.
IPRP issued in International Patent Application No. PCT/JP2018/036058, dated Mar. 31, 2020, English translation.
JP Office Action issued in JP Patent Application No. 2019-545631, dated Jul. 21, 2020, English translation.

*Primary Examiner* — Michael M Dollinger
(74) *Attorney, Agent, or Firm* — Greenblum & Bernstein, P.L.C.

(57) ABSTRACT

A blocked polyisocyanate composition containing a blocked polyisocyanate obtained from a polyisocyanate and at least one blocking agent, wherein the blocking agent contains a compound represented by general formula (I) shown below, and the amount of methane tetracarbonyl structures represented by general formula (II) shown below, relative to the total molar amount within the blocked polyisocyanate of bonded structures in which the compound represented by general formula (I) is bonded to the polyisocyanate, is at least 0.5 mol % but not more than 10 mol %.

28 Claims, No Drawings

(56) References Cited

FOREIGN PATENT DOCUMENTS

| JP | 2017-95533 | 6/2017 | |
|----|------------|--------|---|
| WO | 2011/016311 | 2/2011 | |
| WO | 2011/037033 | 3/2011 | |
| WO | 2011/096559 | 8/2011 | |
| WO | 2013/151143 | 10/2013 | |
| WO | WO-2017043646 A1 * | 3/2017 | ........... C08G 18/022 |

* cited by examiner

BLOCKED POLYISOCYANATE COMPOSITION AND USE THEREOF

TECHNICAL FIELD

The present invention relates to a blocked polyisocyanate composition and use of that blocked polyisocyanate composition. Specifically, the present invention relates to a blocked polyisocyanate composition, a coating material composition, a coating film, an article, an adhesive composition, an easy adhesion treated laminate, a multilayer coating film laminate, and a method for forming a coating film. Priority is claimed on Japanese Patent Application No. 2017-187525, filed Sep. 28, 2017, Japanese Patent Application No. 2017-239083, filed Dec. 13, 2017, Japanese Patent Application No. 2018-062035, filed Mar. 28, 2018, and Japanese Patent Application No. 2018-154117, Japanese Patent Application No. 2018-154118 and Japanese Patent Application No. 2018-154119, filed Aug. 20, 2018, the contents of which are incorporated herein by reference.

BACKGROUND ART

Conventionally, polyurethane resin coating materials have exhibited extremely superior levels of abrasion resistance, chemical resistance and stain resistance. In particular, polyurethane resin coating materials that use a polyisocyanate obtained from an aliphatic diisocyanate and an alicyclic diisocyanate also exhibit excellent weather resistance, and the demand for such coating materials continues to increase.

However, polyurethane resin coating materials are generally two-component systems, and therefore use of these coating materials has been very inconvenient. In other words, typical polyurethane coating materials are composed of two components: a polyol and a polyisocyanate, and the polyol and the polyisocyanate must be stored separately and then mixed together at the time of application. Further, once the two components have been mixed, the coating material gels within a short period of time, and can become difficult to use. Because polyurethane resin coating materials have these types of issues, use of these coating materials in automatic coating processes in fields in which line coating is performed, such as vehicle coating and weak electrocoating, has proven extremely difficult.

Further, because isocyanates react readily with water, use of isocyanates in water-based coating materials such as electrodeposition coating materials is impossible. Moreover, when a coating material containing an isocyanate is used, because the coating apparatus and coating tank must be washed thoroughly following completion of the coating operation, the operational efficiency deteriorates significantly.

In order to ameliorate the issues described above, conventionally, the use of blocked polyisocyanates in which the active isocyanate groups are all blocked with a blocking agent has been proposed. These blocked polyisocyanates do not react with polyols at normal temperatures. However, under heating, the blocking agent dissociates, and the active isocyanate groups are regenerated and can react with the polyol via a crosslinking reaction, meaning the issues described above can be addressed. Accordingly, numerous blocking agents continue to be investigated, with representative examples of these blocking agents including phenol and methyl ethyl ketoxime.

However, when blocked polyisocyanates that use these blocking agents are used, a high baking temperature of at least 140° C. is generally required. This requirement for baking at high temperature is not only disadvantageous from an energy perspective, but also requires that the substrate has heat resistance, meaning there are limits to the potential applications. Furthermore, in multilayer coating film formation, in which a plurality of coating films are laminated following drying at low temperature for a short period of time, layer mixing and the like tend to be problematic.

On the other hand, blocked polyisocyanates that use an active methylene compound such as an acetoacetate ester or a malonic acid diester are being researched as potential low-temperature baking blocked polyisocyanates. For example, Patent Documents 1 and 2 propose blocked polyisocyanate compositions that can be cured at 90° C. Further, Patent Documents 3 and 4 disclose coating material compositions containing blocked isocyanates using an active methylene compound, which are able to be cured at comparatively low temperatures.

In recent years, blocked polyisocyanate compositions have become widely used as crosslinking agent components for adhesive compositions in various industrial fields including automobiles, construction materials, household electrical appliances and carpentry.

On the other hand, films and plates of various materials are now widely used to impart a variety of different functions as optical members for the liquid crystal displays in televisions, computers, digital cameras and mobile phones. Furthermore, among these films, polyester films exhibit excellent transparency, dimensional stability and chemical resistance, and are also comparatively inexpensive, and have therefore become widely used.

The polyester films used in the optical members described above have a functional layer corresponding with any of various potential applications laminated on top of the polyester film to form the optical member, and therefore easy adhesion with various functional layers is required. Examples of methods used to ensure this easy adhesion include methods in which a coating layer containing any of various resins such as a polyester, an acrylic or a polyurethane as the main component is provided on the surface of the polyester film.

From the viewpoint of the usage environment for the final product, maintenance of superior adhesive properties even under conditions of high temperature and high humidity is now being demanded. As a result, easy adhesion treated polyester films in which a crosslinking agent such as melamine, an oxazoline compound or an oxime-blocked polyisocyanate has been added to a coating liquid for the purpose of improving the adhesion following a humidity and heat resistance test are now being developed (for example, see Patent Documents 5 to 7).

However, in recent years, from the viewpoints of global environmental protection and improving productivity, a shortening of the production process for easy adhesion treated polyester films would be desirable. However, if the heat treatment step used in forming the easy adhesion treated layer is shortened, satisfactory initial adhesion and satisfactory adhesion following a humidity and heat resistance test can sometimes not be achieved. Accordingly, even in the case of a shortened heat treatment step, an adhesive that still exhibits both superior initial adhesion to all manner of adherends and superior adhesion following a humidity and heat resistance test would be very desirable.

PRIOR ART LITERATURE

Patent Documents

Patent Document 1: Japanese Unexamined Patent Application, First Publication No. 2002-322238

Patent Document 2: Japanese Unexamined Patent Application, First Publication No. 2006-335954

Patent Document 3: Japanese Unexamined Patent Application, First Publication No. 2002-153806

Patent Document 4: International Patent Application WO 2013/151143

Patent Document 5: Japanese Unexamined Patent Application, First Publication No. 2007-253512

Patent Document 6: International Patent Application WO 2011/016311

Patent Document 7: International Patent Application WO 2011/037033

Patent Document 8: Japanese Unexamined Patent Application, First Publication No. Sho 57-034107

Patent Document 9: Japanese Unexamined Patent Application, First Publication No. Sho 61-275311

Patent Document 10: Japanese Unexamined Patent Application, First Publication No. Hei 01-261409

Patent Document 11: Japanese Unexamined Patent Application, First Publication No. Hei 03-006273

SUMMARY OF INVENTION

Problems to be Solved by the Invention

However, in recent years, from the viewpoint of reducing the level of carbon dioxide emissions, and the fact that adaptability to plastics having low heat resistance is now being required, a one-component curable coating material composition that cures at a temperature lower than 90° C., and also exhibits excellent storage stability is keenly sought.

The present invention has been developed in light of the above circumstances, and provides a blocked polyisocyanate composition that exhibits superior viscosity stability when used as a coating material, as well as excellent low-temperature curability, hardness retention and water resistance when used as a coating film. Further, the present invention also provides a coating material composition, a coating film and an article that use the blocked polyisocyanate composition.

Further, in light of the above circumstances, the present invention also provides an adhesive composition having excellent initial adhesion to adherends and excellent adhesion following a humidity and heat resistance test, as well as an easy adhesion treated laminate, which contains an easy adhesion treated layer formed from the adhesive composition, and exhibits excellent initial adhesion to adherends and excellent adhesion following a humidity and heat resistance test.

Furthermore, the present invention also provides methods for forming a multilayer coating film laminate and a coating film which enable curing to be performed at low temperature, and yield excellent coating film external appearance, adhesion and water resistance.

Means for Solving the Problems

In other words, the present invention includes the following aspects.

A blocked polyisocyanate composition according to a first aspect of the present invention contains a blocked polyisocyanate obtained from a polyisocyanate and at least one blocking agent, wherein the blocking agent contains a compound represented by general formula (I) shown below, and the amount of methane tetracarbonyl structures represented by general formula (II) shown below, relative to the total molar amount within the blocked polyisocyanate of bonded structures in which the compound represented by general formula (I) is bonded to the polyisocyanate, is at least 0.5 mol % but not more than 10 mol %.

[Chemical formula 1]

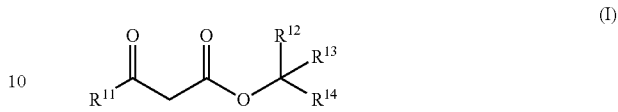

(I)

(In general formula (I), $R^{11}$ represents a hydroxyl group; an alkyl group which may contain at least one substituent selected from the group consisting of a hydroxyl group and an amino group; an amino group which may contain at least one substituent selected from the group consisting of a hydroxyl group and an alkyl group; an aryl group which may contain at least one substituent selected from the group consisting of a hydroxyl group and an amino group; or an alkoxy group which may contain at least one substituent selected from the group consisting of a hydroxyl group and an amino group. In the amino group, two of the substituents may be linked together to form a ring.

Each of $R^{12}$, $R^{13}$ and $R^{14}$ independently represents a hydrogen atom; a hydroxyl group; an alkyl group which may contain at least one substituent selected from the group consisting of a hydroxyl group and an amino group: an amino group which may contain at least one substituent selected from the group consisting of a hydroxyl group and an alkyl group; an aryl group which may contain at least one substituent selected from the group consisting of a hydroxyl group and an amino group; or an alkoxy group which may contain at least one substituent selected from the group consisting of a hydroxyl group and an amino group. In the amino group, two of the substituents may be linked together to form a ring. However, structures in which two or more of $R^{12}$, $R^{13}$ and $R^{14}$ represent hydrogen atoms are excluded.)

[Chemical formula 2]

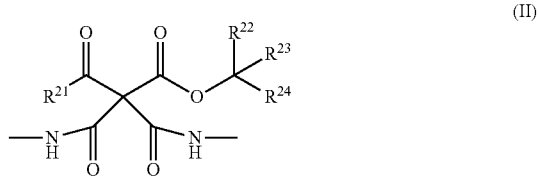

(II)

(In general formula (II), $R^{21}$ represents a hydroxyl group: an alkyl group which may contain at least one substituent selected from the group consisting of a hydroxyl group and an amino group: an amino group which may contain at least one substituent selected from the group consisting of a hydroxyl group and an alkyl group: an aryl group which may contain at least one substituent selected from the group consisting of a hydroxyl group and an amino group; or an alkoxy group which may contain at least one substituent selected from the group consisting of a hydroxyl group and an amino group. In the amino group, two of the substituents may be linked together to form a ring.

Each of $R^{22}$, $R^{23}$ and $R^{24}$ independently represents a hydrogen atom: a hydroxyl group: an alkyl group which may contain at least one substituent selected from the group consisting of a hydroxyl group and an amino group; an amino group which may contain at least one substituent selected from the group consisting of a hydroxyl group and an alkyl group: an aryl group which may contain at least one substituent selected from the group consisting of a hydroxyl group and an amino group: or an alkoxy group which may contain at least one substituent selected from the group consisting of a hydroxyl group and an amino group. In the amino group, two of the substituents may be linked together to form a ring. However, structures in which two or more of $R^{22}$, $R^{23}$ and $R^{24}$ represent hydrogen atoms are excluded.)

In the blocked polyisocyanate composition according to the first aspect described above, the amount of methane tetracarbonyl structures represented by general formula (II) shown above, relative to the total molar amount within the blocked polyisocyanate of bonded structures in which the compound represented by general formula (I) shown above is bonded to the polyisocyanate, may be at least 0.5 mol % but not more than 8 mol %.

In the blocked polyisocyanate composition according to the first aspect described above, the amount of methane tetracarbonyl structures represented by general formula (II) shown above, relative to the total molar amount within the blocked polyisocyanate of bonded structures in which the compound represented by general formula (I) shown above is bonded to the polyisocyanate, may be at least 0.5 mol % but not more than 6 mol %.

In the blocked polyisocyanate composition according to the first aspect described above, each of $R^{12}$, $R^{13}$ and $R^{14}$ may independently represent a hydrogen atom; an alkyl group which may contain at least one substituent selected from the group consisting of a hydroxyl group and an amino group; or an aryl group which may contain at least one substituent selected from the group consisting of a hydroxyl group and an amino group; provided that structures in which two or more of $R^{12}$, $R^{13}$ and $R^{14}$ represent hydrogen atoms are excluded.

In the blocked polyisocyanate composition according to the first aspect described above, $R^{11}$ may be an alkoxy group, $R^{12}$ may be a hydrogen atom or an alkyl group, and $R^{13}$ and $R^{14}$ may be alkyl groups.

In the blocked polyisocyanate composition according to the first aspect described above, the amount of the compound represented by general formula (I), relative to the total molar amount of the blocking agent, may be at least 80 mol % but not more than 100 mol %.

In the blocked polyisocyanate composition according to the first aspect described above, the blocked polyisocyanate may contain a blocked isocyanurate trimer, and the amount of the blocked isocyanurate trimer, relative to the solid fraction amount of the blocked polyisocyanate composition, may be at least 10% by mass.

In the blocked polyisocyanate composition according to the first aspect described above, the blocked polyisocyanate may contain an allophanate group and at least one functional group selected from the group consisting of an uretdione group, an iminooxadiazinedione group, an isocyanurate group, a urethane group and a biuret group, and if the molar amounts of allophanate groups, uretdione groups, iminooxadiazinedione groups, isocyanurate groups, urethane groups and biurets groups are labelled a, b, c, d, e and f respectively, then the value of a/(a+b+c+d+e+f) may be 0.05 or greater.

In the blocked polyisocyanate composition according to the first aspect described above, a portion of, or all of, the blocked polyisocyanate may contain a structural unit derived from a hydrophilic compound.

In the blocked polyisocyanate composition according to the first aspect described above, the hydrophilic compound may contain at least one group selected from the group consisting of nonionic hydrophilic groups and anionic hydrophilic groups.

The blocked polyisocyanate composition according to the first aspect described above may also contain an active hydrogen group-containing compound.

In the blocked polyisocyanate composition according to the first aspect described above, the active hydrogen group-containing compound may contain a monoalcohol.

In the blocked polyisocyanate composition according to the first aspect described above, the monoalcohol may be a secondary monoalcohol.

In the blocked polyisocyanate composition according to the first aspect described above, the monoalcohol may be 2-propanol or isobutyl alcohol.

In the blocked polyisocyanate composition according to the first aspect described above, the molar amount of the active hydrogen group-containing compound, relative to the total molar amount of blocked isocyanate groups in the blocked polyisocyanate composition, may be at least 10 mol % but not more than 1,000 mol %.

In the blocked polyisocyanate composition according to the first aspect described above, the molar amount of the active hydrogen group-containing compound, relative to the total molar amount of blocked isocyanate groups in the blocked polyisocyanate composition, may be at least 50 mol % but not more than 800 mol %.

In the blocked polyisocyanate composition according to the first aspect described above, the polyisocyanate may be a polyisocyanate obtained from at least one diisocyanate selected from the group consisting of aliphatic diisocyanates and alicyclic diisocyanates.

In the blocked polyisocyanate composition according to the first aspect described above, the diisocyanate may contain hexamethylene diisocyanate.

In the blocked polyisocyanate composition according to the first aspect described above, the average number of isocyanate groups in the polyisocyanate may be at least 3.3.

A coating material composition according to a second aspect of the present invention contains the blocked polyisocyanate composition according to the first aspect described above, and a polyhydric hydroxy compound.

A coating film according to a third aspect of the present invention is obtained by curing the coating material composition according to the second aspect described above.

A method for forming a coating film according to a fourth aspect of the present invention involves curing the coating material composition according to the second aspect described above by heating at a temperature of 80° C. or lower.

An article according to a fifth aspect of the present invention contains a resin substrate having a melting point of not more than 120° C., and a coating film obtained by curing the coating material composition according to the second aspect described above on top of the resin substrate.

An adhesive composition according to a sixth aspect of the present invention contains the blocked polyisocyanate composition according to the first aspect described above.

An easy adhesion treated laminate according to a seventh aspect of the present invention contains an adherend, and an easy adhesion treated layer obtained by applying the adhesive composition according to the sixth aspect described above to the adherend.

In the easy adhesion treated laminate according to the seventh aspect described above, the adherend may be a film or a plate.

A multilayer coating film laminate according to an eighth aspect of the present invention is obtained by laminating a plurality of coating films to a substrate, wherein among the plurality of coating films, at least one coating film is obtained by curing a water-based coating material composition containing the blocked polyisocyanate composition according to the first aspect described above.

A method for forming a coating film according to a ninth aspect of the present invention involves forming a coating film by applying a water-based coating material composition containing the blocked polyisocyanate composition according to the first aspect described above to a substrate.

Effects of the Invention

A blocked polyisocyanate composition of an aspect described above is able to provide a blocked polyisocyanate composition that exhibits superior viscosity stability when used as a coating material, as well as excellent low-temperature curability, hardness retention and water resistance when used as a coating film. A coating material composition of an aspect described above contains the blocked polyisocyanate composition, has excellent viscosity stability, and yields a coating film low-temperature curability, hardness retention and water resistance. A coating film of an aspect described above contains the coating material composition, and exhibits excellent low-temperature curability, hardness retention and water resistance. A method for forming a coating film of an aspect described above yields a coating film having excellent low-temperature curability, hardness retention and water resistance. An article of an aspect described above contains the coating film, and exhibits excellent low-temperature curability and excellent adhesion between the substrate and the coating film.

An adhesive composition of an aspect described above is able to provide an adhesive composition having excellent initial adhesion to adherends and excellent adhesion following a humidity and heat resistance test. An easy adhesion treated laminate of an aspect described above is able to provide an easy adhesion treated laminate which contains an easy adhesion treated layer formed from the adhesive composition, and exhibits excellent initial adhesion to adherends and excellent adhesion following a humidity and heat resistance test.

Methods for forming a multilayer coating film laminate and a coating film according to aspects described above are able to provide a multilayer coating film laminate that can be cured at low temperature and exhibits excellent coating film external appearance, adhesion and water resistance.

EMBODIMENTS FOR CARRYING OUT THE INVENTION

Embodiments for implementing the present invention (hereafter referred to as embodiments of the present invention) are described below in detail. However, the present invention is not limited by the embodiments described below. The present invention may also be implemented with appropriate modifications that fall within the scope of the invention.

In this description, a "polyol" means a compound having two or more hydroxyl groups (—OH).

In this description, a "polyisocyanate" means a reaction product obtained by bonding together a plurality of a monomer compounds having at least one isocyanate group (—NCO).

<<Blocked Polyisocyanate Composition>>

A blocked polyisocyanate composition of an embodiment of the present invention contains a blocked polyisocyanate obtained from a polyisocyanate and at least one blocking agent. Further, the blocking agent contains a compound represented by general formula (I) shown below (hereafter sometimes referred to as the "compound (I)")

[Chemical formula 3]

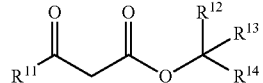

(I)

(In general formula (I), $R^{11}$ represents a hydroxyl group: an alkyl group which may contain at least one substituent selected from the group consisting of a hydroxyl group and an amino group; an amino group which may contain at least one substituent selected from the group consisting of a hydroxyl group and an alkyl group; an aryl group which may contain at least one substituent selected from the group consisting of a hydroxyl group and an amino group; or an alkoxy group which may contain at least one substituent selected from the group consisting of a hydroxyl group and an amino group. In the amino group, two of the substituents may be linked together to form a ring.

Each of $R^{12}$, $R^{13}$ and $R^{14}$ independently represents a hydrogen atom; a hydroxyl group; an alkyl group which may contain at least one substituent selected from the group consisting of a hydroxyl group and an amino group; an amino group which may contain at least one substituent selected from the group consisting of a hydroxyl group and an alkyl group; an aryl group which may contain at least one substituent selected from the group consisting of a hydroxyl group and an amino group; or an alkoxy group which may contain at least one substituent selected from the group consisting of a hydroxyl group and an amino group. In the amino group, two of the substituents may be linked together to form a ring. However, structures in which two or more of $R^{12}$, $R^{13}$ and $R^{14}$ represent hydrogen atoms are excluded.)

By adopting the structure described above, the blocked polyisocyanate composition of this embodiment of the present invention is able to produce a coating film having excellent low-temperature curability even at low temperatures of 80° C. or lower. Further, the blocked polyisocyanate composition of this embodiment exhibits superior viscosity stability when used as a coating material, as well as excellent hardness retention and water resistance when used as a coating film.

The physical properties and constituent components of the blocked polyisocyanate composition of this embodiment are described below in further detail.

<Constituent Components>
[Blocked Polyisocyanate]

The blocked polyisocyanate contained in the blocked polyisocyanate composition of this embodiment is a reaction product of a polyisocyanate and at least one blocking agent, and is a compound in which the isocyanate groups of the polyisocyanate have been blocked with one or more blocking agents including the compound (I).

In the blocked polyisocyanate, the bonded structures formed by the reaction between the isocyanate groups of the polyisocyanate and the compound (I) preferably include, for example, methane tetracarbonyl structures represented by general formula (II) shown below, keto forms of methane tricarbonyl structures represented by general formula (III) shown below, enol forms of methane tricarbonyl structures represented by general formula (IV) shown below, and enol forms of methane tricarbonyl structures represented by general formula (V) shown below.

[Chemical formula 4]

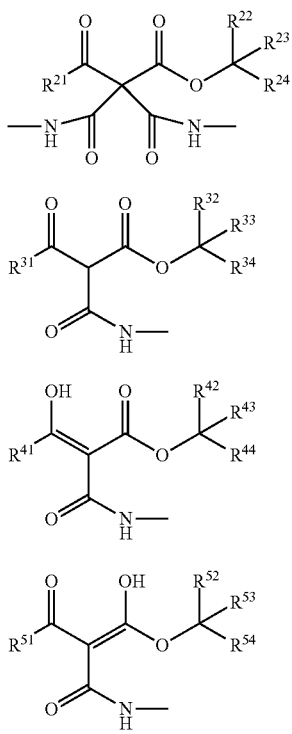

(In general formula (II), $R^{21}$, $R^{22}$, $R^{23}$ and $R^{24}$ are the same as $R^{11}$, $R^{12}$, $R^{13}$ and $R^{14}$ respectively described above.

In general formula (III), $R^{31}$, $R^{32}$, $R^{33}$ and $R^{34}$ are the same as $R^{11}$, $R^{12}$, $R^{13}$ and $R^{14}$ respectively described above.

In general formula (IV). $R^{41}$, $R^{42}$, $R^{43}$ and $R^{44}$ are the same as $R^{11}$, $R^{12}$, $R^{13}$ and $R^{14}$ respectively described above.

In general formula (V), $R^{51}$, $R^{52}$, $R^{53}$ and $R^{54}$ are the same as $R^{11}$, $R^{12}$, $R^{13}$ and $R^{14}$ respectively described above.)

The amount of methane tetracarbonyl structures represented by the above general formula (II), relative to the total molar amount of bonded structures in which the compound (I) is bonded to the polyisocyanate, is preferably at least 0.5 mol % but not more than 10 mol %, more preferably at least 0.5 mol % but not more than 8 mol %, even more preferably at least 0.5 mol % but not more than 6 mol %, particularly preferably at least 1 mol % but not more than 5 mol %, still more preferably at least 2 mol % but not more than 4 mol %, and most preferably at least 2.7 mol % but not more than 3.6 mol %.

By ensuring that the amount of methane tetracarbonyl structures is at least as large as the above lower limit, the low-temperature curability when used as a coating film can be further improved. On the other hand, by ensuring that the amount of methane tetracarbonyl structures is not more than the above upper limit, the storage stability (viscosity stability) when used as a coating material composition and the hardness retention when used as a coating film can be further improved.

Further, by ensuring that the amount of methane tetracarbonyl structures is at least as large as the above lower limit, the adhesion to adherends and the adhesion following a humidity and heat resistance test of an adhesive composition that uses the blocked polyisocyanate composition of this embodiment can be further improved. On the other hand, by ensuring that the amount of methane tetracarbonyl structures is not more than the above upper limit, the storage stability (water dispersion stability, viscosity stability and hardness retention) of an adhesive composition that uses the blocked polyisocyanate composition of this embodiment can be further improved.

Furthermore, by ensuring that the amount of methane tetracarbonyl structures is at least as large as the above lower limit, the low-temperature curability of a coating film in a multilayer coating film laminate can be further improved. On the other hand, by ensuring that the amount of methane tetracarbonyl structures is not more than the above upper limit, the storage stability (viscosity stability) of a water-based coating material composition used in the multilayer coating film laminate, and the hardness retention of the coating film in the multilayer coating film laminate can be further improved.

The amount of methane tetracarbonyl structures can be measured using the method described below in the examples.

In the blocked polyisocyanate composition, a portion of, or all of, the blocked polyisocyanate may contain a structural unit derived from a hydrophilic compound. In other words, a portion of, or all of, the blocked polyisocyanate contained in the blocked polyisocyanate composition may be a hydrophilic blocked polyisocyanate. A hydrophilic blocked polyisocyanate is a reaction product of a polyisocyanate, a hydrophilic compound and a blocking agent. The hydrophilic blocked polyisocyanate is a compound in which the hydrophilic compound is bonded to the polyisocyanate via a urethane linkage, and at least a portion of the isocyanate groups in the polyisocyanate have been blocked with the blocking agent. Including a hydrophilic blocked polyisocyanate in the blocked polyisocyanate composition yields superior water dispersibility. Accordingly, in those cases where all of the blocked polyisocyanate contained in the blocked polyisocyanate composition is a hydrophilic blocked polyisocyanate, the blocked polyisocyanate composition can be used favorably as a curing agent for a coating material composition having an aqueous base (hereafter abbreviated as a "water-based coating material composition").

The blocked polyisocyanate may contain at least one functional group selected from the group consisting of an allophanate group, an uretdione group, an iminooxadiazinedione group, an isocyanurate group, a urethane group and a biuret group. Among the various possibilities, in terms of achieving superior weather resistance, the blocked polyisocyanate preferably contains an isocyanurate group. Further, in terms of achieving superior storage stability (viscosity stability) when used as a coating material composition, achieving superior hardness retention and excellent compatibility with polyhydric hydroxy compounds when used as a coating film, achieving superior storage stability (water dispersion stability, viscosity stability and hardness retention) and excellent compatibility with binder resin components such as polycarbonate resins when used as an adhesive composition, and achieving superior storage stability (viscosity stability) of a water-based coating material composition used in a multilayer coating film laminate, and excellent hardness retention and superior compatibility with polyhydric hydroxy compounds for a coating film within the multilayer coating film laminate, the blocked polyisocyanate preferably contains an allophanate group.

Furthermore, if the molar amounts of allophanate groups, uretdione groups, iminooxadiazinedione groups, isocyanurate groups, urethane groups and biuret groups are labelled a, b, c, d, e and f respectively, then the value of $a/(a+b+c+d+e+f)$, which represents the ratio of the molar amount of allophanate groups relative to the total molar amount of allophanate groups, uretdione groups, iminooxadiazinedione groups, isocyanurate groups, urethane groups and biuret groups, is preferably 0.05 or greater, more preferably at least 0.05 but not more than 0.75, more preferably at least 0.07 but not more than 0.5, and particularly preferably at least 0.1 but not more than 0.35.

The value of $a/(a+b+c+d+e+f)$ can be measured using the method described below in the examples.

In general, an "allophanate group" is a functional group formed by reacting the hydroxyl group of an alcohol and an isocyanate group, and is represented by formula (VII) shown below.

In general, an "uretdione group" is a functional group formed by reacting two isocyanate groups, and is represented by formula (VIII) shown below.

In general, an "iminooxadiazinedione group" is a functional group formed by reacting three isocyanate groups, and is represented by formula (IX) shown below.

In general, an "isocyanurate group" is a functional group formed by reacting three isocyanate groups, and is represented by formula (X) shown below.

In general, a "urethane group" is a functional group formed by reacting one isocyanate group and one hydroxyl group, and is represented by formula (XI) shown below.

In general, a "biuret group" is a functional group formed by reacting three isocyanate groups and a biuretizing agent, and is represented by formula (XII) shown below.

[Chemical formula 5]

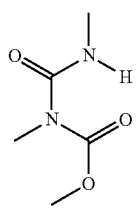
(VII)

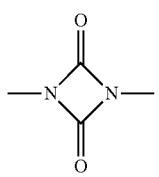
(VIII)

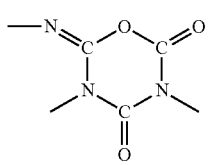
(IX)

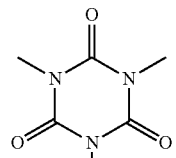
(X)

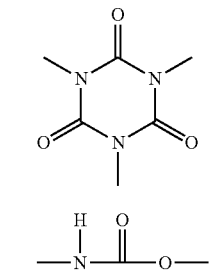
(XI)

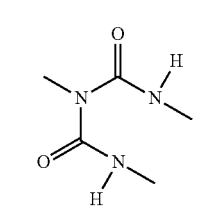
(XII)

The blocked polyisocyanate contained in the blocked polyisocyanate composition of this embodiment preferably contains a blocked isocyanurate trimer.

An "isocyanurate trimer" means a polyisocyanate having isocyanurate groups, which is derived from three isocyanate monomer molecules. Further, a "blocked isocyanurate trimer" means a compound in which at least a portion (and preferably all) of the isocyanate groups in the isocyanurate trimer have been blocked with a blocking agent.

The amount of the blocked isocyanurate trimer, relative to the solid fraction amount of the blocked polyisocyanate, is preferably at least 10% by mass, more preferably at least 12% by mass but not more than 50% by mass, and even more preferably at least 15% by mass but not more than 45% by mass.

By ensuring that the amount of the blocked isocyanurate trimer falls within the above range, the heat resistance of the obtained coating film tends to be superior.

The amount of the blocked isocyanurate trimer can be measured using the method described below in the examples.

Further, by ensuring that the amount of the blocked isocyanurate trimer falls within the above range, the heat resistance of an easy adhesion treated layer formed by applying an adhesive composition of an embodiment of the present invention tends to be particularly superior.

Furthermore, by ensuring that the amount of the blocked isocyanurate trimer falls within the above range, the heat resistance of a coating film in a multilayer coating film laminate tends to be more superior.

(Polyisocyanate)

The polyisocyanate used in the production of the blocked polyisocyanate is a reaction product obtained by reacting a plurality of molecules of a monomer compound (hereafter sometimes referred to as an "isocyanate monomer") having at least one isocyanate group (—NCO).

The isocyanate monomer preferably has at least 4 but not more than 30 carbon atoms. Specific examples of compounds that may be used as the isocyanate monomer include the compounds listed below. These isocyanate monomers may be used individually, or a combination of two or more monomers may be used.

(1) Aromatic diisocyanates such as diphenylmethane-4,4'-diisocyanate (MDI), 1,5-naphthalene diisocyanate, tolylene diisocyanate (TDI), xylylene diisocyanate, and m-tetramethylxylylene diisocyanate (TMXDI).

(2) Aliphatic diisocyanates such as 1,4-tetramethylene diisocyanate, 1,6-hexamethylene diisocyanate (hereafter sometimes abbreviated as "HDI"), 2,2,4-trimethyl-1,6-diisocyanatohexane, 2,4,4-trimethyl-1,6-hexamethylene diisocyanate, 2-methylpentane-1,5-diisocyanate (MPDI), and lysine diisocyanate (hereafter sometimes abbreviated as "LDI").

(3) Alicyclic diisocyanates such as isophorone diisocyanate (hereafter sometimes abbreviated as "IPDI"), 1,3-bis (diisocyanatomethyl)cyclohexane, 4,4'-dicyclohexylmethane diisocyanate, diisocyanatonorbornane, and di(isocyanatomethyl)norbornane.

(4) Triisocyanates such as 4-isocyanatomethyl-1,8-octamethylene diisocyanate (hereafter sometimes abbreviated as "NTI"), 1,3,6-hexamethylene triisocyanate (hereafter sometimes abbreviated as "HTI"), bis(2-isocyanatoethyl) 2-isocyanatoglutarate (hereafter sometimes abbreviated as "GTI"), and lysine triisocyanate (hereafter sometimes abbreviated as "LTI").

Among these various compounds, in terms of achieving superior weather resistance, at least one diisocyanate selected from the group consisting of aliphatic diisocyanates and alicyclic diisocyanates is preferred as the isocyanate monomer. Further, in terms of ease of industrial availability, HDI or IPDI is more preferred as the isocyanate monomer. Furthermore, from the viewpoint of achieving a low viscosity for the blocked polyisocyanate composition, HDI is even more desirable as the isocyanate monomer.

(Method for Producing Polyisocyanate)

The method used for producing the polyisocyanate is described below in detail.

The polyisocyanate can be obtained, for example, by first simultaneously conducting an allophanation reaction that forms an allophanate group, an uretdionization reaction that forms an uretdione group, an iminooxadiazinedionation reaction that forms an iminooxadiazinedione group, an isocyanuration reaction that forms an isocyanurate group, a urethanation reaction that forms a urethane group, and a biuretization reaction that forms a biuret group, in the presence of excess isocyanate monomer, and following completion of the reaction, removing the unreacted isocyanate monomer. In other words, the polyisocyanate obtained from the above reaction is a compound in which a plurality of the aforementioned isocyanate monomer have been bonded together, and is a reaction product having at least one group selected from the group consisting of an allophanate group, an uretdione group, an iminooxadiazinedione group, an isocyanurate group, a urethane group and a biuret group.

Further, the reactions described above may be performed separately, and the polyisocyanates obtained in the respective reactions then mixed together in a prescribed ratio.

From the viewpoint of the simplicity of the production, it is preferable that the above reactions are conducted simultaneously, whereas from the viewpoint of enabling the molar ratio of each functional group to be adjusted freely, it is preferable that the reactions are preferably performed separately, and the products are then mixed.

Method for Producing Allophanate Group-Containing Polyisocyanate

An allophanate group-containing polyisocyanate can be obtained by adding an alcohol to the isocyanate monomer, and then conducting a reaction using an allophanation reaction catalyst.

The alcohol used for forming the allophanate group is preferably an alcohol composed solely of carbon, hydrogen and oxygen.

Specific examples of the alcohol include, but are not limited to, monoalcohols and dialcohols and the like. One of these alcohols may be used alone, or a combination of two or more alcohols may be used.

Examples of the monoalcohols include methanol, ethanol, propanol, butanol, pentanol, hexanol, heptanol, octanol, and nonanol.

Examples of the dialcohols include ethylene glycol, 1,3-butanediol, neopentyl glycol, and 2-ethylhexanediol.

Among the above compounds, the alcohol is preferably a monoalcohol, and is more preferably a monoalcohols having a molecular weight of not more than 200.

There are no particular limitations on the allophanation reaction catalyst, and examples include alkylcarboxylate salts and the like of tin, lead, zinc, bismuth, zirconium and zirconyl.

Examples of alkylcarboxylate salts of tin (organotin compounds) include tin 2-ethylhexanoate and dibutyltin dilaurate.

Examples of alkylcarboxylate salts of lead (organolead compounds) include lead 2-ethylhexanoate and the like.

Examples of alkylcarboxylate salts of zinc (organozinc compounds) include zinc 2-ethylhexanoate and the like.

Examples of alkylcarboxylate salts of bismuth include bismuth 2-ethylhexanoate and the like.

Examples of alkylcarboxylate salts of zirconium include zirconium 2-ethylhexanoate and the like.

Examples of alkylcarboxylate salts of zirconyl include zirconyl 2-ethylhexanoate and the like. One of these catalysts may be used alone, or a combination of two or more catalysts may be used.

Further, the isocyanuration reaction catalysts described below may also function as allophanation reaction catalysts. In those cases where the allophanation reaction is performed using an isocyanuration reaction catalyst described below, an isocyanurate group-containing polyisocyanate (hereafter sometimes referred to as an "isocyanurate type polyisocyanate") is of course also produced.

Among the various possibilities, performing an allophanation reaction and an isocyanuration reaction using an isocyanuration reaction catalyst described below as the allophanation reaction catalyst is preferred in terms of achieving economic production.

The lower limit for the amount used of the aforementioned allophanation reaction catalyst, relative to the mass of added isocyanate monomer, is preferably 10 ppm by mass, more preferably 20 ppm by mass, even more preferably 40 ppm by mass, and particularly preferably 80 ppm by mass.

The upper limit for the amount used of the aforementioned allophanation reaction catalyst, relative to the mass of added isocyanate monomer, is preferably 1,000 ppm by mass, more preferably 800 ppm by mass, even more preferably 600 ppm by mass, and particularly preferably 500 ppm by mass.

In other words, the amount used of the aforementioned allophanation reaction catalyst, relative to the mass of added isocyanate monomer, is preferably at least 10 ppm by mass but not more than 1,000 ppm by mass, more preferably at least 20 ppm by mass but not more than 800 ppm by mass, even more preferably at least 40 ppm by mass but not more than 600 ppm by mass, and particularly preferably at least 80 ppm by mass but not more than 500 ppm by mass.

Further, the lower limit for the allophanation reaction temperature is preferably 40° C., more preferably 60° C., even more preferably 80° C., and particularly preferably 100° C.

Furthermore, the upper limit for the allophanation reaction temperature is preferably 180° C., more preferably 160° C., and even more preferably 140° C.

In other words, the allophanation reaction temperature is preferably at least 40° C. but not more than 180° C., more preferably at least 60° C. but not more than 160° C., even more preferably at least 80° C. but not more than 140° C., and particularly preferably at least 100° C. but not more than 140° C.

By ensuring that the allophanation reaction temperature is at least as high as the above lower limit, the reaction rate can be further increased. By ensuring that the allophanation reaction temperature is not more than the above upper limit, coloration and the like of the polyisocyanate tends to be able to be more effectively suppressed.

Method for Producing Uretdione Group-Containing Polyisocyanate

In those cases where a polyisocyanate having an uretdione group is produced from an isocyanate monomer, the polyisocyanate can be produced, for example, by polymerizing the isocyanate monomer using a uretdionization reaction catalyst, or by heating.

There are no particular limitations on the uretdionization reaction catalyst, and examples include tertiary phosphines such as trialkylphosphines, tris(dialkylamino)phosphines and cycloalkylphosphines, and Lewis acids.

Examples of the trialkylphosphines include tri-n-butylphosphine and tri-n-octylphosphine.

Examples of the tris(dialklamino)phosphines include tris(dimethylamino)phosphine.

Examples of the cycloalkylphosphines include cyclohexyl-di-n-hexylphosphine.

Examples of the Lewis acids include boron trifluoride and zinc hydrochloride.

Most uretdionization catalysts simultaneously promote the isocyanuration reaction.

In those cases where an uretdionization catalyst is used, when the desired yield is reached, an uretdionization catalyst quencher such as phosphoric acid or methyl para-toluenesulfonate is preferably added to halt the uretdionization reaction.

Further, in those cases where a polyisocyanate having an uretdione group is obtained without using an uretdionization catalyst, by heating at least one compound selected from the group consisting of the aforementioned aliphatic diisocyanates and the aforementioned alicyclic diisocyanates, the heating temperature is preferably at least 120° C., and more preferably at least 150° C. but not more than 170° C. Further, the heating time is preferably at least one hour but not more than 4 hours.

Method for Producing Iminooxadiazinedione Group-Containing Polyisocyanate

In those cases where an iminooxadiazinedione group-containing polyisocyanate is produced from an isocyanate monomer, an iminooxadiazinedionation reaction catalyst is typically used.

Examples of the iminooxadiazinedionation reaction catalyst include compounds described below in 1) or 2).

1) (Poly)hydrogen fluorides represented by general formula $M[F]_n$ or general formula $M[F_n(HF)_m]$ (In the formulas, m and n are integers that satisfy the relationship m/n>0. M represents an n-valent cation (mixture) or one or more radicals that in total represent n-valence.)

2) Compounds formed from a compound represented by general formula $R^1$—$CR'_2$—$C(O)O$— or general formula $R^2$=$CR'$—$C(O)O$—, and a quaternary ammonium cation or quaternary phosphonium cation.

(In the formulas, each of $R^1$ and $R^2$ independently represents a linear, branched or cyclic, saturated or unsaturated, perfluoroalkyl group of at least one but not more than 30 carbon atoms. Each of the plurality of R' groups independently represents a hydrogen atom or an alkyl group or aryl group of at least one but not more than 20 carbon atoms which may contain a hetero atom.)

Specific examples of the compounds of 1) ((poly)hydrogen fluorides) include tetramethylammonium fluoride hydrate, and tetraethylammonium fluoride.

Specific examples of the compounds of 2) include 3,3,3-trifluorocarboxylic acid, 4,4,4,3,3-pentafluorobutanoic acid, 5,5,5,4,4,3,3-heptafluoropentanoic acid, and 3,3-difluoropropa-2-enoic acid.

Among these, from the viewpoint of ease of availability, a compound of 1) is preferred as the iminooxadiazinedionation reaction catalyst, whereas from the viewpoint of safety, a compound of 2) is preferred.

There are no particular limitations on the lower limit for the amount used of the iminooxadiazinedionation reaction catalyst, but from the viewpoint of the reactivity, the lower limit expressed as a mass ratio relative to the raw material isocyanate monomer such as HDI, is preferably 5 ppm, more preferably 10 ppm, and even more preferably 20 ppm.

Further, from the viewpoints of suppressing coloration and discoloration of the product and controlling the reaction, the upper limit for the amount used of the iminooxadiazinedionation reaction catalyst, expressed as a mass ratio relative to the raw material isocyanate monomer such as HDI, is preferably 5,000 ppm, more preferably 2,000 ppm, and even more preferably 500 ppm.

In other words, the amount used of the iminooxadiazinedionation reaction catalyst, expressed as a mass ratio relative to the raw material isocyanate monomer such as HDI, is preferably at least 5 ppm but not more than 5,000 ppm, more preferably at least 10 ppm but not more than 2,000 ppm, and even more preferably at least 20 ppm but not more than 500 ppm.

There are no particular limitations on the lower limit for the reaction temperature for the iminooxadiazinedionation, but from the viewpoint of the reaction rate, the lower limit is preferably 40° C., more preferably 50° C., and even more preferably 60° C.

From the viewpoint of suppressing coloration and discoloration of the product, the upper limit for the reaction temperature for the iminooxadiazinedionation is preferably 150° C., more preferably 120° C., and even more preferably 110° C.

In other words, the reaction temperature for the iminooxadiazinedionation is preferably at least 40° C. but not more than 150° C., more preferably at least 50° C. but not more than 120° C., and even more preferably at least 60° C. but not more than 110° C.

The iminooxadiazinedionation reaction may be halted by when the iminooxadiazinedionation reaction reaches the desired amount of iminooxadiazinedione groups. The iminooxadiazinedionation reaction can be halted, for example, by adding an acidic compound to the reaction liquid. Examples of this acidic compound include phosphoric acid, acidic phosphate esters, sulfuric acid, hydrochloric acid, and sulfonic acid compounds. This either neutralizes the iminooxadiazinedionation reaction catalyst, or inactivates the catalyst by thermal decomposition or chemical decomposition or the like. Following halting of the reaction, a filtration may be performed if required.

Method for Producing Isocyanurate Group-Containing Polyisocyanate

Examples of catalysts used for producing a polyisocyanate containing an isocyanurate group from an isocyanate monomer include typically used isocyanuration reaction catalysts.

There are no particular limitations on the isocyanuration reaction catalyst, but catalysts having basicity are generally preferred. Specific examples of the isocyanuration reaction catalyst include the catalysts described below.

(1) Hydroxides of a tetraalkylammonium ion such as a tetramethylammonium, tetraethylammonium or tetrabutylammonium ion, and weak organic acid salts of these tetraalkylammonium ions such as acetates, propionates, octylates, caprates, myristates and benzoates.

(2) Hydroxides of an aryltrialkylammonium ion such as a benzyltrimethylammonium or trimethylphenylammonium ion, and weak organic acid salts of these aryltrialkylammonium ions such as acetates, propionates, octylates, caprates, myristates and benzoates.

(3) Hydroxides of a hydroxyalkylammonium ion such as a trimethylhydroxyethylammonium, trimethylhydroxypropylammonium, triethylhydroxyethylammonium or triethylhydroxypropylammonium ion, and weak organic acid salts of these hydroxyalkylammonium ions such as acetates, propionates, octylates, caprates, myristates and benzoates.

(4) Metal salts such as tin, zinc and lead salts of alkylcarboxylic acids such as acetic acid, propionic acid, caproic acid, octylic acid, capric acid and myristic acid.

(5) Metal alcoholates such as sodium and potassium alcoholates.

(6) Aminosilyl group-containing compounds such as hexamethylenedisilazane.

(7) Mannich bases.

(8) Mixtures of a tertiary amine and an epoxy compound.

(9) Phosphorus-based compounds such as tributylphosphine.

Among the above, from the viewpoint of suppressing the production of unwanted by-products, a quaternary ammonium hydroxide or a weak organic acid salt of a quaternary ammonium ion is preferred as the isocyanuration reaction catalyst, and a tetraalkylammonium hydroxide, a weak organic acid salt of a tetraalkylammonium ion, an aryltrialkylammonium hydroxide, or a weak organic acid salt of an aryltrialkylammonium ion is more preferred.

The upper limit for the amount used of the aforementioned isocyanuration reaction catalyst, relative to the mass of the added isocyanate monomer, is preferably 1,000 ppm by mass, more preferably 500 ppm by mass, and even more preferably 100 ppm by mass.

On the other hand, the lower limit for the amount used of the aforementioned isocyanuration reaction catalyst is not particularly limited, but may be, for example, 10 ppm by mass.

The isocyanuration reaction temperature is preferably at least 50° C. but not more than 120° C., and more preferably at least 60° C. but not more than 90° C. By ensuring that the isocyanuration reaction temperature is not higher than the above upper limit, coloration and the like of the polyisocyanate tends to be able to be more effectively suppressed.

When the desired conversion rate (the ratio of the mass of polyisocyanate produced by the isocyanuration reaction relative to the mass of the added isocyanate monomer) has been reached, the isocyanuration reaction is halted by adding an acidic compound (for example, phosphoric acid or an acidic phosphate ester or the like).

In order to obtain a polyisocyanate, the reaction progression must be halted in the initial stages. However, because the initial reaction rate of the isocyanuration reaction is extremely rapid, halting the reaction progression in the initial stages is problematic, and the reaction conditions, and particularly the amount added of the catalyst and the addition method, must be selected very carefully. For example, a stepwise addition method in which a prescribed amount of the catalyst is added per fixed time period is highly recommended.

Accordingly, the isocyanuration reaction conversion rate used for obtaining a polyisocyanate is preferably at least 10% but not more than 60%, more preferably at least 15% but not more than 55%, and even more preferably at least 20% but not more than 50%.

By ensuring that the isocyanuration reaction conversion rate is not more than the above upper limit, a lower viscosity can be obtained for the blocked polyisocyanate composition containing the polyisocyanate. Further, by ensuring that the isocyanuration reaction conversion rate is at least as large as the above lower limit, the operation for halting the reaction can be performed more easily.

Further, when producing a polyisocyanate containing an isocyanurate group, an alcohol that is at least monohydric but not more than hexahydric may also be used in addition to the aforementioned isocyanate monomer.

Examples of monohydric to hexahydric alcohols that may be used include non-polymerizable alcohols and polymerized alcohols. Here, a "non-polymerizable alcohol" means an alcohol that has no polymerizable groups. On the other hand, a "polymerized alcohol" means an alcohol obtained by polymerizing a monomer having a polymerizable group and a hydroxyl group.

Examples of the non-polymerizable alcohols include monoalcohols, and polyhydric alcohols such as diols, triols and tetraols.

Examples of the monoalcohols include methanol, ethanol, n-propanol, isopropanol, n-butanol, isobutyl alcohol (isobutanol), sec-butanol, n-pentanol, n-hexanol, n-octanol, n-nonanol, 2-ethylbutanol, 2,2-dimethylhexanol, 2-ethylhexanol, cyclohexanol, methylcyclohexanol and ethylcyclohexanol.

Examples of the diols include ethylene glycol, diethylene glycol, triethylene glycol, propylene glycol, dipropylene glycol, tripropylene glycol, 1,2-propanediol, 1,3-propanediol, 1,2-butanediol, 1,3-butanediol, 1,4-butanediol, 2,3-butanediol, 2-methyl-1,2-propanediol, 1,5-pentanediol, 2-methyl-2,3-butanediol, 1,6-hexanediol, 1,2-hexanediol, 2,5-hexanediol, 2-methyl-2,4-pentanediol, 2,3-dimethyl-2,3-butanediol, 2-ethylhexanediol, 1,2-octanediol, 1,2-decanediol, 2,2,4-trimethylpentanediol, 2-butyl-2-ethyl-1,3-propanediol, and 2,2-diethl-1,3-propanediol.

Examples of the triols include glycerol and trimethylolpropane.

Examples of the tetraols include pentaerythritol.

There are no particular limitations on the polymerized alcohols, and examples include polyester polyols, polyether polyols, acrylic polyols, and polyolefin polyols.

There are no particular limitations on the polyester polyols, and examples include products obtained from a condensation reaction between a single dibasic acid or a mixture of such acids, and a single polyhydric alcohol or a mixture of such alcohols.

There are no particular limitations on the dibasic acid, and examples include at least one dibasic acid selected from the group consisting of carboxylic acids such as succinic acid, adipic acid, sebacic acid, dimer acid, maleic anhydride, phthalic anhydride, isophthalic acid and terephthalic acid.

There are no particular limitations on the polyhydric alcohol, and examples include at least one alcohol selected from the group consisting of ethylene glycol, propylene glycol, diethylene glycol, neopentyl glycol, trimethylolpropane and glycerol.

Further, other examples of polyester polyols include polycaprolactones obtained by a ring-opening polymerization of ε-caprolactone using an aforementioned polyhydric alcohol.

There are no particular limitations on the polyether polyols, and examples include polyether polyols obtained by using an alkali metal hydroxide or a strongly basic catalyst to add a single alkylene oxide or a mixture of alkylene oxides to a single polyhydric alcohol or a mixture of polyhydric alcohols, polyether polyols obtained by reacting an alkylene oxide with a polyamine compound, and so-called polymer polyols obtained by polymerizing acrylamide or the like using an aforementioned polyether as a reaction medium.

Examples of the alkali metal include lithium, sodium and potassium.

Examples of the strongly basic catalysts include alcoholates and alkylamines.

Examples of the polyhydric alcohol include the same compounds as those mentioned above in the description of the polyester polyols.

Examples of the alkylene oxide include ethylene oxide, propylene oxide, butylene oxide, cyclohexylene oxide and styrene oxide.

Examples of the polyamine compound include ethylenediamine and the like.

There are no particular limitations on the acrylic polyols, and examples include acrylic polyols obtained by copolymerizing a single ethylenic unsaturated bond-containing monomer having a hydroxyl group or a mixture of such monomers, and a single other copolymerizable ethylenic unsaturated bond-containing monomer or a mixture of such copolymerizable monomers.

There are no particular limitations on the ethylenic unsaturated bond-containing monomer having a hydroxyl group, and examples include hydroxyethyl acrylate, hydroxypropyl acrylate, hydroxybutyl acrylate, hydroxyethyl methacrylate, hydroxypropyl methacrylate, and hydroxybutyl methacrylate.

There are no particular limitations on the other ethylenic unsaturated bond-containing monomer that is copolymerizable with the ethylenic unsaturated bond-containing monomer having a hydroxyl group, and examples include acrylate esters, methacrylate esters, unsaturated carboxylic acids, unsaturated amides, vinyl-based monomers, and vinyl-based monomers having a hydrolyzable silyl group.

Examples of the acrylate esters include methyl acrylate, ethyl acrylate, propyl acrylate, isopropyl acrylate, n-butyl acrylate, isobutyl acrylate, n-hexyl acrylate, cyclohexyl acrylate, 2-ethylhexyl acrylate, lauryl acrylate, benzyl acrylate, and phenyl acrylate.

Examples of the methacrylate esters include methyl methacrylate, ethyl methacrylate, propyl methacrylate, isopropyl methacrylate, n-butyl methacrylate, isobutyl methacrylate, n-hexyl methacrylate, cyclohexyl methacrylate, 2-ethylhexyl methacrylate, lauryl methacrylate, benzyl methacrylate, and phenyl methacrylate.

Examples of the unsaturated carboxylic acids include acrylic acid, methacrylic acid, maleic acid, and itaconic acid.

Examples of the unsaturated amides include acrylamide, methacrylamide, N,N-methylenebisacrylamide, diacetone acrylamide, diacetone methacrylamide, maleic acid amide, and maleimide.

Examples of the vinyl-based monomer include glycidyl methacrylate, styrene, vinyltoluene, vinyl acetate, acrylonitrile, and dibutyl fumarate.

Examples of the vinyl-based monomers having a hydrolyzable silyl group include vinyltrimethoxysilane, vinyl methyldimethoxysilane, and γ-(meth)acryloxypropyltrimethoxysilane.

Examples of the polyolefin polyols include hydroxyl-terminated polybutadienes and hydrogenated products thereof.

Method for Producing Urethane Group-Containing Polyisocyanate

In those cases where a urethane group-containing polyisocyanate is produced from an isocyanate monomer, the polyisocyanate can be produced, for example, by mixing an excess of the isocyanate monomer with an alcohol, and adding a urethanation reaction catalyst if required.

Examples of the alcohol include the same alcohols as those listed above in the section relating to the "Method for Producing Isocyanurate Group-Containing Polyisocyanate".

There are no particular limitations on the urethanation reaction catalyst, and examples include tin-based compounds, zinc-based compounds, and amine-based compounds.

The urethanation reaction temperature is preferably at least 50° C. but not more than 160° C., and more preferably at least 60° C. but not more than 120° C.

By ensuring that the urethanation reaction temperature is not more than the above upper limit, coloration and the like of the polyisocyanate tends to be able to be more effectively suppressed.

Further, the urethanation reaction time is preferably at least 30 minutes but not more than 4 hours, is more preferably at least one hour but not more than 3 hours, and is even more preferably at least one hour but not more than two hours.

The ratio of the molar amount of isocyanate groups of the isocyanate monomer relative to the molar amount of hydroxyl groups of the alcohol is preferably at least 2/1 but not more than 50/1. By ensuring that the molar ratio is at least as large as the above lower limit, a lower viscosity can be achieved for the polyisocyanate. By ensuring that the molar ratio is not more than the above upper limit, the yield of the urethane group-containing polyisocyanate can be further enhanced.

Method for Producing Biuret Group-Containing Polyisocyanate

There are no particular limitations on the biuretizing agent used for producing a polyisocyanate containing a biuret group from an isocyanate monomer, and examples include water, monohydric tertiary alcohols, formic acid, organic primary amines, and organic primary diamines.

The amount of isocyanate groups per 1 mol of the biuretizing agent is preferably at least 6 mol, more preferably at least 10 mol, and even more preferably at least 10 mol but not more than 80 mol. Provided the molar amount of isocyanate groups per 1 mol of the biuretizing agent is at least as large as the above lower limit, the polyisocyanate adopts a satisfactorily low viscosity, whereas provided the molar amount is not more than the above upper limit, the curability when used as a coating material composition can be further improved.

Furthermore, a solvent may be used during the biuretization reaction. The solvent may be any solvent capable of dissolving the isocyanate monomer and the biuretizing agent such as water to form a uniform single phase under the reaction conditions.

Specific examples of the solvent include ethylene glycol-based solvents and phosphoric acid-based solvents.

Examples of the ethylene glycol-based solvents include ethylene glycol monomethyl ether acetate, ethylene glycol monoethyl ether acetate, ethylene glycol mono-n-propyl ether acetate, ethylene glycol monoisopropyl ether acetate, ethylene glycol mono-n-butyl ether acetate, ethylene glycol diacetate, ethylene glycol dimethyl ether, ethylene glycol diethyl ether, ethylene glycol di-n-propyl ether, ethylene glycol diisopropyl ether, ethylene glycol di-n-butyl ether, ethylene glycol methyl ethyl ether, ethylene glycol methyl isopropyl ether, ethylene glycol methyl n-butyl ether, ethylene glycol ethyl n-propyl ether, ethylene glycol ethyl isopropyl ether, ethylene glycol ethyl n-butyl ether, ethylene glycol n-propyl n-butyl ether, ethylene glycol isopropyl n-butyl ether, diethylene glycol monomethyl ether acetate, diethylene glycol monoethyl ether acetate, diethylene glycol mono-n-propyl ether acetate, diethylene glycol monoisopropyl ether acetate, diethylene glycol mono-n-butyl ether acetate, diethylene glycol diacetate, diethylene glycol dimethyl ether, diethylene glycol diethyl ether, diethylene glycol di-n-propyl ether, diethylene glycol diisopropyl ether, diethylene glycol di-n-butyl ether, diethylene glycol methyl ethyl ether, diethylene glycol methyl isopropyl ether, diethylene glycol methyl n-propyl ether, diethylene glycol methyl n-butyl ether, diethylene glycol ethyl isopropyl ether, diethylene glycol ethyl n-propyl ether, diethylene glycol ethyl n-butyl ether, diethylene glycol n-propyl n-butyl ether, and diethylene glycol isopropyl n-butyl ether.

Examples of the phosphoric acid-based solvents include trimethyl phosphate, triethyl phosphate, tripropyl phosphate, and tributyl phosphate.

One of these solvents may be used alone, or a mixture of two or more solvents may be used.

Among the various possibilities, the ethylene glycol-based solvent is preferably ethylene glycol monomethyl ether acetate, ethylene glycol monoethyl ether acetate, ethylene glycol diacetate, or diethylene glycol dimethyl ether.

Further, the phosphoric acid-based solvent is preferably trimethyl phosphate or triethyl phosphate.

The biuretization reaction temperature is preferably at least 70° C. but not more than 200° C., and more preferably at least 90° C. but not more than 180° C. By ensuring that the temperature is not more than the above upper limit, coloration and the like of the polyisocyanate tends to be able to be more effectively suppressed.

The allophanation reaction, uretdionization reaction, iminooxadiazinedionation reaction, isocyanuration reaction, urethanation reaction, and biuretization reaction described above may be performed sequentially, or a number of the reactions may be conducted in parallel.

The polyisocyanate can be obtained by removing unreacted isocyanate monomer from the reaction liquid obtained following completion of the reactions using thin-film distillation or extraction or the like.

Further, antioxidants and ultraviolet absorbers may be added to the obtained polyisocyanate, for example, for the purpose of suppressing coloration during storage.

Examples of the antioxidants include hindered phenols and the like such as 2,6-di-tert-butyl-p-cresol. Examples of the ultraviolet absorbers include benzotriazole and benzophenone. One of these antioxidants or ultraviolet absorbers may be used alone, or a combination of two or more compounds may be used. The amount added of these compounds, relative to the mass of the polyisocyanate, is preferably at least 10 ppm by mass but not more than 500 ppm by mass.

(Physical Properties of Polyisocyanate)

Average Isocyanate Number

In terms of enhancing the curability of the obtained coating film, the average isocyanate number of the polyisocyanate is preferably at least 3.3, and from the viewpoint of achieving a combination of favorable curability for the obtained coating film and good compatibility with polyhydric alcohol compounds, the average isocyanate number is preferably at least 4.6 but not more than 20, and even more preferably at least 5 but not more than 10.

The average isocyanate number of the polyisocyanate can be measured using the method described below in the examples.

Number Average Molecular Weight

Further, in terms of enhancing the curability of the obtained coating film, the number average molecular weight of the polyisocyanate is preferably at least 600, and from the viewpoint of achieving a combination of favorable curability for the obtained coating film and good compatibility with polyhydric alcohol compounds, the number average molecular weight is preferably at least 600 but not more than 10,000, and more preferably at least 1,000 but not more than 8,000.

The number average molecular weight of the polyisocyanate can be measured using the method described below in the examples.

(Blocking Agent)

The blocking agent used in the production of the blocked polyisocyanate contains a compound represented by general formula (I) shown below (the compound (I)). The blocking agent may contain only one compound, or may contain a combination of two or more compounds.

[Chemical formula 6]

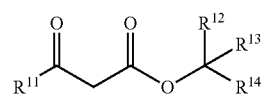

(I)

Compound (I)

1. $R^{11}$

In general formula (I), $R^{11}$ represents a hydroxyl group; an alkyl group which may contain at least one substituent selected from the group consisting of a hydroxyl group and an amino group; an amino group which may contain at least one substituent selected from the group consisting of a hydroxyl group and an alkyl group: an aryl group which may contain at least one substituent selected from the group consisting of a hydroxyl group and an amino group: or an alkoxy group which may contain at least one substituent selected from the group consisting of a hydroxyl group and an amino group. In the amino group, two of the substituents may be linked together to form a ring.

(1) $R^{11}$: Alkyl Group

When $R^{11}$ is an alkyl group that does not have a substituent, the number of carbon atoms in the alkyl group is preferably at least 1 but not more than 30, more preferably at least 1 but not more than 8, even more preferably at least 1 but not more than 6, and particularly preferably at least 1 but not more than 4. Specific examples of the alkyl group that does not have a substituent include a methyl group, ethyl group, propyl group, isopropyl group, n-butyl group, tert-butyl group, sec-butyl group, isobutyl group, n-pentyl group, isopentyl group, neopentyl group, tert-pentyl group, 1-methylbutyl group, n-hexyl group, 2-methylpentyl group, 3-methylpentyl group, 2,2-dimethylbutyl group, 2,3-dimethylbutyl group, n-heptyl group, 2-methylhexyl group, 3-methylhexyl group, 2,2-dimethylpentyl group, 2,3-dimethylpentyl group, 2,4-dimethylpentyl group, 3,3-dimethylpentyl group, 3-ethylpentyl group, 2,2,3-trimethylbutyl group, n-octyl group, isooctyl group, 2-ethylhexyl group, nonyl group and decyl group.

Further, when $R^{11}$ is an alkyl group that has a substituent, the substituent is a hydroxyl group or an amino group.

Examples of alkyl groups containing a hydroxyl group as a substituent include a hydroxymethyl group, hydroxyethyl group, and hydroxypropyl group.

Examples of alkyl groups containing an amino group as a substituent include an aminomethyl group, aminoethyl group, aminopropyl group, and aminobutyl group.

Examples of alkyl groups containing a hydroxyl group and an amino group as substituents include a hydroxyaminomethyl group, hydroxyaminoethyl group, and hydroxyaminopropyl group.

(2) $R^{11}$: Amino Group

When $R^{11}$ is an amino group that has a substituent, the substituent is a hydroxyl group or an alkyl group.

Examples of amino groups containing a hydroxyl group as a substituent include a hydroxyamino group (—NH—OH).

Examples of amino groups containing an alkyl group as a substituent include a methylamino group, ethylamino group, n-butylamino group, dimethylamino group, diethylamino group, dipropylamino group, diisopropylamino group, di-n-butylamino group, di-tert-butylamino group, di-sec-butylamino group, diisobutylamino group, and 2,6-dimethylpiperidyl group.

Examples of amino groups containing a hydroxyl group and an alkyl group as substituents include a hydroxymethyleneamino group, hydroxyethyleneamino group, hydroxypropyleneamino group, and hydroxybutyleneamino group.

Examples of amino groups in which two substituents are linked together to form a ring include an ethyleneimino group, azacyclobutyl group, pyrrolidyl group, piperidyl group, 2,6-dimethylpiperidyl group, and hexamethyleneimino group.

(3) $R^{11}$: Aryl Group

When $R^{11}$ is an aryl group that does not have a substituent, the number of carbon atoms in the aryl group is preferably at least 5 but not more than 30, more preferably at least 6 but not more than 20, and even more preferably at least 6 but not more than 14. Specific examples of the aryl group include monocyclic aromatic hydrocarbon groups, bicyclic aromatic hydrocarbon groups, tricyclic aromatic hydrocarbon groups, tetracyclic aromatic hydrocarbon groups, pentacyclic aromatic hydrocarbon groups, hexacyclic aromatic hydrocarbon groups, and nonacyclic aromatic hydrocarbon groups.

Examples of the monocyclic aromatic hydrocarbon groups include a phenyl group, benzyl group, tolyl group, and o-xylyl group.

Examples of the bicyclic aromatic hydrocarbon groups include an indanyl group, indenyl group, pentalenyl group, azulenyl group, naphthyl group, and tetrahydronaphthyl group.

Examples of the tricyclic aromatic hydrocarbon groups include an anthracenyl group, fluorenyl group, phenalenyl group, and phenanthrenyl group.

Examples of the tetracyclic aromatic hydrocarbon groups include a pyrenyl group, naphthacenyl group, and chrysenyl group.

Examples of the pentacyclic aromatic hydrocarbon groups include a perylenyl group, picenyl group, and pentacenyl group.

Examples of the hexacyclic aromatic hydrocarbon groups include a naphthopyrenyl group.

Examples of the nonacyclic aromatic hydrocarbon groups include a coronenyl group.

When $R^{11}$ is an aryl group that has a substituent, the substituent is a hydroxyl group or an amino group.

Examples of aryl groups containing a hydroxyl group as a substituent include a phenol group and the like.

Examples of aryl groups containing an amino group as a substituent include an aniline group and the like.

Examples of aryl groups containing a hydroxyl group and an amino group as substituents include an aminophenol group (hydroxyaniline group) and the like.

(4) $R^{11}$: Alkoxy Group

When $R^{11}$ is an aryl group that does not have a substituent, the number of carbon atoms in the alkoxy group is preferably at least 1 but not more than 30, more preferably at least 1 but not more than 8, even more preferably at least 1 but not more than 6, and particularly preferably at least 1 but not more than 4. Specific examples of the alkoxy groups include a methoxy group, ethoxy group, propoxy group, isopropoxy group, n-butoxy group, tert-butoxy group, sec-butoxy group, isobutoxy group, n-pentoxy group, isopentoxy group, neopentoxy group, tert-pentoxy group, 1-methylbutoxy group, n-hexoxy group, 2-methylpentoxy group, 3-methylpentoxy group, 2,2-dimethylbutoxy group, 2,3-dimethylbutoxy group, n-heptoxy group, 2-methylhexoxy group, 3-methylhexocy group, 2,2-dimethylpentoxy group, 2,3-dimethylpentoxy group, 2,4-dimethylpentoxy group, 3,3-dimethylpentoxy group, 3-ethylpentoxy group, 2,2,3-trimethylbutoxy group, n-octoxy group, isooctoxy group, 2-ethylhexoxy group, nonyloxy group and decyloxy group.

When $R^{11}$ is an alkoxy group that has a substituent, the substituent is a hydroxyl group or an amino group.

Examples of alkoxy groups containing a hydroxyl group as a substituent include a hydroxymethyleneoxy group, hydroxyethyleneoxy group, hydroxypropyleneoxy group, and hydroxybutyleneoxy group, Examples of alkoxy groups containing an amino group as a substituent include an aminomethyleneoxy group, aminoethyleneoxy group, aminopropyleneoxy group, and aminobutyleneoxy group, Examples of alkoxy groups containing a hydroxyl group and an amino group as substituents include a hydroxyaminomethylidenoxy group, hydroxyaminoethylidenoxy group, and hydroxyaminopropylidenoxy group.

2. $R^{12}$, $R^{13}$ and $R^{14}$

In general formula (I), each of $R^{12}$, $R^{13}$ and $R^{14}$ independently represents a hydrogen atom; a hydroxyl group; an alkyl group which may contain at least one substituent selected from the group consisting of a hydroxyl group and an amino group; an amino group which may contain at least one substituent selected from the group consisting of a hydroxyl group and an alkyl group; an aryl group which may contain at least one substituent selected from the group consisting of a hydroxyl group and an amino group; or an alkoxy group which may contain at least one substituent selected from the group consisting of a hydroxyl group and an amino group. In the amino group, two of the substituents may be linked together to form a ring. However, structures in which two or more of $R^{12}$, $R^{13}$ and $R^{14}$ represent hydrogen atoms are excluded.

Examples of the above alkyl groups, amino groups, aryl groups and alkoxy groups include the same groups as those mentioned above in the description of $R^{11}$.

Among the various possibilities, each of $R^{12}$, $R^{13}$ and $R^{14}$ preferably independently represents a hydrogen atom; an alkyl group which may contain at least one substituent selected from the group consisting of a hydroxyl group and an amino group; or an aryl group which may contain at least one substituent selected from the group consisting of a hydroxyl group and an amino group, but structures in which two or more of $R^{12}$, $R^{13}$ and $R^{14}$ represent hydrogen atoms are excluded.

In the compound (I), in terms of ease of industrial availability and achieving superior low-temperature curability, it is preferable that $R^{11}$ is an alkoxy group, $R^{12}$ is a hydrogen atom or an alkyl group, and $R^{13}$ and $R^{14}$ are both alkyl groups.

Further, by including a tert-butyl ester structure or a tert-pentyl ester structure in the compound (I), the low-temperature curability and water resistance when used as a coating film are excellent, whereas by including a sec-butyl ester structure or iso-propyl ester structure, the storage stability (water dispersion stability and viscosity stability) when used as a coating material composition, and the low-temperature curability and hardness retention when used as a coating film tend to be superior.

Specific examples of preferred compounds for the compound (I) include isopropyl acetoacetate, di-sec-butyl malonate, di-tert-butyl malonate, di-tert-pentyl malonate, diisopropyl malonate, tert-butyl ethyl malonate, and isopropyl ethyl malonate.

Of these, in terms of achieving even better low-temperature curability for the obtained coating film, di-sec-butyl malonate, di-tert-butyl malonate, di-tert-pentyl malonate, diisopropyl malonate, or tert-butyl ethyl malonate is preferred, and from the viewpoint of water dispersion stability, di-sec-butyl malonate or diisopropyl malonate is more preferred.

Further, in those cases where the blocked polyisocyanate composition of this embodiment of the present invention is used as an adhesive composition for forming an easy adhesion treated laminate, in terms of achieving favorable adhesion with the adherend and favorable adhesion following a humidity and heat resistance test, di-tert-butyl malonate or di-tert-pentyl malonate is particularly preferred.

Other Blocking Agents

In addition to the compound (I) described above, the blocking agent used in the production of the blocked polyisocyanate may also contain one or more other blocking agents, provided the low-temperature curability is not impaired.

The amount of the compound (I), relative to the total molar amount of all the blocking agents used in the production of the blocked polyisocyanate, is preferably at least 80 mol % but not more than 100 mol %, more preferably at least 90 mol % but not more than 100 mol %, even more preferably at least 95 mol % but not more than 100 mol %, and particularly preferably at least 99 mol % but not more than 100 mol %.

By ensuring that the amount of the compound (I) falls within the above range, the low-temperature curability when used as a coating film can be further improved.

Examples of other blocking agents include (1) alcohol-based compounds. (2) alkylphenol-based compounds, (3) phenol-based compounds, (4) active methylene-based compounds. (5) mercaptan-based compounds, (6) acid amide-based compounds, (7) acid imide-based compounds, (8) imidazole-based compounds, (9) urea-based compounds, (10) oxime-based compounds. (11) amine-based compounds, (12) imide-based compounds, (13) bisulfites, (14) pyrazole-based compounds, and (15) triazole-based compounds. More specific examples of these blocking agents include the compounds listed below.

(1) Alcohol-based compounds: alcohols such as methanol, ethanol, 2-propanol, n-butanol, sec-butanol, 2-ethyl-1-hexanol, 2-methoxyethanol, 2-ethoxyethanol, and 2-butoxyethanol.

(2) Alkylphenol-based compounds: mono- and di-alkylphenols having an alkyl group of 4 or more carbon atoms as a substituent. Specific examples of these alkylphenol-based compounds include monoalkylphenols such as n-propylphenol, iso-propylphenol, n-butylphenol, sec-butylphenol, tert-butylphenol, n-hexylphenol, 2-ethylhexylphenol, n-octylphenol and n-nonylphenol; and dialkylphenols such as di-n-propylphenol, diisopropylphenol, isopropylcresol, di-n-butylphenol, di-tert-butylphenol, di-sec-butylphenol, di-n-octylphenol, di-2-ethylhexylphenol and di-n-nonylphenol.

(3) Phenol-based compounds: phenol, cresol, ethylphenol, styrenated phenol, and hydroxybenzoate esters and the like.

(4) Active methylene-based compounds: dimethyl malonate, diethyl malonate, methyl acetoacetate, ethyl acetoacetate, and acetylacetone and the like.

(5) Mercaptan-based compounds: butyl mercaptan and dodecyl mercaptan and the like.

(6) Acid amide-based compounds: acetanilide, acetamide, ε-caprolactam, δ-valerolactam and γ-butyrolactam and the like.

(7) Acid imide-based compounds: succinimide and maleimide and the like.

(8) Imidazole-based compounds: imidazole and 2-methylimidazole and the like.

(9) Urea-based compounds: urea, thiourea, and ethylene urea and the like.

(10) Oxime-based compounds: formaldoxime, acetaldoxime, acetoxime, methyl ethyl ketoxime, and cyclohexanone oxime and the like.

(11) Amine-based compounds: diphenylamine, aniline, carbazole, di-n-propylamine, diisopropylamine, and isopropylethylamine and the like.

(12) Imine-based compounds: ethyleneimine and polyethyleneimine and the like.

(13) Bisulfite compounds: sodium bisulfite and the like.

(14) Pyrazole-based compounds: pyrazole, 3-methylpyrazole, and 3,5-dimethylpyrazole and the like.

(15) Triazole-based compounds: 3,5-dimethyl-1,2,4-triazole and the like.

(Hydrophilic Compound)

The hydrophilic compound used in the production of a hydrophilic blocked polyisocyanate is a compound for which one or more isocyanate groups can react with one molecule of the hydrophilic compound. Moreover, the hydrophilic blocked isocyanate contained in the blocked polyisocyanate composition has a structural unit derived from the hydrophilic compound. This is because the hydrophilic compound is a compound having a hydrophilic group. In other words, a hydrophilic group is a functional group which, as a result of the reaction of the hydrophilic compound with the polyisocyanate, exists in (is added to) the polyisocyanate following reaction, and therefore the obtained blocked polyisocyanate composition exhibits excellent water dispersibility.

In order for the hydrophilic compound to react with one isocyanate group, one molecule of the hydrophilic compound preferably has one or more active hydrogen groups capable of reacting with the isocyanate groups of the polyisocyanate. Specific examples of the active hydrogen groups include a hydroxyl group, mercapto group, carboxylic acid group, amino group, and thiol group.

Examples of the hydrophilic group include nonionic hydrophilic groups, cationic hydrophilic groups, and anionic hydrophilic groups. One of these hydrophilic groups may be used alone, or a combination of two or more hydrophilic groups may be used.

Among the various possibilities, from the viewpoints of ease of availability and resistance to electrical interactions with other compounds, nonionic hydrophilic groups are preferred, whereas from the viewpoint of suppressing any decrease in the hardness of the obtained coating film, anionic hydrophilic groups are preferred.

(Hydrophilic Compounds Having a Nonionic Hydrophilic Group)

Specific examples of hydrophilic compound having a nonionic hydroxyl group include monoalcohols, and compounds in which ethylene oxide has been added to the hydroxyl group of an alcohol. Examples of the monoalcohols include methanol, ethanol, and butanol. Examples of compounds in which ethylene oxide has been added to the hydroxyl group of an alcohol include ethylene glycol and diethylene glycol. These hydrophilic compounds having a nonionic hydrophilic group also have an active hydrogen group that reacts with an isocyanate group.

In a compound to which ethylene oxide has been added, the number of added ethylene oxide molecules is preferably at least 4 but not more than 30, and more preferably at least 4 but not more than 20. By ensuring that the number of added ethylene oxide molecules is at least as large as the above lower limit, water dispersibility tends to be able to be imparted more effectively to the blocked polyisocyanate, whereas by ensuring that the number of added ethylene oxide molecules is not more than the above upper limit, precipitation of the blocked polyisocyanate composition during low-temperature storage tends to be less likely to occur.

Among the various possibilities, in terms of enabling the water dispersibility of the blocked polyisocyanate composition to be improved with a small amount of added compound, a monoalcohol is preferred as the hydrophilic compound having a nonionic hydrophilic group.

From the viewpoint of the water dispersion stability of the blocked polyisocyanate composition, the lower limit for the amount of the nonionic hydrophilic group added to the polyisocyanate (hereafter sometimes referred to as the "nonionic hydrophilic group content"), relative to the solid fraction mass of the blocked polyisocyanate composition, is preferably 1% by mass, more preferably 3% by mass, even more preferably 4% by mass, and particularly preferably 4.5% by mass.

Further, from the viewpoint of the water resistance of the obtained coating film, the upper limit for the nonionic hydrophilic group content, relative to the solid fraction mass of the blocked polyisocyanate composition, is preferably 30% by mass, more preferably 25% by mass, even more preferably 20% by mass, and particularly preferably 17% by mass.

In other words, the nonionic hydrophilic group content, relative to the mass of the non-volatile fraction of the blocked polyisocyanate composition, is preferably at least 1% by mass but not more than 30% by mass, more preferably at least 3% by mass but not more than 25% by mass, even more preferably at least 4% by mass but not more than 20% by mass, and particularly preferably at least 4.5% by mass but not more than 17% by mass.

By ensuring that the content falls within the above range, the blocked polyisocyanate composition can be dispersed more easily in water, and the water resistance of the obtained coating film tends to improve.

(Hydrophilic Compounds Having a Cationic Hydrophilic Group)

Specific examples of hydrophilic compounds having a cationic hydrophilic group include compounds having a cationic hydrophilic group and an active hydrogen group. Further, a combination of a compound having an active hydrogen group such as a glycidyl group, and a compound having a cationic hydrophilic group such as a sulfide or phosphine may also be used as the hydrophilic compound. In this case, the compound having an isocyanate group and the compound having an active hydrogen group are first reacted together to add the functional group such as a glycidyl group, and subsequently, the compound such as a sulfide or phosphine is then reacted. From the viewpoint of ease of production, a compound having both a cationic hydrophilic group and an active hydrogen group is preferred.

Specific examples of compounds having both a cationic hydrophilic group and an active hydrogen group include dimethylethanolamine, diethylethanolamine, diethanolamine, and methyldiethanolamine. Further, the tertiary amino groups added using these compounds may also be quaternized with dimethyl sulfate or diethyl sulfate.

The reaction between the hydrophilic compound having a cationic hydrophilic group and the polyisocyanate may be performed in the presence of a solvent. The solvent in this case preferably does not contain an active hydrogen group, and specific examples include ethyl acetate, propylene glycol monomethyl ether acetate, and dipropylene glycol dimethyl ether.

The cationic hydrophilic group added to the polyisocyanate is preferably neutralized with a compound having an anionic group. Specific examples of this anionic group include a carboxyl group, sulfonate group, phosphate group, halogen group, or sulfate group.

Specific examples of compounds having a carboxyl group include formic acid, acetic acid, propionic acid, butyric acid and lactic acid.

Specific examples of compounds having a sulfonate group include ethanesulfonic acid and the like.

Specific examples of compounds having a phosphate group include phosphoric acid and acidic phosphate esters and the like.

Specific examples of compounds having a halogen group include hydrochloric acid and the like.

Specific examples of compounds having a sulfate group include sulfuric acid and the like.

Among these compounds, the compound having an anionic group is preferably a compound having a carboxyl group, and is more preferably acetic acid, propionic acid or butyric acid.

(Hydrophilic Compounds Having an Anionic Hydrophilic Group)

Specific examples of anionic hydrophilic groups include a carboxyl group, sulfonate group, phosphate group, halogen group, and sulfate group.

Specific examples of hydrophilic compounds having an anionic hydrophilic group include compounds having an anionic group and an active hydrogen group, and more specific examples include monohydroxycarboxylic acids, and compounds having the carboxyl group of a polyhydroxycarboxylic acid as the anionic group.

Examples of monohydroxycarboxylic acids include 1-hydroxyacetic acid, 3-hydroxypropanoic acid, 12-hydroxy-9-octadecanoic acid, hydroxypivalic acid and lactic acid.

Examples of compounds having the carboxyl group of a polyhydroxycarboxylic acid as the anionic group include dimethylolacetic acid, 2,2-dimethylolbutyric acid, 2,2-dimethylolpentanoic acid, dihydroxysuccinic acid and dimethylolpropionic acid.

Further, examples include compounds having a sulfonate group and an active hydrogen group, and specific examples include isethionic acid and the like.

Among the various possibilities, the compound having an anionic group and an active hydrogen group is preferably hydroxypivalic acid or dimethylolpropionic acid.

The anionic hydrophilic group added to the polyisocyanate is preferably neutralized using a basic amine-based compound.

Specific examples of this amine-based compound include ammonia and water-soluble amino compounds.

Specific examples of the water-soluble amino compounds include monoethanolamine, ethylamine, dimethylamine, diethylamine, triethylamine, propylamine, dipropylamine, isopropylamine, diisopropylamine, triethanolamine, butylamine, dibutylamine, 2-ethylhexylamine, ethylenediamine, propylenediamine, methylethanolamine, dimethylethanolamine, diethylethanolamine and morpholine. Further examples include tertiary amines such as triethylamine and dimethylethanolamine, and these compounds may also be used. One of these amine-based compounds may be used alone, or a combination of two or more compounds may be used.

[Other Additives]

Although there are no particular limitations, the blocked polyisocyanate composition of this embodiment may also include, in addition to the blocked polyisocyanate, an active hydrogen group-containing compound, and additives such as additives for improving the hydrophilicity or solvents.

(Active Hydrogen-Containing Compound)

By including an active hydrogen group-containing compound, a coating material composition of an embodiment of the present invention is able to exhibit a combination of low-temperature curability and storage stability, with improvements in both of these properties.

The active hydrogen group contained in the active hydrogen group-containing compound is preferably a hydroxyl group or an amino group.

In other words, the active hydrogen group-containing compound is, for example, preferably a monoalcohol, a dialcohol or an amine. These monoalcohols, dialcohols and amines may be linear or branched.

Monoalcohols

Examples of the above monoalcohols include (1) aliphatic alcohols, (2) mono- (or oligo-) ethylene glycol monoalkyl ethers, (3) mono- (or oligo-) propylene glycol monoalkyl ethers, (4) mono- (or oligo-) ethylene glycol monoesters, and (5) mono- (or oligo-) propylene glycol monoesters. One of these monoalcohols may be included alone, or a combination of two or more such monoalcohols may be included.

(1) Examples of the aliphatic alcohols include methanol, ethanol, n-propanol, 2-propanol, n-butanol, isobutanol, tert-butanol, 2-butanol, 2-ethyl-1-butanol, isoamyl alcohol, n-pentanol, isopentanol, 2-methyl-1-pentanol, hexanol, n-hexanol, 2-ethylhexanol, n-heptanol, 2-heptanol, octanol, nonanol, decanol, undecanol, dodecanol, tridecanol, tetradecanol, pentadecanol, hexadecanol, heptadecanol, octadecanol, 2-methoxyethanol, 2-ethoxyethanol, 2-butoxyethanol, and isomeric alcohols of the these alcohols.

(2) Examples of the mono- (or oligo-) ethylene glycol monoalkyl ethers include ethylene glycol monoalkyl ethers, diethylene glycol monoalkyl ethers, triethylene glycol monoalkyl ethers, and tetraethylene glycol monoalkyl ethers.

(3) Examples of the mono- (or oligo-) propylene glycol monoalkyl ethers include propylene glycol monoalkyl ethers, dipropylene glycol monoalkyl ethers, tripropylene glycol monoalkyl ethers, and tetrapropylene glycol monoalkyl ethers.

(4) Examples of the mono- (or oligo-) ethylene glycol monoesters include ethylene glycol monoesters, diethylene glycol monoesters, triethylene glycol monoesters, and tetraethylene glycol monoesters.

(5) Examples of the mono- (or oligo-) propylene glycol monoesters include propylene glycol monoesters, dipropylene glycol monoesters, tripropylene glycol monoesters, and tetrapropylene glycol monoesters.

Dialcohols

Examples of the above dialcohols include ethylene glycol, 1,2-propanediol, 1,3-propanediol, 1,2-butanediol, 1,3-butanediol, 1,4-butanediol, 1,5-pentanediol, 1,2-pentanediol, 1,6-hexanediol, 1,7-heptanediol, 1,8-octanediol, 1,9-nonanediol, 2-ethyl-1,6-hexanediol, 2-methyl-1,3-propanediol, 3-methyl-1,5-pentanediol, neopentyl glycol, 1,3-cyclohexanediol, 1,4-cyclohexanediol, and 1,4-dimethylolcyclohexane. One of these dialcohols may be included alone, or a combination of two or more such dialcohols may be used.

Amines

Examples of the above amines include (1) primary amines, (2) linear secondary amines, (3) branched secondary amines, (4) unsaturated double bond-containing secondary amines, (5) asymmetric secondary amines, and (6) secondary amines having an aromatic substituent. One of these amines may be included alone, or a combination of two or more amines may be used.

(1) Examples of the primary amines include methylamine, ethylamine, propylamine, butylamine, and isobutylamine.

(2) Examples of the linear secondary amines include dimethylamine, diethylamine, dipropylamine, dibutylamine, dipentylamine, dihexylamine, dioctylamine, dilaurylamine, ditridecylamine, and distearylamine.

(3) Examples of the branched secondary amines include diisopropylamine, diisobutylamine, di(2-butyl)amine, di(tert-butyl)amine, di(2-ethylhexyl)amine, dicyclohexylamine, and di(2-methylcyclohexyl)amine.

(4) Examples of the unsaturated double bond-containing secondary amines include diallylamine and the like.

(5) Examples of the asymmetric secondary amines include methylethylamine, N-methylisopropylamine, methyl-tert-butylamine, N-methylhexylamine, ethyl-tert-butylamine. N-ethylhexylamine, N-ethyl-1,2-dimethylpropylamine, N-ethylisoamylamine, N-ethyllaurylamine, N-ethylstearylamine, N-methylcyclohexylamine. N-ethylcyclohexylamine, and N-tert-butylcyclohexylamine.

(6) Examples of the secondary amines having an aromatic substituent include diphenylamine, dibenzylamine, methylbenzylamine, ethylbenzylamine, tert-butylbenzylamine, N-methylaniline, N-ethylaniline, N-cyclohexylaniline, and ethyl 3-(benzylamino)propionate.

The blocked polyisocyanate composition of this embodiment may contain only one of the active hydrogen group-containing compounds mentioned above, or may contain a combination of two or more such compounds.

Among the various possibilities, in terms of achieving a combination of low-temperature curability and favorable storage stability, while also improving both of these properties, the active hydrogen group-containing compound is preferably a monoalcohol, more preferably a secondary alcohol, and even more preferably either 2-propanol or isobutanol.

In the blocked polyisocyanate composition of this embodiment, the molar amount of the active hydrogen group-containing compound may be selected as desired, but relative to the total molar amount of blocked isocyanate groups in the blocked polyisocyanate composition, is preferably at least 10 mol % but not more than 1,000 mol %, more preferably at least 50 mol % but not more than 950 mol %, and even more preferably at least 50 mol % but not more than 800 mol %.

(Additives for Improving Hydrophilicity)

By adding an additive for improving the hydrophilicity to the blocked polyisocyanate composition of this embodiment, the water dispersion stability can be further improved. Examples of this type of additive include nonionic compounds, cationic compounds, anionic compounds, and amphoteric compounds.

Specific examples of the nonionic compounds include ether-type compounds, ester-type compounds, and alkanolamide-type compounds. Specific examples of the ether-type compounds include compounds in which ethylene oxide has been added to a higher alcohol of at least 10 but not more than 18 carbon atoms, compounds in which ethylene oxide has been added to an alkylphenol, compounds in which ethylene oxide has been added to a polypropylene alcohol, and compounds in which ethylene oxide has been added to a fatty acid ester of a polyhydric alcohol. Specific examples of the ester-type compounds include fatty acid esters of higher alcohols such as glycerol and sorbitan. Specific examples of the alkanolamide-type compounds include reaction products of fatty acids and diethanolamine.

Specific examples of the cationic compounds include quaternary ammonium salt-type compounds, and alkylamine salt-type compounds.

Specific examples of the anionic compounds include fatty acid salt-type compounds, alkyl sulfate ester compounds, alkylbenzene sulfonate-type compounds, sulfosuccinate-type compounds, and alkyl phosphate-type compounds.

Specific examples of the amphoteric compounds include alkyl betaine-type compounds, and fatty acid amide propyl betaine-type compounds.

(Solvents)

Examples of the aforementioned solvents include 1-methylpyrrolidone, ethylene glycol monoethyl ether, diethylene glycol monoethyl ether, ethylene glycol monomethyl ether, diethylene glycol monomethyl ether, dipropylene glycol monomethyl ether, propylene glycol monomethyl ether, 3-methoxy-3-methyl-1-butanol, ethylene glycol diethyl ether, diethylene glycol diethyl ether, ethylene glycol dimethyl ether, diethylene glycol dimethyl ether, dipropylene glycol dimethyl ether, propylene glycol dimethyl ether, methyl ethyl ketone, acetone, methyl isobutyl ketone, propylene glycol monomethyl ether acetate, ethanol, methanol, iso-propanol, 1-propanol, iso-butanol, 1-butanol, 2-ethylhexanol, cyclohexanol, ethylene glycol, diethylene glycol, triethylene glycol, propylene glycol, dipropylene glycol, 1,4-butanediol, 1,3-butanediol, ethyl acetate, isopropyl acetate, butyl acetate, toluene, xylene, pentane, iso-pentane, hexane, iso-hexane, cyclohexane, solvent naphtha, and mineral spirit. One of these solvents may be used alone, or a mixture of two or more solvents may be used. From the viewpoint of the dispersibility in water, a solvent having a solubility in water of at least 5% by mass is preferred, and specifically, dipropylene glycol monomethyl ether is preferred.

<Method for Producing Blocked Isocyanate Composition>

The blocked isocyanate composition of this embodiment of the present invention can be obtained, for example, by reacting the polyisocyanate described above with the blocking agent described above.

The blocking reaction between the polyisocyanate and the blocking agent may be performed regardless of the presence of a solvent, and yields a blocked polyisocyanate.

The blocking agent may use only one type of the compound (I) described above, or may use a combination of two or more blocking agent selected from the group consisting of the compound (I) and the other blocking agents described above.

Typically, the amount added of the blocking agent, relative to the total molar amount of isocyanate groups, may be at least 80 mol % but not more than 200 mol %, and is preferably at least 100 mol % but not more than 150 mol %.

Further, when a solvent is used, a solvent that is inert relative to isocyanate groups should be used.

When a solvent is used, the solid fraction amount derived from the polyisocyanate and the blocking agent, relative to 100 parts by mass of the blocked polyisocyanate composition of this embodiment, is typically at least 10 parts by mass but not more than 95 parts by mass, preferably at least 20 parts by mass but not more than 80 parts by mass, and more preferably at least 30 parts by mass but not more than 70 parts by mass.

During the blocking reaction, a catalyst such as an organometallic salt of tin, zinc, or lead or the like, a tertiary amine-based compound, or an alcoholate of an alkali metal such as sodium may be used.

The amount added of the catalyst varies depending on the temperature and the like of the blocking reaction, but is typically at least 0.05 parts by mass but not more than 1.5 parts by mass, and preferably at least 0.1 parts by mass but not more than 1.0 parts by mass, per 100 parts by mass of the polyisocyanate.

The blocking reaction is generally conducted at a temperature of at least −20° C. but not more than 150° C., preferably at least 0° C. but not more than 100° C., and even more preferably at least 10° C. but not more than 70° C. By ensuring that the blocking reaction temperature is at least as high as the above lower limit, the reaction rate can be further increased, whereas by ensuring that the temperature is not more than the above upper limit, side reactions can be better suppressed.

Following the blocking reaction, a neutralization treatment may be performed by adding an acidic compound or the like.

Either an inorganic acid or an organic acid may be used as the acidic compound. Examples of the inorganic acids include hydrochloric acid, phosphorus acid, and phosphoric acid. Examples of the organic acids include methanesulfonic acid, p-toluenesulfonic acid, dioctyl phthalate, and dibutyl phthalate.

Further, when producing a hydrophilic blocked polyisocyanate, the hydrophilic blocked polyisocyanate can be obtained, for example, by reacting the polyisocyanate described above, the hydrophilic compound described above, and the blocking agent described above.

The reaction between the isocyanate groups of the polyisocyanate and the hydrophilic compound, and the reaction between the polyisocyanate and the blocking agent may be performed simultaneously, or one of the reactions may be performed first, followed by the second reaction. Of the various possibilities, the reaction between the isocyanate groups and hydrophilic compound is preferably performed first, and then once the polyisocyanate modified with the hydrophilic compound (hereafter sometimes referred to as the "modified polyisocyanate") has been obtained, the reaction between the thus obtained modified polyisocyanate and the blocking agent may be performed.

The reaction between the polyisocyanate and the hydrophilic compound may be performed using an organometallic salt, a tertiary amine-based compound, or an alkali metal alcoholate as a catalyst. Examples of the metal of the organometallic salt include tin, zinc, and lead and the like. Examples of the alkali metal include sodium and the like.

The reaction temperature for the reaction between the polyisocyanate and the hydrophilic compound is preferably at least −20° C. but not more than 150° C., and more preferably at least 30° C. but not more than 100° C. By ensuring that the reaction temperature is at least as high as the above lower limit, the reactivity tends to be more easily improved. Further, by ensuring that the reaction temperature is not more than the above upper limit, side reactions tend to be able to be more effectively suppressed.

In order to ensure that no hydrophilic compound remains in an unreacted state, the hydrophilic compound is preferably reacted completely with the polyisocyanate. By ensuring that no hydrophilic compound remains in an unreacted state, the water dispersion stability of the blocked isocyanate component can be improved, and any deterioration in the curability of the adhesive composition of an embodiment of the present invention tends to be able to be more effectively suppressed.

The blocking reaction between the modified polyisocyanate and the blocking agent may use the method described above as the blocking reaction.

<Physical Properties>
[Solid Fraction Amount]

In the blocked polyisocyanate composition of an embodiment of the present invention, although there are no particular limitations on the solid fraction amount, but from the viewpoint of the handling properties of the blocked polyisocyanate, the solid fraction amount is preferably at least 30% by mass but not more than 80% by mass, and more preferably at least 40% by mass but not more than 70% by mass.

The solid fraction amount can be calculated using the method described below in the examples.

Specifically, first, an aluminum dish is weighed accurately. About 1 g of the blocked polyisocyanate composition is then weighed accurately onto the aluminum dish (W1). Subsequently, the blocked polyisocyanate composition is adjusted to a uniform thickness. The blocked polyisocyanate composition mounted on the aluminum dish is then placed in a 105° C. oven for one hour. The aluminum dish is then returned to room temperature, and the blocked polyisocyanate composition remaining on the aluminum dish is weighed accurately (W2). The solid fraction amount of the blocked polyisocyanate composition can then be calculated from formula (3) shown below.

$$\text{Solid fraction amount of blocked polyisocyanate composition [\% by mass]} = W2/W1 \times 100 \quad (3)$$

[Effective NCO Content]

In the blocked polyisocyanate composition of an embodiment of the present invention, although there are no particular limitations on the effective NCO content, from the viewpoint of achieving improved storage stability for the blocked polyisocyanate composition, the effective NCO content is preferably at least 1% by mass but not more than 15% by mass, more preferably at least 2% by mass but not more than 10% by mass, and even more preferably at least 3% by mass but not more than 9% by mass.

The effective NCO content can be calculated using formula (4) shown below.

$$\text{Effective NCO Content [\% by mass]} = [(\text{solid fraction amount of blocked polyisocyanate composition [\% by mass]}) \times \{(\text{mass of polyisocyanate used in blocking reaction}) \times (\text{NCO content of polyisocyanate [\% by mass]})\}]/(\text{mass of blocked polyisocyanate composition following blocking reaction}) \quad (4)$$

<<Coating Material Composition>>

A coating material composition of an embodiment of the present invention contains the blocked polyisocyanate composition described above and a polyhydric hydroxy compound. The coating material composition of this embodiment is a one-component coating material composition containing a curing agent component and a main component.

The coating material composition of this embodiment exhibits excellent viscosity stability, and by using the coating material composition, a coating film having excellent low-temperature curability, hardness retention and water resistance can be obtained.

The constituent components of the coating material composition of this embodiment are described below in detail.

<Polyhydric Hydroxy Compound>

In this description, a "polyhydric hydroxy compound" means a compound having at least two hydroxyl groups within a single molecule, and is also called a "polyol".

Examples of the polyhydric hydroxy compound include aliphatic hydrocarbon polyols, polyether polyols, polyester polyols, epoxy resins, fluorine-containing polyols, and acrylic polyols.

Among these, the polyhydric hydroxy compound is preferably a polyester polyol, a fluorine-containing polyol or an acrylic polyol.

[Aliphatic Hydrocarbon Polyols]

Examples of the aliphatic hydrocarbon polyols include hydroxy group-terminated polybutadienes and hydrogenated products thereof.

[Polyether Polyols]

Examples of the polyether polyols include compounds obtained using any of methods (1) to (3) described below.

(1) Polyether polyols or polytetramethylene glycols obtained by adding a single alkylene oxide or a mixture of alkylene oxides to a single polyhydric alcohol or a mixture of polyhydric alcohols.

(2) Polyether polyols obtained by reacting a polyfunctional compound with an alkylene oxide.

(3) So-called polymer polyols obtained by polymerizing acrylamide or the like using a polyether polyol obtained by (1) or (2) as the reaction medium.

Examples of the above polyhydric alcohol include glycerol and propylene glycol.

Examples of the above alkylene oxides include ethylene oxide and propylene oxide.

Examples of the above polyfunctional compound include ethylenediamine and ethanolamines.

[Polyester Polyols]

Examples of the polyester polyols include polyester polyols of either (1) or (2) described below.

(1) Polyester polyol resins obtained from a condensation reaction between a single dibasic acid or a mixture of two or more dibasic acids, and a single polyhydric alcohol or a mixture of two or more polyhydric alcohols.

(2) Polycaprolactones obtained by subjecting ε-caprolactone to ring-opening polymerization using a polyhydric alcohol.

Examples of the dibasic acid include carboxylic acids such as succinic acid, adipic acid, dimer acid, maleic anhydride, phthalic anhydride, isophthalic acid, terephthalic acid and 1,4-cyclohexane dicarboxylic acid.

Examples of the polyhydric alcohol include ethylene glycol, propylene glycol, diethylene glycol, 1,4-butanediol, neopentyl glycol, 1,6-hexanediol, trimethylpentanediol, cyclohexanediol, trimethylolpropane, glycerol, pentaerythritol, 2-methylolpropanediol, and ethoxylated trimethylolpropane.

[Epoxy Resins]

Examples of the epoxy resins include epoxy resins such as novolac epoxy resins. β-methylepichloro epoxy resins, cyclic oxirane epoxy resins, glycidyl ether epoxy resins, glycol ether epoxy resins, epoxy aliphatic unsaturated compounds, epoxidized fatty acid esters, esterified polyvalent carboxylic acids, aminoglycidyl epoxy resins, halogenated epoxy resins and resorcin epoxy resins, as well a modified resins in which these epoxy resins have been modified with an amino compound or a polyamide compound or the like.

[Fluorine-Containing Polyols]

Examples of the fluorine-containing polyols include copolymers such as the fluoroolefins, cyclohexyl vinyl ethers, hydroxyalkyl vinyl ethers and vinyl monocarboxylate esters and the like disclosed in Patent Document 8 and Patent Document 9.

[Acrylic Polyols]

The acrylic polyols can be obtained, for example, by polymerizing a polymerizable monomer having one or more active hydrogens in a single molecule, or by copolymerizing a polymerizable monomer having one or more active hydrogens in a single molecule, and if necessary, another monomer that can undergo copolymerization with the polymerizable monomer.

Examples of the polymerizable monomer having one or more active hydrogens in a single molecule include monomers of (i) to (iii) described below. One of these monomers may be used alone, or a combination of two or more monomers may be used.

(i) Acrylate esters having an active hydrogen, such as 2-hydroxyethyl acrylate, 2-hydroxypropyl acrylate and 2-hydroxybutyl acrylate.

(ii) Methacrylate esters having an active hydrogen, such as 2-hydroxyethyl methacrylate, 2-hydroxypropyl methacrylate, and 2-hydroxybutyl methacrylate.

(iii) (Meth)acrylate esters having multiple active hydrogens such as acrylate monoesters or methacrylate monoesters of glycerol, and acrylate monoesters or methacrylate monoesters of trimethylolpropane.

Examples of the aforementioned other monomer that can undergo copolymerization with the polymerizable monomer include monomers of (i) to (v) described below. One of these monomers may be used alone, or a combination of two or more monomers may be used.

(i) Acrylate esters such as methyl acrylate, ethyl acrylate, isopropyl acrylate, n-butyl acrylate, and 2-ethylhexyl acrylate.

(ii) Methacrylate esters such as methyl methacrylate, ethyl methacrylate, isopropyl methacrylate, n-butyl methacrylate, isobutyl methacrylate, n-hexyl methacrylate, cyclohexyl methacrylate, lauryl methacrylate, and glycidyl methacrylate.

(iii) Unsaturated carboxylic acids such as acrylic acid, methacrylic acid, maleic acid, and itaconic acid.

(iv) Unsaturated amides such as acrylamide, N-methylolacrylamide, and diacetone acrylamide.

(v) Styrene, vinyltoluene, vinyl acetate, and acrylonitrile and the like.

Further examples include acrylic polyols obtained by copolymerizing the polymerizable ultraviolet stabilizing monomers disclosed in Patent Document 10 and Patent Document 11 and the like.

Specific examples of these polymerizable ultraviolet stabilizing monomers include 4-(meth)acryloyloxy-2,2,6,6-tetramethylpiperidine, 4-(meth)acryloylamino-2,2,6,6-tetramethylpiperidine, 1-crotonoyl-4-crotonyloxy-2,2,6,6-tetramethylpiperidine, and 2-hydroxy-4-(3-methacryloxy-2-hydroxypropoxy)benzophenone.

For example, acrylic polyols can be obtained by performing a solution polymerization of the above monomer component in the presence of a conventional radical polymerization initiator such as a peroxide or an azo compound, and then performing dilution with an organic solvent or the like as required.

In the case of a water-based acrylic polyol, the acrylic polyol can be produced by a method in which an olefinic unsaturated compound is subjected to solution polymerization and the product is then transferred into a water layer, and by known methods such as emulsion polymerization. In this case, it is possible to impart water solubility or water dispersibility by neutralizing the acidic portions of the carboxylic acid-containing monomers such as acrylic acid or methacrylic acid or the sulfonic acid-containing monomers with an amine or ammonia.

[Hydroxy Value and Acid Value of Polyhydric Hydroxy Compound]

The hydroxyl value of the polyhydric hydroxy compound contained in the coating material composition of this embodiment of the present invention is preferably at least 10 mgKOH/g but not more than 300 mgKOH/g.

By ensuring that the hydroxyl value of the polyhydric hydroxy compound is at least as large as the above lower limit, the urethane crosslinking density resulting from the reaction with the polyisocyanate can be further increased, and the functions of the urethane linkages are able to manifest more easily. On the other hand, by ensuring that the hydroxyl value of the polyhydric hydroxy compound is not more than the above upper limit, the crosslinking density does not increase excessively, and the mechanical properties of the coating film can be improved.

[NCO/OH]

The molar equivalence ratio (NCO/OH) of the isocyanate groups of the blocked polyisocyanate composition relative to the hydroxyl groups of the polyhydric hydroxy compound contained in the coating material composition of this embodiment may be determined in accordance with the coating film properties required, but is typically at least 0.1 but not more than 22.5.

<Other Additives>

The coating material composition of this embodiment of the present invention may also contain other additives in addition to the blocked polyisocyanate composition described above and the polyhydric hydroxy compound described above.

Examples of these other additives include curing agents that can react with the cross-linking functional group in the polyhydric hydroxy compound, curing catalysts, solvents, pigments (such as extender pigments, colored pigments and metallic pigments), ultraviolet absorbers, photostabilizers, radical stabilizers, yellowing inhibitors that suppress coloration during the baking process, coating surface modifiers, fluidity modifiers, pigment dispersants, antifoaming agents, thickeners, and film formation assistants.

Further, the active hydrogen group-containing compound described above may be added not only to the blocked polyisocyanate composition described above, but also to the coating material composition of this embodiment of the present invention.

Examples of the curing agents include melamine resins, urea resins, epoxy group-containing compounds or resins, carboxyl group-containing compounds or resins, acid anhydrides, alkoxysilane group-containing compounds or resins, and hydrazide compounds.

The curing catalyst may be a basic compound or a Lewis acid compound.

Examples of the basic compounds include metal hydroxides, metal alkoxides, metal carboxylates, metal acetylacetonates, hydroxides of onium salts, onium carboxylates, halides of onium salts, metal salts of active methylene compounds, onium salts of active methylene compounds, aminosilanes, amines, and phosphines. The onium salts mentioned above are preferably ammonium salts, phosphonium salts or sulfonium salts.

Examples of the Lewis acid compounds include organotin compounds, organozinc compounds, organotitanium compounds, and organozirconium compounds.

Examples of the solvents include the same solvents as those described above in relation to the blocked isocyanate composition.

Furthermore, conventional materials may be selected appropriately and used as the pigments (such as extender pigments, colored pigments and metallic pigments), ultraviolet absorbers, photostabilizers, radical stabilizers, yellowing inhibitors that suppress coloration during the baking process, coating surface modifiers, fluidity modifiers, pigment dispersants, antifoaming agents, thickeners and film formation assistants.

<Method for Producing Coating Material Composition>

The coating material composition of this embodiment can be used for either solvent-based compositions or water-based compositions.

When producing a water-based coating material composition (an aqueous coating material composition), first, additives may be added as necessary to the polyhydric hydroxy compound or a water dispersion or aqueous solution thereof, including curing agents that can react with the cross-linking functional group in the polyhydric hydroxy compound, curing catalysts, solvents, pigments (such as extender pigments, colored pigments and metallic pigments), ultraviolet absorbers, photostabilizers, radical stabilizers, yellowing inhibitors that suppress coloration during the baking process, coating surface modifiers, fluidity modifiers, pigment dispersants, antifoaming agents, thickeners, and film formation assistants. Subsequently, the blocked isocyanate composition described above or a water dispersion thereof is added as a curing agent, and water or a solvent is added if required to adjust the viscosity. By subsequently stirring the mixture vigorously with a stirrer, a water-based coating material composition (aqueous coating material composition) can be obtained.

When producing a solvent-based coating material composition, first, additives may be added as necessary to the polyhydric hydroxy compound or a solvent-diluted product thereof, including curing agents that can react with the cross-linking functional group in the polyhydric hydroxy compound, curing catalysts, solvents, pigments (such as extender pigments, colored pigments and metallic pigments), ultraviolet absorbers, photostabilizers, radical stabilizers, yellowing inhibitors that suppress coloration during the baking process, coating surface modifiers, fluidity modifiers, pigment dispersants, antifoaming agents, thickeners, and film formation assistants. Subsequently, the blocked isocyanate composition described above is added as a curing agent, and additional solvent is added if required to adjust the viscosity. By subsequently stirring the mixture with a stirrer such as a hand stirrer or a Mazelar, a solvent-based coating material composition can be obtained.

<<Coating Film>>

A coating film of an embodiment of the present invention is obtained by curing the coating material composition described above.

The coating film of this embodiment can be obtained by applying the coating material composition described above using a conventional method such as a roll coating, curtain flow coating, spray coating, bell coating or electrostatic coating method, and then performing curing at a temperature of at least 60° C. but not more than 160° C. for a period of about several minutes to several hours. The coating film of this embodiment exhibits favorable low-temperature curability, hardness retention and water resistance.

<<Article>>

An article of an embodiment of the present invention contains a resin substrate having a melting point of not more than 120° C., and a coating film obtained by curing the coating material composition described above on the resin substrate.

Resin substrates having a melting point of not more than 120° C. undergo deformation and shrinkage when heat of high temperatures of 100° C. or higher is applied. The coating material composition described above exhibits satisfactory curability even at low temperatures of 90° C. or lower, and therefore an article of this embodiment of the present invention can be produced without causing deformation or shrinkage of the resin substrate. Further, as illustrated in the examples below, the article of this embodiment exhibits excellent adhesion between the resin substrate and the coating film.

Further, the lower limit for the melting point of the resin substrate means that, for example, substrates having a melting point of 60° C. may be used.

Examples of resin substrates that may be used include substrates formed from polyethylene (PE), polypropylene (PP), polystyrene (PS), AS resins, ABS resins, polyvinyl chloride (PVC), acrylic resins, methacrylic resins (PMMA), urea resins, melamine resins, urethane resins, polycarbonate (PC), modified polyphenylene ether (mPPE), polyamide, polyacetal, polybutylene terephthalate, and polyethylene terephthalate.

<<Adhesive Composition>>

An adhesive composition of an embodiment of the present invention contains the blocked polyisocyanate composition described above (hereafter sometimes referred to as the "blocked polyisocyanate component").

By including the blocked polyisocyanate obtained from a polyisocyanate and the compound (1) as a crosslinking agent component, the adhesive composition of this embodiment is able to exhibit excellent adhesion with adherends and excellent adhesion following a humidity and heat resistance test, as illustrated in the examples below.

Although there are no particular limitations, the adhesive composition of this embodiment may also include, besides the blocked polyisocyanate composition described above, other additives such as active hydrogen group-containing compounds, other crosslinking agent components, a binder resin component, surfactants, and solvents and the like.

Examples of the active hydrogen group-containing compounds include the same compounds as those described above in the section relating to the "blocked polyisocyanate composition".

[Other Crosslinking Agent Components]

There are no particular limitations on other crosslinking agent components that may be used, provided they are typical crosslinking agents capable of crosslinking with at least a carboxyl group or hydroxyl group. Examples of crosslinking agent that are capable of crosslinking with a carboxyl group include carbodiimide group-containing compounds, oxazoline group-containing compounds, and epoxy group-containing compounds. Examples of crosslinking agent that are capable of crosslinking with a hydroxyl group include melamine compounds and the like. Among the various possibilities, from the viewpoints of the water resistance, adhesion to the base coating film, and ease of availability and the like, preferred compounds for the other crosslinking agent component include carbodiimide group-containing compounds, oxazoline group-containing compounds, and melamine compounds. From the viewpoint of achieving a high level of water resistance when used in combination with the blocked polyisocyanate component, a carbodiimide group-containing compound or oxazoline group-containing compound is particularly preferred.

(Carbodiimide Group-Containing Compounds)

Carbodiimide group-containing compounds are compounds having at least one carbodiimide group (—N═C═N—) in a single molecule, and are obtained by a decarboxylation reaction of isocyanate groups within a polyisocyanate compound. Examples of commercially available carbodiimide group-containing compounds include the products CARBODILITE V-02, CARBODILITE V-02-L2, CARBODILITE V-04, CARBODILITE E-01 and CARBODILITE E-02 manufactured by Nisshinbo Inc.

(Oxazoline Group-Containing Compounds)

Examples of the oxazoline group-containing compounds include polymer compounds having at least two oxazoline groups on side chains, and monomer compounds having at least two oxazoline groups in a single molecule. Examples of commercially available oxazoline group-containing compounds include the product EPOCROS WS-500 (manufactured by Nippon Shokubai Co., Ltd.).

(Epoxy Group-Containing Compounds)

The epoxy group-containing compounds may be any compounds having two or more epoxy groups in a single molecule. Specific examples of these epoxy group-containing compounds include bisphenol epoxy group-containing compounds obtained by adding epichlorohydrin to bisphenol, novolac epoxy group-containing compounds obtained by adding epichlorohydrin to a phenol novolac resin, and polyethylene glycol diglycidyl ether. If required, these epoxy group-containing compounds may be used in the form of water dispersions.

(Melamine Compounds)

Examples of the melamine compounds include partially or completely methylolated melamine compounds obtained by reacting melamine with an aldehyde. Examples of the aldehyde include formaldehyde and para-formaldehyde. Further, compounds in which the methylol groups of these partially or completely methylolated melamine compounds have been partially or completely etherified with an alcohol may also be used. Examples of the alcohol used in the etherification include methanol, ethanol, n-propanol, isopropanol, n-butanol, isobutanol, 2-ethylbutanol, and 2-ethylhexanol.

Specific examples of melamine resins include the products CYMEL 303, CYMEL 323, CYMEL 325, CYMEL 327, CYMEL 350, CYMEL 370, CYMEL 380, CYMEL 385, CYMEL 212, CYMEL 251, CYMEL 254, and MYCOAT 776 manufactured by Nihon Cytec Industries Inc.

[Binder Resin Component]

The adhesive composition of this embodiment of the present invention may also include a binder resin component that functions as a reaction partner for the above crosslinking agent component, thereby forming crosslinked structures on the surface of, or within the interior of, the adhesive layer (easy adhesion treated layer) formed upon applying the adhesive composition to the surface of an adherend. The binder resin component is preferably a polyester resin, acrylic resin, polyurethane resin or polycarbonate resin, is more preferably a polyester resin, polyurethane resin or polycarbonate resin, and is even more preferably a polyester resin or a polycarbonate resin. One of these binder resin components may be used alone, or a combination of two or more such components may be used. Further, from the viewpoint of environmental issues, the adhesive composition is preferably water-based, and therefore the other crosslinking agent component and the binder resin component are preferably both water-dispersible.

(Polyester Resin)

There are no particular limitations on the polyester resin, and examples include products obtained from a condensation reaction between a single dibasic acid or a mixture of dibasic acids, and a single polyhydric alcohol or a mixture of polyhydric alcohols.

There are no particular limitations on the dibasic acid, and examples include at least one dibasic acid selected from the group consisting of carboxylic acids such as succinic acid, adipic acid, sebacic acid, dimer acid, maleic anhydride, phthalic anhydride, isophthalic acid and terephthalic acid.

There are no particular limitations on the polyhydric alcohol, and examples include at least one polyhydric alcohol selected from the group consisting of ethylene glycol, propylene glycol, diethylene glycol, neopentyl glycol, trimethylolpropane and glycerol.

Examples of other polyhydric alcohols that may be used include non-saccharides, sugar alcohol-based compounds, monosaccharides, disaccharides, trisaccharides, and tetrasaccharides and the like. Examples of the non-saccharides include diglycerol, ditrimethylolpropane, pentaerythritol, and dipentaerythritol. Examples of the sugar alcohol-based compounds include erythritol, D-threitol, L-arabinitol, ribitol, xylitol, sorbitol, mannitol, galactitol, and rhamnitol. Examples of the monosaccharides include arabinose, ribose, xylose, glucose, mannose, galactose, fructose, sorbose, rhamnose, fucose, and ribodesose. Examples of the disaccharides include trehalose, sucrose, maltose, cellobiose, gentiobiose, lactose, melibiose. Examples of the trisaccharides include raffinose, gentianose, and melezitose. Examples of the tetrasaccharides include stachyose and the like.

When reacting the dibasic acid and the polyhydric alcohol, it is preferable that the reaction is conducted with the hydroxyl groups of the polyhydric alcohol in excess relative to the carboxyl groups of the dibasic acid, thereby ensuring hydroxyl groups are retained in the final polyester resin.

Further, in those cases where the polyester resin is to be dispersed in water for use, a hydrophilic functional group is typically introduced into the polyester resin. Examples of the hydrophilic group include a carbonyl group and a sulfonyl group, and from the viewpoint of adhesion, a carbonyl group is preferred.

(Acrylic Resin)

There are no particular limitations on the acrylic resin, and examples include resin obtained, for example, by copolymerizing a single ethylenic unsaturated bond-containing monomer having a hydroxyl group, or a mixture of such monomers, with a single ethylenic unsaturated bond-containing monomer capable of copolymerization with the above monomer, or a mixture of such copolymerizable monomers.

Examples of the ethylenic unsaturated bond-containing monomer having a hydroxyl group and the other ethylenic unsaturated bond-containing monomer capable of copolymerization with the ethylenic unsaturated bond-containing monomer having a hydroxyl group include the same compounds as those mentioned above in the section related to "acrylic polyols".

(Polyurethane Resin)

There are no particular limitations on the polyurethane resin, which may be obtained, for example, by reacting a polyol having no carboxyl group with an isocyanate component using a typical method. Alternatively, a resin obtained by neutralizing a polyurethane polyol having a carboxyl group with a basic substance may also be used.

Examples of the polyol having no carboxyl group include compounds of low-molecular weight such as ethylene glycol and propylene glycol. Further, examples of compounds of high-molecular weight include acrylic polyols, polyester polyols, and polyether polyols.

When reacting the polyol and the polyisocyanate, it is preferable that the reaction is conducted with the hydroxyl groups of the polyol in excess relative to the isocyanate groups of the polyisocyanate, thereby ensuring hydroxyl groups are retained in the final polyurethane resin.

Examples of commercially available polyurethane polyols include the products SUPERFLEX series 110, SUPERFLEX series 150 and SUPERFLEX series 460S manufactured by DKS Co., Ltd., and the products NeoRez R9649 and NeoRez R966 manufactured by Avecia Ltd.

(Polycarbonate Resin)

There are no particular limitations on the polycarbonate resin, and examples include low-molecular weight carbonate compounds, or compounds obtained by the polycondensation of such low-molecular weight carbonate compounds.

Examples of the low-molecular weight carbonate compounds include dialkyl carbonates, alkylene carbonates, and diaryl carbonates.

Examples of the dialkyl carbonates include dimethyl carbonate and the like.

Examples of the alkylene carbonates include ethylene carbonate and the like.

Examples of the diaryl carbonates include diphenyl carbonate and the like.

In the adhesive composition of this embodiment, the hydroxyl value per resin of the binder resin is preferably at least 10 mgKOH/g resin, but not more than 300 mgKOH/g resin. By ensuring that the hydroxyl value per resin is at least as high as the above lower limit, any reduction in the adhesion to various adherends can be more effectively prevented, and the physical properties targeted by this embodiment of the present invention tend to be more easily achievable. On the other hand, by ensuring that the hydroxyl value per resin is not more than above upper limit, any excessive increase in the crosslinking density can be more effectively suppressed, and the smoothness of the easy adhesion treated layer formed from the adhesive composition of this embodiment can be maintained.

The acid value per polyol resin is preferably at least 5 mgKOH/g resin but not more than 150 mgKOH/g resin, more preferably at least 8 mgKOH/g resin but not more than 120 mgKOH/g resin, and even more preferably at least 10 mgKOH/g resin but not more than 100 mgKOH/g resin. By ensuring that the acid value is at least as high as the above lower limit, the water dispersibility of the adhesive composition of this embodiment tends to be able to be better maintained, whereas by ensuring that the acid value per resin is not more than above upper limit, any decrease in the humidity and heat resistance of the easy adhesion treated laminate obtained using the adhesive composition of this embodiment tends to be able to be more effectively prevented.

The mass ratio of the crosslinking agent component relative to the binder resin component is preferably at least 5/95 but not more than 95/5, more preferably at least 7/93 but not more than 75/25, even more preferably at least 10/90 but not more than 50/50, and particularly preferably at least 10/90 but not more than 30/70.

[Surfactants]

Examples of the surfactants include anionic surfactants and nonionic surfactants.

Examples of the anionic surfactants include aliphatic soaps, rosin acid soaps, alkyl sulfonates, dialkyl aryl sulfonates, alkyl sulfosuccinates, polyoxyethylene alkyl sulfates, and polyoxyethylene alkyl aryl sulfates.

Examples of the nonionic surfactants include polyoxyethylene alkyl ethers, polyoxyethylene alkyl aryl ethers, and polyoxyethylene oxypropylene block copolymers.

[Solvents]

Examples of the solvents include hydrocarbons such as benzene, toluene, xylene, cyclohexane, mineral spirit and naphtha, and ketones such as acetone methyl ethyl ketone and methyl isobutyl ketone, and one or more solvents may be selected from among these solvents in accordance with the intended purpose and application.

Further, solvents that exhibit a tendency toward miscibility with water may also be used as the solvent, and specific examples of such solvents include diethylene glycol dimethyl ether, diethylene glycol diethyl ether, propylene glycol monomethyl ether acetate, propylene glycol monomethyl ether, propylene glycol dimethyl ether, dipropylene glycol dimethyl ether, isobutanol, butyl alcohol, N-methylpyrrolidone, butyl diglycol, and butyl diglycol acetate.

One of these solvents may be used alone, or a combination of two or more solvents may be used.

Among these solvents, a solvent that exhibits a tendency toward miscibility with water is preferred, and diethylene glycol dimethyl ether, diethylene glycol diethyl ether, propylene glycol dimethyl ether, dipropylene glycol dimethyl ether, N-methylpyrrolidone or butyl diglycol is preferred, and diethylene glycol dimethyl ether, diethylene glycol diethyl ether, propylene glycol dimethyl ether, or dipropylene glycol dimethyl ether is more preferred.

Some solvents themselves can sometimes undergo hydrolysis during storage, and therefore the adhesive composition of this embodiment of the present invention preferably contains substantially no ester-based solvents. Examples of these ester-based solvents include ethyl acetate, n-butyl acetate, cellosolve acetate, and methoxypropyl acetate. Here, the expression "contains substantially no ester-based solvents" means that either the composition contains absolutely no ester-based solvents, or contains only a very small amount of ester-based solvent so that even if hydrolysis occurs during storage, there are no adverse effects on the adhesive composition of this embodiment.

<Method for Producing Adhesive Composition>

The adhesive composition of this embodiment can be obtained by mixing the blocked polyisocyanate composition described above with other additives as required, including the active hydrogen group-containing compound described above, the other crosslinking agent component described above, the binder resin component described above, and the surfactants and solvents described above.

Furthermore, the adhesive composition may also be obtained by mixing these other additives during the production of the blocked polyisocyanate composition by the blocking reaction using the polyisocyanate and the blocking agent, Furthermore, in terms of the workability when applying the adhesive composition to an adherend, and the ease of thin film formation, the adhesive composition of this embodiment of the present invention may be used in the form of a coating material composition that has been diluted with any of various dilution media such as water or an organic solvent. Of the various possibilities, from the viewpoint of global environmental protection, water is preferred as the dilution medium.

The amount of organic solvent used in the dilution medium is preferably not more than 30% by mass, more preferably not more than 20% by mass, even more preferably not more than 10% by mass, and is particularly preferably 0% by mass, namely the case where the dilution medium contains only water.

The solid fraction concentration of the total binder resin component in the coating material composition is preferably at least 1% by mass but not more than 30% by mass, and more preferably at least 2% by mass but not more than 20% by mass.

<Usage Applications for Adhesive Composition>

Examples of fields in which the adhesive composition of this embodiment may be used include automobiles, construction materials, household electrical appliances, carpentry, and laminates for solar cells. In particular, optical members for liquid crystal displays and the like for household electrical appliances such as televisions, computers, digital cameras and cell phones require a variety of functions, meaning various adherends must be laminated together. Because satisfactory adhesion is required between the various adherends, the adhesive composition of this embodiment of the present invention can be used favorably for forming the adhesive layers that exist between the various adherends.

[Adherends]

Examples of adherends that may be used as the coating target material for the adhesive composition of an embodiment of the present invention include glass, various metals, porous members, members having a various coatings, cured products of sealing materials, rubbers, leathers, fibers, non-woven fabrics, films and plates of resins, ultraviolet-curable acrylic resin layers, and layers formed from inks. Examples of the various metals include aluminum, iron, galvanized steel plate, copper, and stainless steel. Examples of the porous members include wood, paper, mortar, and stone and the like. Examples of the various coatings mentioned above include fluorine coatings, urethane coatings, and acrylic urethane coatings. Examples of the cured products of sealing materials include silicone-based products, modified silicone-based products, and urethane-based products. Examples of the rubbers include natural rubbers and synthetic rubbers. Examples of the leathers include natural leathers and artificial leathers. Examples of the fibers include plant-based fibers, animal-based fibers, carbon fiber, and glass fiber. Examples of the resins used as the raw materials for the films and plates of resins include polyvinyl chlorides, polyesters, acrylics, polycarbonates, triacetyl cellulose, and polyolefins. Examples of the inks includes printing inks and UV inks. Among the various adherends, films and plates of resins, or ultraviolet-curable acrylic resin layers are preferred. The resin used as the raw material for the film or plate of resin is preferably a polyester, acrylic, polycarbonate, triacetyl cellulose or polyolefin.

<<Easy Adhesion Treated Laminate>>

An easy adhesion treated laminate of an embodiment of the present invention contains an adherend, and an easy adhesion treated layer formed by applying the adhesive composition according to the embodiment described above to the adherend.

As illustrated in the examples below, by including the easy adhesion treated layer formed from the above adhesive composition, the easy adhesion treated laminate of this embodiment exhibits excellent adhesion to the adherend and excellent adhesion following a humidity and heat resistance test.

<Adherend>

Examples of the adherend include the same adherends as those described above in the section relating to the "adherend" of the "adhesive composition". Among the various adherends, a film or plate of a resin, or an ultraviolet-curable acrylic resin layer is preferred. The resin used as the raw material for the film or plate of a resin is preferably a polyester, acrylic, polycarbonate, triacetyl cellulose or polyolefin, and is more preferably a polyester.

In those cases where the adherend is a polyester film or a polyester plate, examples of the polyester resin that functions as the raw material for the polyester film or polyester plate include polyethylene terephthalate, polypropylene terephthalate, polybutylene terephthalate, polyethylene naphthalate, polymethylene terephthalate, and polyester resins obtained by copolymerizing these polyester resins with other copolymerizable components.

Examples of the copolymerizable components include diol components and dicarboxylic acid components. Examples of the diol components include diethylene glycol, neopentyl glycol and polyalkylene glycols. Examples of the dicarboxylic acid components include adipic acid, sebacic acid, phthalic acid, isophthalic acid, and 2,6-naphthalanedicarboxylic acid.

Among these options, the polyester resin that functions as the raw material for the polyester film or polyester plate is preferably at least one resin selected from the group consisting of polyethylene terephthalate, polypropylene terephthalate, polybutylene terephthalate and polyethylene naphthalate. Moreover, of these resins, in terms of the balance between physical properties and cost, the polyester resin that functions as the raw material for the polyester film or polyester plate is most preferably polyethylene terephthalate.

Furthermore, the chemical resistance, heat resistance, and mechanical strength and the like of these polyester films or polyester plates can be improved by biaxial stretching.

Further, if required, various additives may be included in the polyester resin. Examples of these additives include antioxidants, organic lubricants, antistatic agents, ultraviolet absorbers and surfactants.

In order to achieve the strength required for use as an optical member, the thickness of the polyester film is preferably at least 10 µm but not more than 400 µm, more preferably at least 20 µm but not more than 300 µm, and even more preferably at least 30 µm but not more than 200 µm.

Further, the thickness of the polyester plate, although not particularly limited, is preferably at least 1 mm but not more than 10 mm, more preferably at least 2 mm but not more than 8 mm, and even more preferably at least 3 mm but not more than 5 mm.

In this description, films and plates are distinguished based on thickness, with items having a thickness of 500 µm or less being defined as films, and items having a thickness exceeding 500 being defined as plates.

Furthermore, in this description, the "thickness of a polyester film" and the "thickness of a polyester plate" means the thickness of the entire polyester film or polyester plate, and for example, the thickness of a polyester film or polyester plate composed of a plurality of layers means the total thickness of all of the layers that constitute the polyester film or polyester plate.

<Easy Adhesion Treated Layer>

An easy adhesion treated layer is a layer formed by applying the adhesive composition described above (namely, an adhesive layer).

Although there are no particular limitations on the thickness of the easy adhesion treated layer, the thickness is preferably at least 0.01 µm but not more than 1 µm, more preferably at least 0.02 µm but not more than 0.5 µm, and even more preferably at east 0.04 µm but not more than 0.3 µm.

In this description, the "thickness of the easy adhesion treated layer" means the thickness of the entire easy adhesion treated layer, and for example, the thickness of an easy adhesion treated layer composed of a plurality of layers means the total thickness of all of the layers that constitute the easy adhesion treated layer.

<Method for Producing Easy Adhesion Treated Laminate>

A method for producing an easy adhesion treated laminate according to an embodiment of the present invention is described below.

The method for producing an easy adhesion treated laminate is, for example, a method that includes a step of coating the adhesive composition described above onto at least one surface of a first adherend to form an easy adhesion treated layer (hereafter sometimes referred to as the "coating step"). In the coating step, the easy adhesion treated layer is formed by applying the adhesive composition, drying the composition at a temperature of at least 80° C. but not more than about 100° C. for a period of at least 10 seconds but not more than about 60 seconds, and subsequently performing a heat treatment at a temperature of at least 150° C. but not more than about 250° C. for a short period of at least 30 seconds but not more than about 5 minutes. The adhesive composition is able to exhibit excellent adhesion to adherend and excellent adhesion following a humidity and heat resistance test, even when subjected to this type of short heat treatment.

The method for producing an easy adhesion treated laminate of this embodiment may also include, following the above coating step, a step of affixing the surface of the first adherend on which the easy adhesion treated layer has been formed to a second adherend (hereafter sometimes referred to as the "affixing step"), followed by a step of heating and bonding the easy adhesion treated laminate obtained by affixing the first adherend and the second adherend together via the easy adhesion treated layer (hereafter sometimes referred to as the "bonding step").

Further, in those cases where the easy adhesion treated laminate of an embodiment of the present invention is used as a laminate film for an optical member, the method for producing the easy adhesion treated laminate of this embodiment may be a method that includes, for example, the coating step, the bonding step and the affixing step, in that sequence. In other words, a method in which the adhesive composition is first coated onto the first adherend such as a polyester film to form the easy adhesion treated layer, and then following heating and bonding, the surface of the first adherend on which the easy adhesion treated layer has been formed is affixed to the second adherend.

Furthermore, in those cases where the easy adhesion treated laminate of an embodiment of the present invention is used as a laminate film for an optical member, the method for producing the easy adhesion treated laminate of this embodiment may be a method that, for example, includes a first coating step, a second coating step, and a bonding step, in that sequence. In other words, a method in which the adhesive composition described above is first coated onto a first adherend such as a polyester film to form a first easy adhesion treated layer, the adhesive composition is then coated onto either the surface of the first adherend on which the first easy adhesion treated layer has been formed or the opposite surface to form a second easy adhesion treated layer, and the first adherend and a second adherend are then affixed together via either the first easy adhesion treated layer or the second easy adhesion treated layer.

The adhesive composition described above can be use favorably in either of these methods.

In the easy adhesion treated laminate of an embodiment of the present invention, the adhesive composition mentioned above may be used, for example, as a coating material composition that has been diluted with any of various dilution media such as water or organic solvents, and may contain various additives as required.

Examples of the various additives include fillers, surfactants, antifoaming agents, preservatives and antistatic agents.

The fillers may be either inorganic particles or organic particles. Examples of the inorganic particles include silica and talc. Examples of the organic particles include acrylic-based polymer particles, urethane-based polymer particles, and polyester-based polymer particles.

Conventional methods may be used as the method for coating the adhesive composition or the coating material composition containing the adhesive composition onto the adherend. Specific examples of the coating method include roll coating methods, gravure coating methods, roll brushing methods, spray coating methods, air knife coating methods, and curtain coating methods. One of these methods may be used alone, or a combination of two or more methods may be used.

As illustrated in the examples below, by using the aforementioned adhesive composition containing the blocked polyisocyanate composition described above as the adhesive composition for forming an easy adhesion treated layer on a polyester plate, an easy adhesion treated polyester plate having dramatically improved adhesion to the adherend and adhesion following a humidity and heat resistance test can be obtained.

<<Multilayer Coating Film Laminate>>

A multilayer coating film laminate of an embodiment of the present invention is formed by laminating a plurality of coating films onto a substrate. Among this plurality of coating films, at least one coating film is formed by curing a water-based coating material composition containing the blocked polyisocyanate composition described above (hereafter sometimes referred to as the "blocked polyisocyanate component") as a curing agent.

By adopting the structure described above, the multilayer coating film laminate of this embodiment is able to exhibit excellent low-temperature curability of the coating film within the multilayer coating film laminate, even at low temperatures of 80° C. or lower. Further, the water-based coating material composition used in the multilayer coating film laminate of this embodiment has excellent storage stability (water dispersion stability, viscosity stability and hardness retention when used as a coating film), and therefore even after storage for a certain period, is able to form a multilayer coating film laminate having excellent adhesion and water resistance similar to that obtained using a material composition immediately following production.

<<Method for Forming Coating Film>>

A method for forming a coating film of an embodiment of the present invention is a method for sequentially forming a plurality of coating films on a substrate using a wet-on-wet process.

The method for forming a coating film of this embodiment includes the steps described below.

A step 1 of applying a primer coating material composition to a substrate to form an uncured primer coating film:

a step 2 of coating the water-based coating material composition described above onto the uncured primary coating film to form a coating film of the uncured water-based coating material composition (hereafter sometimes referred to as the "basecoat coating film"):

a step 3 of coating a clear coating material composition onto the basecoat coating film to form an uncured clear coating film: and a step 4 of heating the multilayer coating film laminate composed of the substrate, the uncured primer coating film, the basecoat coating film and the uncured clear coating film laminated in that sequence, thereby curing the multilayer coating film.

If necessary, step 1 and step 3 may be omitted. Each step is described below in further detail.

<Step 1>

In step 1, a primer coating material composition is applied to a substrate to form an uncured primer coating film.

Examples of the primer coating material composition include conventional intermediate coating materials and plastic primers. The primer coating material composition may contain, for example, film-forming resins, crosslinking agents, colored pigments, extender pigments, luminescent pigments, and solvents and the like, and depending on need, may also contain coating material additives such as ultraviolet absorbers, photostabilizers, curing catalysts, plasticizers, adhesion imparting agents, compatibilizers, antifoaming agents, thickeners, rustproofing agents, surface modifiers and conductive agents. Examples of the film-forming resins include acrylic resins, polyester resins, alkyd resins, urethane resins, polyolefin resins, and arbitrary combinations of these resins, wherein the film-forming resin preferably contains hydroxyl groups.

The primer coating material composition can be converted to a crosslinked form by adding a crosslinking agent, or alternatively, the composition may be used in a substantially non-crosslinked form with no added crosslinking agent. Furthermore, a permeated crosslinked form formed as a result of the permeation of a crosslinking agent contained in an upper layer coating film from the primer coating film is also possible. Examples of the crosslinking agent include melamine resins, polyisocyanate compounds, and blocked polyisocyanate compounds.

The primer coating material composition may be an organic solvent-based coating material or a water-based coating material, but a water-based coating material is preferred. The primer coating material composition can be applied by a conventional method such as air spray coating, airless spray coating, or rotary spray coating, and an electrostatic charge may be applied during coating.

From the viewpoints of improving the smoothness and clarity of the formed multilayer coating film, and suppressing the occurrence of blistering, the uncured primer coating film obtained following coating may be subjected to preheating (preliminary drying) or air blowing or the like under heating conditions which cause no substantial curing of the coating film. Here, "blistering" means pinholes or bubble marks formed in the coating film surface during baking of the coating film.

In this description, a "cured coating film" means a coating film in a "cured and dried" state as prescribed in JIS K 5600-1-1:1999, namely, a state in which no fingerprint indentations are formed in the coating surface when the center of the coating surface is squeezed firmly between the thumb and forefinger, no movement of the coating film can be detected, and no rub marks are formed in the coating surface when a fingertip is repeatedly rubbed rapidly across the center of the coating surface. On the other hand, in this description, an "uncured coating film" means a coating film in a state that has not yet reached the aforementioned cured and dried state, and includes the "dry to touch" and "semi-cured and dried" states prescribed in JIS K 5600-1-1:1999.

By subjecting the uncured primer coating film obtained following coating to preheating or air blowing or the like, the solid fraction concentration of the coating film can be adjusted, typically to a value of at least about 60% by mass but not more than about 100% by mass, preferably a value of at least about 80% by mass but not more than about 100% by mass, and even more preferably a value of at least about 90% by mass but not more than about 100% by mass.

The temperature during preheating is preferably at least about 40° C. but not more than about 100° C., more preferably at least about 50° C. but not more than about 90° C., and even more preferably at least about 60° C. but not more than about 80° C. The preheating time is preferably at least about 30 seconds but not more than about 15 minutes, more preferably at least about 1 minute but not more than about 10 minutes, and even more preferably at least about 2 minutes but not more than about 5 minutes.

Air blowing is typically performed by blowing air at normal temperature (25° C.) or air that has been heated to a temperature of at least about 25° C. but not more than about 80° C. onto the coating surface of the coated material for a period of at least about 30 seconds but not more than about 15 minutes.

The film thickness of the primer coating film obtained upon curing of the primer coating material composition is typically at least about 3 µm but not more than about 40 µm, preferably at least about 5 µm but not more than about 30 µm, and more preferably at least about 7 µm but not more than about 20 µm.

<Step 2>

In step 2, the water-based coating material composition described above is coated onto the uncured primary coating film obtained in step 1 to form an uncured basecoat coating film. In those cases where step 1 is omitted, the water-based coating material composition is coated onto the substrate as a primer coating material to form an uncured basecoat coating film.

The water-based coating material composition can be applied to the coating target material using a conventional method such as air spray coating, airless spray coating, rotary spray coating or curtain coating, and of these methods, air spray coating or rotary spray coating is preferred. Further, an electrostatic charge may be applied during coating.

From the viewpoint of preventing the occurrence of coating film defects such as blistering, the uncured basecoat coating film obtained following coating is preferably subjected to preheating or air blowing or the like under heating conditions which cause no substantial curing of the coating film.

Examples of the conditions for the preheating or air blowing include the same conditions as those described above in the section relating to "step 1".

The film thickness of the basecoat coating film obtained upon curing of the above water-based coating material composition is typically at least about 3 µm but not more than about 50 µm, preferably at least about 5 µm but not more than 35 µm, and even more preferably at least about 10 µm but not more than about 20 µm.

<Step 3>

In step 3, a clear coating material is coated onto the uncured basecoat coating film obtained in step 2 to form an uncured clear coating film.

Examples of the clear coating material composition include conventional heat-curable clear coating material compositions used for coating automobile bodies, automobile components or household electrical appliances, and specific examples include organic solvent-based heat-curable coating materials, water-based heat-curable coating materials, heat-curable powdery coating materials, and heat-curable powder slurry coating materials and the like that contain a base resin having a crosslinkable functional group and a crosslinking agent. Among these, organic solvent-based heat-curable coating materials are preferred.

Examples of the crosslinkable functional group in the base resin include a carboxyl group, hydroxyl group, epoxy group, silanol group, alkoxysilyl group, and reactive unsaturated group.

Examples of the base resin include acrylic resins, polyester resins, alkyd resins, urethane resins, epoxy resins, and fluororesins.

Examples of the crosslinking agent include polyisocyanate compounds, blocked polyisocyanate compounds, melamine resins, urea resins, carboxyl group-containing compounds, carboxyl group-containing resins, epoxy group-containing resins, and epoxy group-containing compounds.

Examples of the combination of base resin and crosslinking agent used in the clear coating material composition include a combination of a carboxyl group-containing resin and an epoxy group-containing resin, a combination of a hydroxyl group-containing resin and a polyisocyanate compound, a combination of a hydroxyl group-containing resin and a blocked polyisocyanate compound, and a combination of a hydroxyl group-containing resin and a melamine resin.

Furthermore, the clear coating material composition may be a single-component composition, or a multi-component composition such as a two-component urethane resin coating material or the like. Among the various possibilities, in those cases where the clear coating material undergoes heat curing at a temperature of at least about 70° C. but less than about 120° C., the clear coating material is preferably a one-component urethane resin coating material containing a blocked polyisocyanate compound as the curing agent, or a two-component urethane resin coating material containing an unblocked polyisocyanate compound as the curing agent.

The clear coating material composition may contain colored pigments, luminescent pigments, or dyes or the like according to need, provided the transparency is not impaired, and may also contain suitable amounts of extender pigments, ultraviolet absorbers, photostabilizers, antifoaming agents, thickeners, rustproofing agents, and surface modifiers and the like.

The clear coating material composition can be applied to the uncured basecoat coating film of the coating target material composed of the substrate, the uncured primer coating film described above and the uncured basecoat coating film laminated in that sequence, using a conventional method such as air spray coating, airless spray coating or rotary spray coating, and an electrostatic charge may also be applied during coating.

Further, the uncured clear coating film may, if desired, be left to stand at room temperature for a period of at least about 1 minute but not more than about 60 minutes, or may be subjected to preheating by heating at a temperature of at least about 40° C. but not more than about 80° C. for a period of at least about 1 minute but not more than about 60 minutes.

The film thickness of the clear coating film obtained by curing the clear coating material composition is typically at least about 10 µm but not more than about 80 µm, preferably at least about 15 µm but not more than about 60 µm, and more preferably at least about 20 µm but not more than about 50 µm.

<Step 4>

In step 4, the multilayer coating film laminate composed of the substrate, the uncured primer coating film, the basecoat coating film and the uncured clear coating film laminated in that sequence is heated, thereby curing the multilayer coating film.

The uncured primer coating film, the basecoat coating film and the clear coating film may be cured, for example, using a typical coating film baking technique such as hot air heating, infrared heating or high-frequency heating.

From the viewpoints of energy conservation and the heat resistance of the substrate, the heating temperature is preferably at least about 70° C. but not more than about 120° C., more preferably at least about 70° C. but not more than about 110° C., and even more preferably at least about 80° C. but not more than about 100° C.

From the viewpoints of energy conservation and the heat resistance of the substrate, the heating time is preferably at least about 10 minutes but not more than about 60 minutes, and more preferably at least about 15 minutes but not more than about 40 minutes.

The heating described above enables the multilayer coating film to be cured in a single process.

(Substrate)

There are no particular limitations on the substrate, and examples include exterior plate components for automobile bodies such as passenger cars, trucks, motorbikes and buses; automobile components such as bumpers and the like; and exterior plate components for household electrical appliances such as mobile phones and audio equipment, and among these substrates, an exterior plate component for an automobile body or an automobile component is preferred.

There are no particular limitations on the material of the substrate, and examples include metal materials such as iron, aluminum, brass, copper, tin plate, stainless steel, galvanized steel, and zinc alloy (such as Zn—Al, Zn—Ni or Zn—Fe) plated steel; plastic materials, including resins such as polyethylene resins, polypropylene resins, acrylonitrile-butadiene-styrene (ABS) resins, polyamide resins, acrylic resins, vinylidene chloride resins, polycarbonate resins, polyurethane resins and epoxy resins, as well as various FRP materials; inorganic materials such as glass, cement and concrete; wood; and fibrous materials such as papers and fabrics, but among these, a metal material or a plastic material is preferred.

The substrate may also be a substrate in which the surface of an aforementioned metal material or the metal surface of a vehicle body or the like formed from an aforementioned metal material has been subjected to a surface treatment such as a phosphate treatment, a chromate treatment or a composite oxide treatment, or may be a substrate on which an additional coating film has then been formed.

The substrate on which a coating film has been formed may be a substrate in which a surface treatment has been performed as required, and an undercoat coating film has then been formed on the substrate, such as a vehicle body on which an undercoat coating film has been formed using an electrodeposition coating material.

The substrate may also be a substrate in which the surface of an aforementioned plastic material or the plastic surface of a vehicle component or the like formed from an aforementioned plastic material has been subjected to a desired surface treatment.

Furthermore, the substrate may also be composed of a combination of a plastic material and a metal material.

EXAMPLES

Embodiments of present invention are described below in further detail based on a series of examples and comparative examples, but the embodiments of the present invention are in no way limited by the following examples.

The units "parts" used in the examples and comparative examples represents mass-referenced values. Further, "%" in the examples and comparative examples represents "% by mass".

Examples 1-1 to 1-13, and Comparative Example 1-1

<Test Items>

The polyisocyanates obtained in the synthesis examples, the blocked polyisocyanate compositions produced in the examples and comparative example, the coating material compositions containing those blocked polyisocyanate compositions, and the coating films obtained from the coating material compositions were each subjected to measurement and evaluation of various physical properties in accordance with the methods described below.

[Physical Property 1-1] Isocyanate Group (NCO) Content of Polyisocyanate

First, 1 to 3 g of the polyisocyanate was weighed accurately into a conical flask (W g). Next, 20 mL of toluene was added, and the polyisocyanate was dissolved. Subsequently, 10 mL of a 2N toluene solution of di-n-butylamine was added, and following mixing, the mixture was left to stand for 15 minutes at room temperature. Next, 70 mL of isopropyl alcohol was added and mixed. The resulting liquid was then titrated with a 1N hydrochloric acid solution (factor F) using an indicator. The thus obtained titer was deemed V2 mL. Subsequently, the same operation was repeated without the polyisocyanate, and the obtained titer was deemed V1 mL. The formula (1) shown below was then used to calculate the isocyanate group (NCO) content of the polyisocyanate.

$$\text{NCO content [\% by mass]} = (V1-V2) \times F \times 42/(W \times 1000) \times 100 \tag{1}$$

[Physical Property 1-2] Number Average Molecular Weight (Mn) of Polyisocyanate

Using the polyisocyanate as a sample, the number average molecular weight (Mn) of the polyisocyanate was determined as the polystyrene-equivalent number average molecular weight by performing measurement by gel permeation chromatography (GPC) using the apparatus and conditions described below.

(Measurement Conditions)

Apparatus: HLC-802A (manufactured by Tosoh Corporation)

Columns: 1×G1000HXL (manufactured by Tosoh Corporation), 1×G2000HXL (manufactured by Tosoh Corporation), and 1×G3000HXL (manufactured by Tosoh Corporation)

Carrier: tetrahydrofuran

Flow rate: 0.6 mL/minute

Sample concentration: 1.0% by mass

Injection volume: 20 μL

Temperature: 40° C.

Detection method: refractive index detector

[Physical Property 1-3] Average Isocyanate Number of Polyisocyanate

Using the polyisocyanate as a sample, the average isocyanate number was determined using formula (2) shown below.

$$\text{Average isocyanate number} = (\text{number average molecular weight (Mn) of polyisocyanate} \times \text{NCO content (\% by mass): } 0.01)/42 \tag{2}$$

[Physical Property 1-4] Solid Fraction Amount of Blocked Polyisocyanate Composition The solid fraction amount of the blocked polyisocyanate composition was determined in the following manner.

First, an aluminum dish with a base diameter of 38 mm was weighed accurately. About 1 g of the blocked polyisocyanate composition produced in the example or comparative example was then weighed accurately onto the aluminum dish (W1). Subsequently, the blocked polyisocyanate composition was adjusted to a uniform thickness. The blocked polyisocyanate composition mounted on the aluminum dish was then placed in a 105° C. oven for one hour. The aluminum dish was then returned to room temperature, and the blocked polyisocyanate composition remaining on the aluminum dish was weighed accurately (W2). The solid fraction amount (% by mass) of the blocked polyisocyanate composition was then calculated from formula (3) shown below.

$$\text{Solid fraction amount of blocked polyisocyanate composition [\% by mass]} = W2/W1 \times 100 \tag{3}$$

[Physical Property 1-5] Effective Isocyanate Group (NCO) Content of Blocked Polyisocyanate Composition The effective isocyanate group (NCO) content of the blocked polyisocyanate composition was determined in the following manner.

Here, the expression "effective isocyanate group (NCO) content" is a quantification of the amount of blocked isocyanate groups capable of participating in crosslinking reactions that exist within the blocked polyisocyanate composition following the blocking reaction, and is expressed as a % by mass value of the isocyanate groups.

The effective NCO content was calculated using formula (4) shown below. In formula (4), the "NCO content of the polyisocyanate" and the "solid fraction amount of the blocked polyisocyanate composition" used the values calculated above for the physical property 1-1 and the physical property 1-4 respectively. In those cases where the sample was diluted with a solvent or the like, the effective NCO content value was calculated in the diluted state.

Effective NCO Content [% by mass]=[(solid fraction amount of blocked polyisocyanate composition [% by mass])×{(mass of polyisocyanate used in blocking reaction)×(NCO content of polyisocyanate [% by mass])}]/(mass of blocked polyisocyanate composition following blocking reaction)   (4)

[Physical Property 1-6] Amount of Isocyanurate Trimer Blocked with Three Molecules of Blocking Agent in Blocked Polyisocyanate Composition Using the blocked polyisocyanate composition as a sample, and using the same method as that described for the number average molecular weight of the polyisocyanate determined above in "physical property 1-2", the blocked polyisocyanate composition was subjected to a GPC measurement. The obtained measurement results were then used to determine the ratio of the surface area for the isocyanurate trimer blocked with three molecules of the blocking agent relative to the surface area for the entire blocked polyisocyanate composition, and this ratio was deemed to represent the amount of the isocyanurate trimer blocked with three molecules of the blocking agent within the blocked polyisocyanate composition.

[Physical Property 1-7] a/(a+b+c+d+e+f)

Using a Biospin Avance 600 (product name) manufactured by Bruker Corporation, a $^{13}$C-NMR measurement was conducted under the conditions listed below, and the molar amounts of allophanate groups, isocyanurate groups, uretdione groups, iminooxadiazinedione groups, urethane groups and biuret groups in the blocked isocyanate composition were each determined.

(Measurement Conditions)
$^{13}$C-NMR apparatus: AVANCE 600 (manufactured by Bruker Corporation)
CryoProbe CPDUL 600S3-C/H-D-05Z (manufactured by Bruker Corporation)
Resonance frequency: 150 MHz
Concentration: 60 wt/vol %
Shift reference: CDCl$_3$ (77 ppm)
Accumulation number: 10,000
Pulse program: zgpg 30 (proton perfect decoupling method, waiting time: 2 sec)

Subsequently, based on the obtained measurement results, the following signal integral values were divided by the number of measured carbons, and the resulting values were used to determine the molar amount of each functional group.

Uretdione group: integral value near 157 ppm÷2
Iminooxadiazinedione group: integral value near 144 ppm÷1
Isocyanurate group: integral value near 148 ppm÷3
Allophanate group: integral value near 154 ppm÷1
Urethane group: integral value near 156.5 ppm÷1−allophanate group integral value Biuret group: integral value near 156 ppm÷2

Subsequently, the molar amounts determined for the allophanate groups, uretdione groups, iminooxadiazinedione groups, isocyanurate groups, urethane groups and biuret groups were labeled a, b, c, d, e and f respectively, and the ratio (a/a+b+c+d+e+f) of the molar amount of allophanate groups (a) relative to the total molar amount of allophanate groups, uretdione groups, iminooxadiazinedione groups, isocyanurate groups, urethane groups and biuret groups (a+b+c+d+e+f) was determined.

[Physical Property 1-8] Amount of Methane Tetracarbonyl Structures in Blocked Polyisocyanate Composition The amount of methane tetracarbonyl structures relative to the total molar amount within the blocked polyisocyanate composition of polyisocyanates having the compound (I) bonded thereto was calculated using the method described below.

Specifically, based on the results of an $^1$H-NMR measurement performed using an Avance 600 (product name) manufactured by Bruker BioSpin Corporation, the ratio of the molar amount of methane tetracarbonyl structures relative to the total molar amount of methane tetracarbonyl structures, the keto forms of methane tricarbonyl structures and the enol forms of methane tricarbonyl structures (methane tetracarbonyl structures/(methane tetracarbonyl structures+methane tricarbonyl structure keto forms+methane tricarbonyl structure enol forms)) was determined, and this ratio was deemed the amount of methane tetracarbonyl structures. The measurement conditions were as follows.

(Measurement Conditions)
Apparatus: Avance 600 (product name) manufactured by Bruker BioSpin Corporation
Solvent: deuterated chloroform
Accumulation number: 256
Sample concentration: 5.0% by mass
Chemical shift reference: tetramethylsilane was deemed 0 ppm Further, the signal integral values described below were divided by the number of measured carbons, and the resulting values were used to determine the molar amounts of the various structures.

NH protons of methane tetracarbonyl structure represented by general formula (II) shown below: near 8.0 ppm, integral value÷2

[Chemical formula 7]

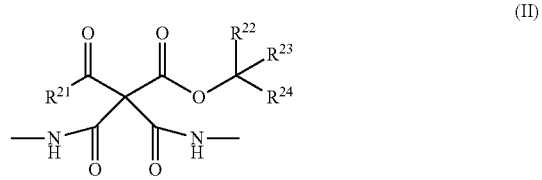

(II)

(In general formula (II), R$^{21}$, R$^{22}$, R$^{23}$ and R$^{24}$ are the same as R$^{11}$, R$^{12}$, R$^{13}$ and R$^{14}$ respectively described above.)

NH proton of keto form of methane tricarbonyl structure represented by general formula (III) shown below and enol form of methane tricarbonyl structure represented by general formula (IV) shown below: near 9.8 ppm, integral value÷1

[Chemical formula 8]

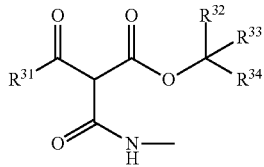

(III)

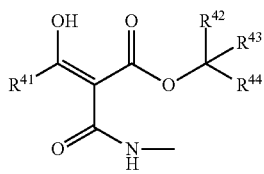

(IV)

(In general formula (III), $R^{31}$, $R^{32}$, $R^{33}$ and $R^{34}$ are the same as $R^{11}$, $R^{12}$, $R^{13}$ and $R^{14}$ respectively described above.

In general formula (IV), $R^{41}$, $R^{42}$, $R^{43}$ and $R^{44}$ are the same as $R^{11}$, $R^{12}$, $R^{13}$ and $R^{14}$ respectively described above.)

NH proton of enol form of methane tricarbonyl structure represented by general formula (V) shown below: near 7.3 ppm integral value÷1

[Chemical formula 9]

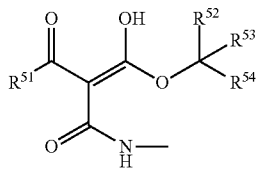

(V)

(In general formula (V), $R^{51}$, $R^{52}$, $R^{53}$ and $R^{54}$ are the same as $R^{11}$, $R^{12}$, $R^{13}$ and $R^{14}$ respectively described above.)

[Evaluation 1-1] Viscosity Stability of Coating Material Composition

An acrylic polyol (Setalux 1767 (product name) manufactured by Nuplex Resin Inc., resin fraction hydroxyl value: 150 mgKOH/g, resin fraction: 65%) was blended with each of the polyisocyanate compositions so as to achieve a ratio (isocyanate group/hydroxyl group) of the molar amount of isocyanate groups relative to the molar amount of hydroxyl groups of 0.8, and butyl acetate was then added to adjust the solid fraction to 40% by mass, thus obtaining a series of coating material compositions. Subsequently, 20 g of each of the thus obtained coating material compositions was subjected to an initial viscosity measurement, and then a measurement of the viscosity after storage in a 20 mL glass vial at 40° C. for 10 days (viscometer: RE-85R manufactured by Toki Sangyo Co., Ltd.). The change in the viscosity after storage relative to the initial viscosity was calculated, and the viscosity stability was evaluated against the following evaluation criteria.

(Evaluation Criteria)
OO: change in viscosity of less than ±30%
O: change in viscosity of at least ±30% but less than ±50%
Δ: change in viscosity of at least ±50%
x: a solid formed

[Evaluation 1-2] Low-Temperature Curability of Coating Film

Various coating material compositions were prepared using the same method as that described for "evaluation 1-1". Subsequently, each of the obtained coating material compositions was applied to a polypropylene plate in an amount sufficient to form a dried film thickness of 40 μm, and the applied composition was then heated and dried at 80° C. for 30 minutes, thus obtaining a cured coating film. The gel fraction of the obtained coating film was measured, and the low-temperature curability was evaluated against the following evaluation criteria. The gel fraction was determined by immersing the coating film in acetone at 23° C. for 24 hours, and was calculated as the value of the mass of the insoluble portion divided by the mass prior to immersion, expressed as a percentage (% by mass).

(Evaluation Criteria)
OO: gel fraction of at least 80% by mass
O: gel fraction of at least 60% by mass but less than 80% by mass
Δ: gel fraction of less than 60% by mass

[Evaluation 1-3] Hardness Retention of Coating Film

Various coating material compositions were prepared using the same method as that described for "evaluation 1-1". Subsequently, 20 g of each of the obtained coating material compositions was stored in a 20 mL glass vial at 40° C. for 10 days. The initially prepared coating material composition and the coating material composition following storage were each applied to a glass plate in an amount sufficient to generate a dried film thickness of 40 μm, and then heated and dried at 100° C. for 30 minutes, thus obtaining a cured coating film. The Konig hardness of the obtained coating film was measured, the ratio of the hardness following storage relative to the initial hardness (hardness following storage/initial hardness) was calculated, and the coating film hardness retention was evaluated against the following evaluation criteria.

(Evaluation Criteria)
OO: hardness following storage/initial hardness of less than 1.2
O: hardness following storage/initial hardness of at least 1.2 but less than 1.5
Δ: hardness following storage/initial hardness of 1.5 or greater

[Evaluation 1-4] Water Resistance of Coating Film

Various coating material compositions were prepared using the same method as that described for "evaluation 1-1". Subsequently, each of the obtained coating material compositions was applied to a glass plate in an amount sufficient to generate a dried film thickness of 40 μm, and was then heated and dried at 100° C. for 30 minutes, thus obtaining a cured coating film. The obtained coating film was immersed in water at 23° C., and after 24 hours, the external appearance of the coating film was inspected for the occurrence of coating film cloudiness or blistering, and the water resistance was evaluated against the following evaluation criteria.

(Evaluation Criteria)
OO: no occurrence of coating film cloudiness or blistering
O: some minor occurrence of coating film cloudiness or blistering
Δ: significant occurrence of coating film cloudiness or blistering

[Evaluation 1-5] Coating Film Adhesion

Various coating material compositions were prepared using the same method as that described for "evaluation 1-1". Subsequently, each of the obtained coating material compositions was applied to a substrate formed from an ABS resin (melting point: 110° C.) in an amount sufficient to generate a dried film thickness of 40 μm, and the applied coating was then heated at 80° C. for 30 minutes in the case of the examples, or at 100° C. for 30 minutes in the case of the comparative example, thus forming a cured coating film. Using a cutting guide with a spacing interval of 2 mm, the obtained coating film was then cut to a depth that only penetrated through the coating film layer to form 100 grid squares. A cellophane adhesive tape (No. 405 manufactured by Nichiban Co., Ltd., width: 24 mm) was then affixed to the grid-shaped cut surface and rubbed with an eraser to ensure complete adhesion. Subsequently, the cellophane adhesive tape was pulled rapidly from the substrate formed from the ABS resin at a peel angle of 180°. The peeled surface was then inspected, the number of peeled grid squares was counted, and the coating film adhesion was evaluated against the following evaluation criteria.

(Evaluation Criteria)

OO: number of peeled grid squares was 0

O: number of peeled grid squares was at least 1 but not more than 10

Δ: number of peeled grid squares was at least 11 but not more than 31 x: number of peeled grid squares was 31 or greater

<Synthesis of Polyisocyanates>

[Synthesis Example 1-1] Synthesis of Polyisocyanate P1-1

A four-neck flask fitted with a thermometer, a stirring blade and a reflux condenser was charged with 1,000 g of HDI and 33 g of trimethylolpropane under a stream of nitrogen, and the internal temperature of the flask was held at 70° C. while the contents were stirred. Tetramethylammonium hydroxide was then added to the flask, and when the yield reached 48%, phosphoric acid was added to halt the reaction. Following filtering of the reaction liquid, the unreacted HDI was removed using a thin-film distillation device, thus obtaining an isocyanurate polyisocyanate (hereafter sometimes referred to as the "polyisocyanate P1-1").

The NCO content of the obtained polyisocyanate P1-1 was 19.9% by mass, the number average molecular weight was 1,080, and the average isocyanate group number was 5.1.

[Synthesis Example 1-2] Synthesis of Polyisocyanate P1-2

A four-neck flask fitted with a thermometer, a stirring blade and a reflux condenser was charged with 800 g of HDI, 200 g of IPDI and 75 g of trimethylolpropane under a stream of nitrogen, and the internal temperature of the flask was held at 70° C. while the contents were stirred. Tetramethylammonium hydroxide was then added to the flask, and when the yield reached 46%, phosphoric acid was added to halt the reaction. Following filtering of the reaction liquid, the unreacted HDI and IPDI were removed using a thin-film distillation device, thus obtaining an isocyanurate polyisocyanate (hereafter sometimes referred to as the "polyisocyanate P1-2").

The NCO content of the obtained polyisocyanate P1-2 was 18.5% by mass, the number average molecular weight was 1,200, and the average isocyanate group number was 5.3.

[Synthesis Example 1-3] Synthesis of Polyisocyanate P1-3

A four-neck flask fitted with a thermometer, a stirring blade and a reflux condenser was charged with 1,000 g of HDI and 2 g of 2-ethylhexane-1,3-diol under a stream of nitrogen, and the internal temperature of the flask was held at 70° C. while the contents were stirred. Tetramethylammonium hydroxide was then added to the flask, and when the yield reached 40%, phosphoric acid was added to halt the reaction. Following filtering of the reaction liquid, the unreacted HDI was removed using a thin-film distillation device, thus obtaining an isocyanurate polyisocyanate (hereafter sometimes referred to as the "polyisocyanate P1-3").

The NCO content of the obtained polyisocyanate P1-3 was 21.8% by mass, the number average molecular weight was 655, and the average isocyanate group number was 3.4.

Production of Polyisocyanate Compositions

[Example 1-1] Production of Blocked Polyisocyanate Composition BL1-a1

A four-neck flask fitted with a thermometer, a stirring blade and a reflux condenser was charged, under a stream of nitrogen, with 100 g of the polyisocyanate P1-1 obtained in Synthesis Example 1-1, 98 g of diisopropyl malonate and 117 g of dipropylene glycol dimethyl ether (DPDM), 0.9 parts of a methanol solution containing sodium methylate (28% by mass) was then added at room temperature, and a blocking reaction was conducted at 40° C. for 4 hours, thus obtaining a blocked polyisocyanate composition BL1-a1. The obtained blocked polyisocyanate composition BL1-a1 had a solid fraction of 60% by mass, an effective NCO content of 6.3% by mass, an amount of isocyanurate trimer of 14% by mass, a value for a/(a+b+c+d+e+f) of 0.28, and an amount of methane tetracarbonyl structures of 3.1 mol %. Using the methods described above, each of the various evaluations was performed. The results are shown below in Table 1.

[Examples 1-2 to 1-13, and Comparative Example 1-1] Production of Blocked Polyisocyanate Compositions BL1-a2 to BL1-a13 and BL1-b1

With the exceptions of using the types and amounts of polyisocyanates and blocking agents and the amounts of solvent shown in Table 1, and adding 2-propanol following the blocking reaction at 40° C. for 4 hours and then stirring at 40° C. for one hour, the same method as that described for Example 1-1 was used to produce blocked polyisocyanate compositions BL1-a2 to BL1-a13 and BL1-b1.

The compositions, physical properties and evaluation results for the obtained blocked isocyanate compositions BL1-a1 to BL1-a13 and BL1-b1 are shown below in Table 1. The types of blocking agents shown in Table 1 are as follows.

(Blocking Agents)

B1-1: diisopropyl malonate
B1-2: di-sec-butyl malonate
B1-3: di-tert-butyl malonate
B1-4: tert-butylethyl malonate
B1-5: isopropylethyl malonate
B1-6: diethyl malonate
B1-7: isopropyl acetoacetate

[Examples 1-14 and 1-15, and Comparative Examples 1-2 and 1-3] Production of Blocked Polyisocyanate Compositions BL1-a14 and BL1-a15, and BL1-b2 and BL1-b3

With the exceptions of using the types and amounts of polyisocyanates and blocking agents, the amounts of solvent, the blocking reaction conditions, and the addition or otherwise of 2-propanol as shown in Table 1, the same method as that described for Example 1-1 was used to produce blocked polyisocyanate compositions BL1-a14 and BL1-a15, and BL1-b2 and BL1-b3.

The compositions, physical properties and evaluation results for the obtained blocked isocyanate compositions BL1-a14 and BL1-a15, and BL1-b2 and BL1-b3 are shown below in Table 1. In the case of the hardness stability of the coating film from "evaluation 1-3" for the composition BL1-b3, solid matter developed in the coating material composition following storage, and therefore no evaluation was performed.

TABLE 1

| | | Example 1-1 | Example 1-2 | Example 1-3 | Example 1-4 | Example 1-5 | Example 1-6 | Example 1-7 | Example 1-8 | Example 1-9 |
|---|---|---|---|---|---|---|---|---|---|---|
| Blocked polyisocyanate composition | | BL1-a1 | BL1-a2 | BL1-a3 | BL1-a4 | BL1-a5 | BL1-a6 | BL1-a7 | BL1-a8 | BL1-a9 |
| Composition | Polyisocyanate | P1-1 | P1-1 | P1-1 | P1-1 | P1-1 | P1-1 | P1-1 | P1-2 | P1-3 |
| | | 100 g | 100 g | 100 g | 100 g | 100 g | 100 g | 100 g | 100 g | 100 g |
| | Blocking agent | B1-1 | B1-1 | B1-2 | B1-3 | B1-4 | B1-5 | B1-1 | B1-1 | B1-1 |
| | | 98 g | 98 g | 113 g | 113 g | 98 g | 91 g | 49 g B-7 38 g | 91 g | 107 g |
| | Solvent: DPDM | 117 g | 117 g | 124 g | 124 g | 117 g | 113 g | 111 g | 113 g | 122 g |
| | Alcohol: 2-propanol | 0 g | 158 g | 169 g | 169 g | 158 g | 152 g | 149 g | 153 g | 165 g |
| Reaction conditions | Temperature and time of blocking reaction | 40° C. 4 h | 40° C. 4 h | 40° C. 4 h | 40° C. 4 h | 40° C. 4 h | 40° C. 4 h | 40° C. 4 h | 40° C. 4 h | 40° C. 4 h |
| Physical properties | [Physical property 1-4] Solid fraction amount [% by mass] | 60% | 40% | 40% | 40% | 40% | 40% | 40% | 40% | 40% |
| | [Physical property 1-5] Effective NCO content [% by mass] | 6.3% | 4.2% | 3.9% | 3.9% | 4.2% | 4.4% | 4.5% | 4.0% | 4.4% |
| | [Physical property 1-6] Amount of isocyanurate trimer [% by mass] | 14% | 14% | 14% | 14% | 14% | 14% | 14% | 13% | 55% |
| | [Physical property 1-7] a/(a + b + c + d + e + f) | 0.28 | 0.28 | 0.28 | 0.28 | 0.28 | 0.28 | 0.26 | 0.31 | 0.10 |
| | [Physical property 1-8] Amount of methane tetracarbonyl structures [mol %] | 3.1 | 3.1 | 3.5 | 3.5 | 3.3 | 3.5 | 2.8 | 3.0 | 3.5 |
| Evaluations | [Evaluation 1-1] Viscosity stability of coating material composition | ◯ | ◯◯ | ◯◯ | ◯◯ | ◯◯ | ◯◯ | ◯◯ | ◯◯ | ◯◯ |
| | [Evaluation 1-2] Low-temperature curability of coating film | ◯ | ◯ | ◯ | ◯◯ | ◯◯ | ◯ | ◯ | ◯ | ◯ |
| | [Evaluation 1-3] Hardness retention of coating film | ◯◯ | ◯◯ | ◯◯ | ◯ | ◯ | ◯ | ◯◯ | ◯◯ | ◯◯ |
| | [Evaluation 1-4] Water resistance of coating film | ◯ | ◯ | ◯ | ◯◯ | ◯◯ | ◯ | ◯ | ◯ | ◯ |
| [Evaluation 1-5] Adhesion of coating film | Coating film baking temperature | | | | | 80° C. | | | | |
| | Adhesion of ABS substrate and coating film | ◯ | ◯ | ◯ | ◯◯ | ◯◯ | ◯ | ◯ | ◯ | ◯ |

| | | Example 1-10 | Example 1-11 | Example 1-12 | Example 1-13 | Example 1-14 | Example 1-15 | Comparative Example 1-1 | Comparative Example 1-2 | Comparative Example 1-3 |
|---|---|---|---|---|---|---|---|---|---|---|
| Blocked polyisocyanate composition | | BL1-a10 | BL1-a11 | BL1-a12 | BL1-a13 | BL1-a14 | BL1-a15 | BL-b1 | BL-b2 | BL-b3 |
| Composition | Polyisocyanate | P1-1 | P1-1 | P1-1 | P1-1 | P1-1 | P1-1 | P1-1 | P1-1 | P1-1 |
| | | 100 g | 100 g | 100 g | 100 g | 100 g | 100 g | 100 g | 100 g | 100 g |
| | Blocking agent | B1-1 | B1-1 | B1-1 | B1-1 | B1-1 | B1-1 | B1-6 | B1-1 | B1-1 |
| | | 98 g | 98 g | 98 g | 98 g | 98 g | 98 g | 83 g | 98 g | 98 g |
| | Solvent: DPDM | 117 g | 117 g | 117 g | 117 g | 117 g | 117 g | 109 g | 142 g | 102 g |
| | Alcohol: 2-propanol | 158 g | 158 g | 158 g | 158 g | 158 g | 0 g | 147 g | 158 g | 0 g |
| Reaction conditions | Temperature and time of blocking reaction | 40° C. 4 h | 40° C. 4 h | 40° C. 4 h | 40° C. 4 h | 30° C. 8 h | 80° C. 1 h | 40° C. 4 h | 30° C. 8 h | 80° C. 1 h |
| Physical properties | [Physical property 1-4] Solid fraction amount [% by mass] | 40% | 40% | 40% | 40% | 40% | 60% | 40% | 38% | 63% |

TABLE 1-continued

|  |  | | | | | | | | | |
|---|---|---|---|---|---|---|---|---|---|---|
|  | [Physical property 1-5] Effective NCO content [% by mass] | 4.2% | 4.2% | 4.2% | 4.2% | 4.2% | 6.3% | 4.6% | 4.0% | 6.6% |
|  | [Physical property 1-6] Amount of isocyanurate trimer [% by mass] | 14% | 14% | 14% | 14% | 14% | 14% | 14% | 14% | 14% |
|  | [Physical property 1-7] a/(a + b + c + d + e + f) | 0.28 | 0.29 | 0.29 | 0.30 | 0.28 | 0.28 | 0.28 | 0.28 | 0.28 |
|  | [Physical property 1-8] Amount of methane tetracarbonyl structures [mol %] | 3.0 | 3.1 | 3.1 | 2.9 | 0.5 | 9.5 | 0.0 | 0.2 | 10.4 |
| Evaluations | [Evaluation 1-1] Viscosity stability of coating material composition | ○○ | ○○ | ○○ | ○○ | ○○ | Δ | ○○ | ○○ | × |
|  | [Evaluation 1-2] Low-temperature curability of coating film | ○ | ○ | ○ | ○ | ○ | ○○ | Δ | ○ | ○○ |
|  | [Evaluation 1-3] Hardness retention of coating film | ○○ | ○○ | ○○ | ○○ | ○○ | ○○ | ○○ | ○ | — |
|  | [Evaluation 1-4] Water resistance of coating film | ○ | ○ | ○ | ○ | ○ | ○ | Δ | Δ | ○ |
| [Evaluation 1-5] Adhesion of coating film | Coating film baking temperature | | | | 80° C. | | | | 100° C. | |
|  | Adhesion of ABS substrate and coating film | ○ | ○ | ○ | ○ | ○ | ○ | Δ | Δ | Δ |

Table 1 reveals that for the blocked polyisocyanate compositions BL1-a1 to BL1-a15 containing a blocked polyisocyanate obtained from a polyisocyanate and the compound (I) (Examples 1-1 to 1-15), coating material compositions of excellent viscosity stability were able to be obtained. Further, by using these coating material compositions, coating films having excellent low-temperature curability, hardness retention and water resistance were able to be obtained. Furthermore, the coating films that used the blocked polyisocyanate compositions BL1-a1 to BL1-a15 (Examples 1-1 to 1-15) exhibited excellent adhesion to resin substrates.

In contrast, for the blocked polyisocyanate composition BL1-b1 containing a blocked polyisocyanate that used a blocking agent other than the compound (I) (Comparative Example 1-1), and the blocked polyisocyanate compositions BL1-b2 and BL1-b3 in which the amount of methane tetracarbonyl structures was either less than 0.5 mol % or greater than 10 mol % (Comparative Examples 1-2 and 1-3), a combination of favorable viscosity stability when used as a coating material composition and favorable low-temperature curability, hardness retention and water resistance when used as a coating film could not be achieved. Further, the coating films that used the blocked polyisocyanate compositions BL1-b1 to BL1-b3 (Comparative Examples 1-1 to 1-3) exhibited inferior adhesion to resin substrates.

Further, in the blocked polyisocyanate compositions BL1-a2 to BL1-a14 containing added 2-propanol (Examples 1-2 to 1-14), the viscosity stability when used as a coating material was particularly favorable compare with that obtained for the blocked polyisocyanate compositions BL1-a1 and BL1-a15 that did not contain 2-propanol (Examples 1-1 and 1-15).

Further, in the blocked polyisocyanate compositions BL1-a4 and BL1-a5 that used either B1-3 (di-tert-butyl malonate) or B1-4 (tert-butylethyl malonate) as the blocking agent (Examples 1-4 and 1-5), the low-temperature curability and water resistance and the like when used as a coating film were more favorable than those obtained for the blocked polyisocyanate compositions BL1-a1 to BL1-a3 and BL1-a6 to BL1-a15 that used other blocking agents (Examples 1-1 to 1-3 and 1-6 to 1-15).

Furthermore, in the blocked polyisocyanate compositions BL1-a1 to BL1-a3 and BL1-a7 to BL1-a15 that used either B1-1 (diisopropyl malonate) or B1-2 (di-sec-butyl malonate) as the blocking agent (Examples 1-1 to 1-3 and 1-7 to 1-15), the hardness retention when used as a coating film was particularly favorable compared with that obtained for the blocked polyisocyanate compositions BL1-a4 and BL1-a6 that used other blocking agents (Examples 1-4 to 1-6).

Examples 2-1 to 2-13 and Comparative Examples 2-1 and 2-2

<Test Items>

The blocked polyisocyanate compositions produced in the examples and comparative examples, the one-component coating material compositions containing those blocked polyisocyanate compositions, and the coating films obtained from the one-component coating material compositions were each subjected to measurement and evaluation of various physical properties in accordance with the methods described below.

[Physical Property 2-1] NCO Content of Polyisocyanate

First, 1 to 3 g of the polyisocyanate was weighed accurately into a conical flask (W g). Next, 20 mL of toluene was added, and the polyisocyanate was dissolved. Subsequently, 10 mL of a 2N toluene solution of di-n-butylamine was added, and following mixing, the mixture was left to stand for 15 minutes at room temperature. Next, 70 mL of isopropyl alcohol was added and mixed. The resulting liquid was then titrated with a 1N hydrochloric acid solution (factor F) using an indicator. The thus obtained titer was deemed V2 mL. Subsequently, the same operation was repeated without the polyisocyanate, and the obtained titer was deemed V mL. The formula (1) shown below was then used to calculate the NCO content of the polyisocyanate.

NCO content [% by mass]=(V1−V2)×F×42/(W× 1000)×100   (1)

[Physical Property 2-2] Non-Volatile Fraction (Solid Fraction Amount) of Blocked Polyisocyanate Composition The non-volatile fraction (solid fraction amount) of the blocked polyisocyanate composition was determined in the following manner.

First, an aluminum dish with a base diameter of 38 mm was weighed accurately. About 1 g of the blocked polyisocyanate composition produced in the example or comparative example was then weighed accurately onto the aluminum dish (W1). Subsequently, the blocked polyisocyanate composition was adjusted to a uniform thickness. The blocked polyisocyanate composition mounted on the aluminum dish was then placed in a 105° C. oven for one hour. The aluminum dish was then returned to room temperature, and the blocked polyisocyanate composition remaining on the aluminum dish was weighed accurately (W2). The non-volatile fraction (solid fraction amount) of the blocked polyisocyanate composition was then calculated from formula (3) shown below.

Solid fraction amount of blocked polyisocyanate composition [% by mass]=W2/W1×100   (3)

[Physical Property 2-3] Effective NCO Content

The effective NCO content of each of the blocked polyisocyanate compositions produced in the examples and comparative examples was determined in the following manner.

Here, the expression "effective NCO content" is a quantification of the amount of blocked isocyanate groups capable of participating in crosslinking reactions that exist within the blocked polyisocyanate composition following the blocking reaction, and is expressed as a % by mass value of the isocyanate groups.

The effective NCO content was calculated using formula (4) shown below. In formula (4), the "NCO content of the polyisocyanate" and the "non-volatile fraction of the blocked polyisocyanate composition" used the values calculated above for the physical property 2-1 and the physical property 2-2 respectively. In those cases where the sample was diluted with a solvent or the like, the effective NCO content value was calculated in the diluted state.

Effective NCO Content [% by mass]=[(solid fraction amount of blocked polyisocyanate composition [% by mass])×{(mass of polyisocyanate used in blocking reaction)×(NCO content of polyisocyanate [% by mass])}]/(mass of blocked polyisocyanate composition following blocking reaction)   (4)

[Physical Property 2-4] Amount of Methane Tetracarbonyl Structures

The amount of methane tetracarbonyl structures relative to the total molar amount within the blocked polyisocyanate of polyisocyanates having a compound represented by general formula (I-1) shown below (hereafter sometimes referred to as the "compound (I-1)") bonded thereto was calculated using the method described below.

[Chemical formula 10]

(I-1)

(In general formula (I-1), $R^{111}$ represents a methyl group, diethylamino group, ethoxy group, or 1,1-dimethylethoxy group.)

Specifically, based on the results of an $^1$H-NMR measurement performed using an Avance 600 (product name) manufactured by Bruker BioSpin Corporation, the molar ratio of methane tetracarbonyl structures/(methane tetracarbonyl structures+methane tricarbonyl structure keto forms+methane tricarbonyl structure enol forms) was determined, and this molar ratio was deemed the amount of methane tetracarbonyl structures. The measurement conditions were as follows.

(Measurement Conditions)

Apparatus: Avance 600 (product name) manufactured by Bruker BioSpin Corporation

Solvent: deuterated chloroform

Accumulation number: 256

Sample concentration: 5.0% by mass

Chemical shift reference: tetramethylsilane was deemed 0 ppm

Further, the signal integral values described below were divided by the number of measured carbons, and the resulting values were used to determine the various molar ratios.

NH proton of keto form of methane tetracarbonyl structure represented by general formula (III-1) shown below: near 7.3 ppm, integral value÷1

[Chemical formula 11]

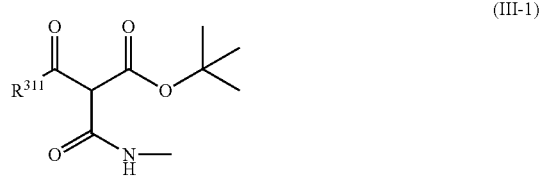

(III-1)

(In general formula (III-1), $R^{311}$ is the same as $R^{111}$ described above.)

NH proton of enol form of methane tricarbonyl structure represented by general formula (IV-1) shown below and enol form of methane tricarbonyl structure represented by general formula (V-1) shown below: near 9.8 ppm, integral value÷1

[Chemical formula 12]

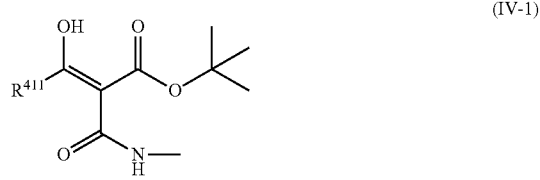

(IV-1)

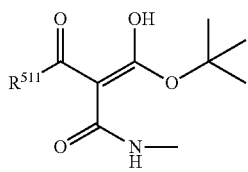

(In general formulas (IV-1) and (V-1), $R^{411}$ and $R^{511}$ are each the same as $R^{111}$ described above.)

NH protons of methane tetracarbonyl structure represented by general formula (II-1) shown below: near 8.0 ppm integral value 2

[Chemical formula 13]

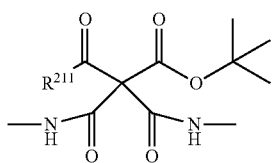

(In general formula (II-1), $R^{211}$ is the same as $R^{111}$ described above.)

[Evaluation 2-1] Low-Temperature Curability Evaluation

The low-temperature curability of the coating films produced in the examples and comparative examples was evaluated by measuring the gel fraction in the manner described below. A higher value for the gel fraction can be deemed to indicate superior low-temperature curability.

Each of the coating films produced in the examples and comparative examples was immersed in acetone at 20° C. for 24 hours. The gel fraction [% by mass] was then determined as the value of the mass of the insoluble portion divided by the mass prior to immersion.

[Evaluation 2-2] Storage Stability Evaluation

The storage stability of the one-component coating material compositions produced in the examples and comparative examples was evaluated using the method described below. The viscosity of a 20 g sample of the one-component coating material composition that had been stored in a 20 mL glass vial at 40° C. for one day was measured (viscometer: RE-85R manufactured by Toki Sangyo Co., Ltd.). Based on the measurement result, the storage stability was evaluated against the following evaluation criteria.

(Evaluation Criteria)
○: increase of not more than 1.5-fold relative to initial viscosity
Δ: increase of 1.5-fold or greater relative to initial viscosity
×: sample gelled

[Synthesis Example 2-1] Synthesis of Isocyanurate Polyisocyanate

A four-neck flask fitted with a thermometer, a stirring blade and a reflux condenser was charged with 1,000 parts of HDI, and the internal temperature of the flask was held at 70° C. while the contents were stirred. Tetramethylammonium caprate was then added to the flask, and when the yield reached 40%, phosphoric acid was added to halt the reaction. Following filtering of the reaction liquid, the unreacted HDI was removed using a thin-film distillation device, thus obtaining an isocyanurate polyisocyanate (hereafter referred to as the "polyisocyanate P2-1").

The NCO content of the obtained polyisocyanate P2-1 was 21.8% by mass.

Example 2-1

(1) Production of Blocked Polyisocyanate Composition BL2-1a

A four-neck flask fitted with a thermometer, a stirring blade and a reflux condenser was charged, under a stream of nitrogen and at room temperature, with 100 parts of P2-1 obtained in Synthesis Example 2-1, 112 parts of di-tert-butyl malonate (100 mol % equivalence relative to the isocyanate (NCO) groups), 141 parts of butyl acetate, and 0.9 parts of a methanol solution containing sodium methylate (28% by mass) (equivalent to 0.252 parts of sodium methylate), and a blocking reaction was conducted at 40° C. for 4 hours, thus obtaining a blocked polyisocyanate composition BL2-1a. The obtained blocked polyisocyanate composition BL2-1a had an effective NCO content of 6.2% by mass and a non-volatile fraction of 60% by mass.

(2) Production of One-Component Coating Material Composition T2-1a

Subsequently, the blocked polyisocyanate composition BL2-1a obtained above in (1) and an acrylic polyol (Setalux 1767 (product name) manufactured by Nuplex Resin Inc., resin fraction hydroxyl value: 150 mgKOH/g, resin fraction: 65%) were blended so as to achieve equivalence between the blocked NCO groups and the hydroxyl groups of the acrylic polyol. Butyl acetate was then added to obtain a one-component coating material composition T2-1a with a total resin fraction of 45%.

(3) Production of Coating Films

Subsequently, the one-component coating material composition T2-1a obtained above in (2) was applied in an amount sufficient to form a dried film thickness of 30 μm. Samples of the films were baked for 30 minutes in a drying oven held at 70° C., 80° C. or 90° C. to obtain a series of coating films.

Each of the obtained coating films was evaluated for low-temperature curability (gel fraction) in accordance with the evaluation method described above. The results revealed a gel fraction of 76% by mass for the coating film baked at 70° C., a gel fraction of 86% by mass for the coating film baked at 80° C., and a gel fraction of 90% by mass for the coating film baked at 90° C. These results are also shown below in Table 2.

Examples 2-2 to 2-8, 2-10 and 2-11, and Comparative Examples 2-2 and 2-3

(1) Production of Blocked Polyisocyanate Compositions BL2-2a to BL2-8a, BL2-10a and BL2-11a, and BL2-2b and BL2-3b With the exceptions of altering the types and masses of polyisocyanates and blocking agents and the blocking reaction conditions as shown in Table 2, the same method as that described for (1) of Example 2-1 was used to produce blocked polyisocyanate compositions BL2-2a to BL2-8a, BL2-10a and BL2-11a, and BL2-2b and BL2-3b. The effective NCO content and the non-volatile fraction for each of the obtained blocked isocyanate compositions are shown below in Table 2. The blocking agent used in Example 2-4 was a compound represented by formula (VI) shown below.

[Chemical formula 14]

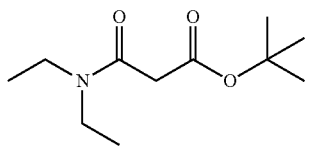

(VI)

(2) Production of One-Component Coating Material Compositions T2-2a to T2-8a, T2-10a and T2-11a, and T2-2b and T2-3b Subsequently, using the blocked isocyanate compositions obtained above in (1), the same method as that described for (2) of Example 2-1 was used to produce one-component coating material compositions T2-2a to T2-8a, T2-10a and T2-11a, and T2-2b and T2-3b.

(3) Production of Coating Films

Subsequently, for each of the one-component coating material compositions obtained above in (2), the same method as that described for (3) of Example 2-1 was used to produce coating films. Each of the obtained coating films was evaluated for low-temperature curability (gel fraction) in accordance with the evaluation method described above. The results are shown below in Table 2.

Examples 2-9 and 2-12 to 2-14, and Comparative Examples 2-1 and 2-4

(1) Production of Blocked Polyisocyanate Compositions BL2-9a, BL2-12a to BL2-14a, and BL2-1b and BL2-4b With the exceptions of altering the types and masses of polyisocyanates and blocking agents and the reaction conditions as shown in Table 2, the same method as that described for (1) of Example 2-1 was used to conduct blocking reactions. Subsequently, a solvent 2 (n-butanol or isobutanol) was added to the product of the blocking reaction in a mass shown in Table 2, and the mixture was mixed at 80° C. for one hour to obtain blocked polyisocyanate compositions BL2-9a, BL2-12a to BL2-14a, and BL2-1b and BL2-4b. The effective NCO content and the non-volatile fraction for each of the obtained blocked isocyanate compositions are shown below in Table 2.

(2) Production of One-Component Coating Material Compositions T2-9a. T2-12a to T2-14a, and T2-1b and T2-4b Subsequently, using the blocked isocyanate compositions obtained above in (1), the same method as that described for (2) of Example 2-1 was used to produce one-component coating material compositions T2-9a, T2-12a to T2-14a, and T2-1b and T2-4b.

(3) Production of Coating Films

Subsequently, for each of the one-component coating material compositions obtained above in (2), the same method as that described for (3) of Example 2-1 was used to produce coating films. Each of the obtained coating films was evaluated for low-temperature curability (gel fraction) in accordance with the evaluation method described above. The results are shown below in Table 2.

TABLE 2

| | | | Example 2-1 | Example 2-2 | Example 2-3 | Example 2-4 | Example 2-5 | Example 2-6 | Example 2-7 | Example 2-8 | Example 2-9 |
|---|---|---|---|---|---|---|---|---|---|---|---|
| Blocking | Polyisocyanate | | P2-1 100 parts | P2-1 100 parts | P2-1 100 parts | P2-1 100 parts | P2-1 100 parts | P2-1 100 parts | P2-1 100 parts | P2-1 100 parts | P2-1 100 parts |
| | Blocking agent | di-t-butyl malonate | 112 parts | | | | 56 parts | 8 parts | 45 parts | 67 parts | 22 parts |
| | | t-butylethyl malonate | | 98 parts | | | | | | | 78 parts |
| | | t-butyl acetoacetate | | | 82 parts | | 41 parts | | | | |
| | | Compound represented by formula (VI) | | | | 141 parts | | | | | |
| | | Diethyl malonate | | | | | | 63 parts | 40 parts | 27 parts | |
| | | Ethyl acetoacetate | | | | | | | | | |
| | | 28% sodium methylate solution | 0.9 parts | 0.8 parts | 0.8 parts | 1.0 parts | 0.8 parts | 0.7 parts | 0.8 parts | 0.8 parts | 0.8 parts |
| | Solvent 1 | Butyl acetate | 141 parts | 131 parts | 121 parts | 160 parts | 131 parts | 113 parts | 123 parts | 129 parts | 50 parts |
| | Blocking reaction | Temperature, time | 40° C. 4 h | 40° C. 4 h | 40° C. 4 h | 40° C. 4 h | 40° C. 4 h | 40° C. 4 h | 40° C. 4 h | 40° C. 4 h | 80° C. 3 h |
| Mixing conditions | Solvent 2 | n-butanol | | | | | | | | | |
| | | Isobutanol | | | | | | | | | 84 parts |
| | Mixing | Temperature, time | | | | | | | | | 80° C. 1 h |
| Physical properties | Effective NCO content | | 6.2% | 6.6% | 7.2% | 5.4% | 6.6% | 7.7% | 7.0% | 6.7% | 6.5% |
| | Non-volatile fraction | | 60% | 60% | 60% | 60% | 60% | 60% | 60% | 60% | 60% |
| | Methane tetracarbonyl fraction | | 4.8% | 5.3% | 2.8% | 3.5% | 4.2% | 2.7% | 4.1% | 4.6% | 6.8% |
| Evaluation results | Gel fraction | 70° C. | 76% | 74% | 70% | 72% | 72% | 30% | 51% | 62% | 70% |
| | | 80° C. | 86% | 85% | 78% | 80% | 81% | 65% | 68% | 70% | 77% |
| | | 90° C. | 90% | 91% | 88% | 89% | 88% | 87% | 89% | 90% | 88% |
| | Storage stability | | × | × | × | × | × | × | × | × | × |

TABLE 2-continued

| | | Example 2-10 | Example 2-11 | Example 2-12 | Example 2-13 | Example 2-14 | Comparative Example 2-1 | Comparative Example 2-2 | Comparative Example 2-3 | Comparative Example 2-4 |
|---|---|---|---|---|---|---|---|---|---|---|
| Blocking | Polyisocyanate | P2-1 100 parts | P2-1 100 parts | P2-1 100 parts | P2-1 100 parts | P2-1 100 parts | P2-1 100 parts | P2-1 100 parts | P2-1 100 parts | P2-1 100 parts |
| | Blocking agent di-t-butyl malonate | 112 parts | 112 parts | 112 parts | 112 parts | 112 parts | | | 112 parts | 112 parts |
| | t-butylethyl malonate | | | | | | | | | |
| | t-butyl acetoacetate | | | | | | | | | |
| | Compound represented by formula (VI) | | | | | | | | | |
| | Diethyl malonate | | | | | | 61 parts | 83 parts | | |
| | Ethyl acetoacetate | | | | | | 21 parts | | | |
| | 28% sodium methylate solution | 0.9 parts | 0.9 parts | 0.9 parts | 0.9 parts | 0.9 parts | 0.8 parts | 0.8 parts | 0.9 parts | 0.9 parts |
| | Solvent 1 Butyl acetate | 318 parts | 318 parts | 52 parts | 141 parts | 141 parts | 45 parts | 122 parts | 346 parts | 37 parts |
| | Blocking reaction Temperature, time | 30° C. 8 h | 40° C. 4 h | 80° C. 3 h | 40° C. 4 h | 40° C. 4 h | 80° C. 3 h | 40° C. 4 h | 30° C. 8 h | 80° C. 3 h |
| Mixing conditions | Solvent 2 n-butanol | | | | 177 parts | | | 76 parts | | |
| | Isobutanol | | | 88 parts | | 177 parts | | | | 88 parts |
| | Mixing Temperature, time | | | 80° C. 1 h | 40° C. 2 h | 40° C. 2 h | 80° C. 1 h | | | 80° C. 1 h |
| Physical properties | Effective NCO content | 4.1% | 4.1% | 6.2% | 4.1% | 4.1% | 7.5% | 7.1% | 3.9% | 6.5% |
| | Non-volatile fraction | 40% | 40% | 60% | 40% | 40% | 60% | 60% | 38% | 63% |
| | Methane tetracarbonyl fraction | 0.5% | 1.2% | 9.8% | 5.1% | 4.7% | 0.0% | 0.0% | 0.3% | 10.3% |
| Evaluation results | Gel fraction 70° C. | 75% | 76% | 75% | 68% | 72% | 0% | 0% | 76% | 76% |
| | 80° C. | 83% | 85% | 82% | 76% | 80% | 51% | 25% | 85% | 83% |
| | 90° C. | 90% | 90% | 92% | 87% | 88% | 80% | 76% | 90% | 91% |
| | Storage stability | Δ | Δ | ○ | ○ | ○ | ○ | × | × | Δ |

The coating films produced using the blocked polyisocyanate compositions BL2-1a to BL2-14a obtained from the polyisocyanate P2-1 and a compound represented by general formula (I-1) shown above (Examples 2-1 to 2-14) exhibited excellent low-temperature curability, with a gel fraction of at least 87% by mass at a curing temperature of 90° C., a gel fraction of at least 65% by mass at a curing temperature of 80° C., and a gel fraction of at least 30% by mass at a curing temperature of 70° C. Further, the blocked polyisocyanate compositions BL2-12a to BL2-14a which used only di-tert-butyl malonate as the blocking agent, and also contained n-butanol or isobutanol (Examples 2-12 to 2-14) also exhibited particularly superior storage stability.

In contrast, the coating films produced using the blocked polyisocyanate compositions BL2-1b and BL2-2b obtained from the polyisocyanate P2-1 and at least one compound selected from the group consisting of diethyl malonate and ethyl acetoacetate (Comparative Examples 2-1 and 2-2) had inferior low-temperature curability, with a gel fraction of at least 75% by mass at a curing temperature of 90° C., a gel fraction of at least 25% by mass at a curing temperature of 80° C., and a gel fraction of at least 0% by mass at a curing temperature of 70° C.

Further, the coating films produced using the blocked polyisocyanate compositions BL2-3b and BL2-4b having an amount of methane tetracarbonyl structures (a methane tetracarbonyl fraction) of less than 0.5 mol % or greater than 10.0 mol % (Comparative Examples 2-3 and 2-4) exhibited excellent low-temperature curability but had poor storage stability.

The above results confirmed that the blocked polyisocyanate composition of an embodiment of the present invention was able to produce a coating film having excellent low-temperature curability.

Examples 3-1 to 3-12, and Comparative Examples 3-1 and 3-2

<Test Items>

The blocked polyisocyanate compositions produced in the examples and comparative examples, the coating material compositions containing those blocked polyisocyanate compositions, and the coating films obtained from the coating material compositions were each subjected to measurement and evaluation of various physical properties in accordance with the methods described below.

[Physical Property 3-1] NCO Content of Polyisocyanate

First, 1 to 3 g of the polyisocyanate was weighed accurately into a conical flask (W g). Next, 20 mL of toluene was added, and the polyisocyanate was dissolved. Subsequently, 10 mL of a 2N toluene solution of di-n-butylamine was added, and following mixing, the mixture was left to stand for 15 minutes at room temperature. Next, 70 mL of isopropyl alcohol was added and mixed. The resulting liquid was then titrated with a 1N hydrochloric acid solution (factor F) using an indicator. The thus obtained titer was deemed V2 mL. Subsequently, the same operation was repeated without the polyisocyanate, and the obtained titer was deemed V1 mL. The formula (1) shown below was then used to calculate the NCO content of the polyisocyanate.

NCO content [% by mass]=$(V1-V2) \times F \times 42/(W \times 1000) \times 100$    (1)

[Physical Property 3-2] Non-Volatile Fraction (Solid Fraction Amount) of Blocked Polyisocyanate Composition The non-volatile fraction of the blocked polyisocyanate composition was determined in the following manner.

First, an aluminum dish with a base diameter of 38 mm was weighed accurately. About 1 g of the blocked polyisocyanate composition produced in the example or comparative example was then weighed accurately onto the aluminum dish (W1). Subsequently, the blocked polyisocyanate composition was adjusted to a uniform thickness. The blocked polyisocyanate composition mounted on the aluminum dish was then placed in a 105° C. oven for one hour. The aluminum dish was then returned to room temperature, and the blocked polyisocyanate composition remaining on the aluminum dish was weighed accurately (W2). The non-volatile fraction (solid fraction amount) of the blocked polyisocyanate composition was then calculated from formula (3) shown below.

Solid fraction amount of blocked polyisocyanate composition [% by mass]=$W2/W1*100$    (3)

[Physical Property 3-3] Effective NCO Content

The effective NCO content of each of the blocked polyisocyanate compositions produced in the examples and comparative examples was determined in the following manner.

Here, the expression "effective NCO content" is a quantification of the amount of blocked isocyanate groups capable of participating in crosslinking reactions that exist within the blocked polyisocyanate composition following the blocking reaction, and is expressed as a % by mass value of the isocyanate groups.

The effective NCO content was calculated using formula (4) shown below. In formula (4) below, the "NCO content of the polyisocyanate" and the "non-volatile fraction of the blocked polyisocyanate composition" used the values calculated above for the physical property 3-1 and the physical property 3-2 respectively. In those cases where the sample was diluted with a solvent or the like, the effective NCO content value was calculated in the diluted state.

Effective NCO Content [% by mass]=[(solid fraction amount of blocked polyisocyanate composition [% by mass])×{(mass of polyisocyanate used in blocking reaction)×(NCO content of polyisocyanate [% by mass])}]/(mass of blocked polyisocyanate composition following blocking reaction)    (4)

[Physical Property 3-4] Amount of Methane Tetracarbonyl Structures

The amount of methane tetracarbonyl structures represented by general formula (II-2) shown below relative to the total molar amount within the blocked polyisocyanate composition of polyisocyanates having a compound represented by general formula (I-2) shown below (hereafter sometimes referred to as the "compound (I-2)") bonded thereto was calculated using the method described below.

[Chemical formula 15]

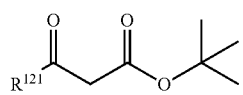

(I-2)

(In general formula (I-2), $R^{121}$ represents an ethoxy group or a 1,1-dimethylethoxy group.)

[Chemical formula 16]

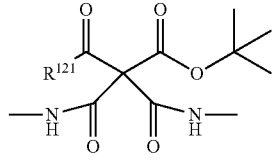

(II-2)

(In general formula (11-2), $R^{221}$ is the same as $R^{121}$ described above.)

Specifically, based on the results of an $^1$H-NMR measurement performed using an Avance 600 (product name) manufactured by Bruker BioSpin Corporation, the molar ratio of methane tetracarbonyl structures/(methane tetracarbonyl structures+methane tricarbonyl structure keto forms+methane tricarbonyl structure enol forms) was determined, and this molar ratio was deemed the amount of methane tetracarbonyl structures. The measurement conditions were as follows.

(Measurement Conditions)

Apparatus: Avance 600 (product name) manufactured by Bruker BioSpin Corporation

Solvent: deuterated chloroform

Accumulation number: 256

Sample concentration: 5.0% by mass

Chemical shift reference: tetramethylsilane was deemed 0 ppm

Further, the signal integral values described below were divided by the number of measured carbons, and the resulting values were used to determine the various molar ratios.

NH proton of keto form of methane tetracarbonyl structure represented by general formula (III-2) shown below: near 7.3 ppm, integral value÷1

[Chemical formula 17]

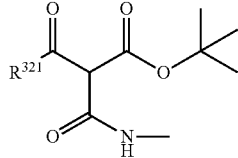

(III-2)

(In general formula (III-2), $R^{321}$ is the same as $R^{121}$ described above.)

NH proton of enol form of methane tricarbonyl structure represented by general formula (IV-2) shown below and enol form of methane tricarbonyl structure represented by general formula (V-2) shown below: near 9.8 ppm, integral value÷1

[Chemical formula 18]

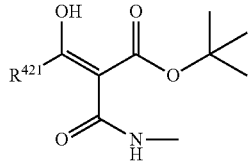

(IV-2)

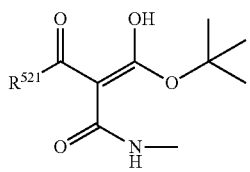

(V-2)

(In general formulas (IV-2) and (V-2), $R^{421}$ and $R^{521}$ are each the same as $R^{121}$ described above.)

NH protons of methane tetracarbonyl structure represented by general formula (II-2) shown below: near 8.0 ppm, integral value÷2

[Chemical formula 19]

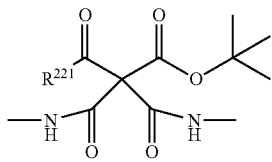

(II-2)

(In general formula (II-2), $R^{221}$ is the same as $R^{121}$ described above.)

[Evaluation 3-1] Low-Temperature Curability Evaluation

The low-temperature curability of the coating films produced in the examples and comparative examples was evaluated by measuring the gel fraction in the manner described below. A higher value for the gel fraction can be deemed to indicate superior low-temperature curability.

Each of the coating films from the examples and comparative examples was immersed in acetone at 20° C. for 24 hours. The gel fraction [% by mass] was then determined as the value of the mass of the insoluble portion divided by the mass prior to immersion.

[Evaluation 3-2] Storage Stability Evaluation

The storage stability of the coating material compositions produced in the examples and comparative examples was evaluated using the method described below.

The viscosity of a 20 g sample of the coating material composition that had been stored in a glass vial at 40° C. for 10 days was measured (viscometer: RE-85R manufactured by Toki Sangyo Co., Ltd.). Based on the measurement result, the storage stability was evaluated against the following evaluation criteria.

(Evaluation Criteria)
O: increase of less than 3.0-fold relative to initial viscosity
Δ: increase of 3.0-fold or greater relative to initial viscosity
x: sample gelled

[Synthesis Example 3-1] Synthesis of Isocyanurate Polyisocyanate

A four-neck flask fitted with a thermometer, a stirring blade and a reflux condenser was charged with 1,000 parts of HDI under a stream of nitrogen, and the internal temperature of the flask was held at 70° C. while the contents were stirred. Tetramethylammonium caprate was then added to the flask, and when the yield reached 40%, phosphoric acid was added to halt the reaction. Following filtering of the reaction liquid, the unreacted HDI was removed using a thin-film distillation device, thus obtaining an isocyanurate polyisocyanate (hereafter referred to as the "polyisocyanate P3-1"). The NCO content of the obtained polyisocyanate P3-1 was 21.8% by mass.

Examples 3-1 to 3-4

(1) Production of Blocked Polyisocyanate Compositions BL3-1a to BL3-4a

Into a four-neck flask fitted with a thermometer, a stirring blade and a reflux condenser were weighed, under a stream of nitrogen, P3-1 obtained in Synthesis Example 3-1, di-tert-butyl malonate (100 mol % equivalence relative to the isocyanate (NCO) groups) or tert-butylethyl malonate (100 mol % equivalence relative to the isocyanate (NCO) groups) and butyl acetate, and the resulting mixture was stirred at room temperature for several minutes until a uniform mixture was obtained. Subsequently, a methanol solution containing sodium methylate (28% by mass) (equivalent to 0.252 parts of sodium methylate) was added at room temperature, the temperature was raised to either 40° C. or 80° C., and a blocking reaction was conducted for 4 hours. The amounts used of the various components are shown in Table 3. Next, a solvent 2 (n-butanol, isobutanol or 2-propanol) was added in a mass shown in Table 3, as an active hydrogen group-containing compound, to the product of the blocking reaction, and the mixture was mixed at 40° C. for one hour, thus obtaining a series of blocked polyisocyanate compositions BL3-1a to BL3-4a. The effective NCO content and the non-volatile fraction of each of the obtained blocked polyisocyanate compositions BL3-1a to BL3-4a are shown in Table 3.

(2) Production of Coating Material Compositions T3-1a to T3-4a (Blending Method 1)

First, an acrylic polyol (Setalux 1767 (product name) manufactured by Nuplex Resin Inc., resin fraction hydroxyl value: 150 mgKOH/g, resin fraction: 65%) was diluted with butyl acetate. Subsequently, with each of the blocked polyisocyanate compositions BL3-1a to BL3-4a obtained above in (1) undergoing constant stirring, the acrylic polyol was added gradually to obtain coating material compositions T3-1a to T3-4a with a total resin fraction of 45%. The blend amounts were adjusted to achieve equivalence between the blocked NCO groups of the blocked polyisocyanate compositions BL3-1a to BL3-4a and the hydroxyl groups of the acrylic polyol. The storage stability of the obtained coating material compositions was evaluated in accordance with the evaluation method described above. The results are shown below in Table 3.

(3) Production of Coating Films

Subsequently, the coating material compositions T3-1a to T3-4a obtained above in (2) were each applied in an amount sufficient to form a dried film thickness of 30 μm. Subsequently, samples of the films were baked for 30 minutes in a drying oven held at 70° C., 80° C. or 90° C. to obtain a series of coating films.

Each of the obtained coating films was evaluated for low-temperature curability (gel fraction) in accordance with the evaluation method described above. The results are shown below in Table 3.

Examples 3-5 and 3-6

(1) Production of Blocked Polyisocyanate Compositions BL3-5a and BL3-6a

The types and masses of polyisocyanates and blocking agents were altered as shown in Table 3, and blocking reactions were performed. After the blocking reaction, butyl acetate was removed under reduced pressure conditions to adjust the non-volatile fraction to 60%. Subsequently, a solvent 2 (n-butanol) was added, and the mixture was mixed at 40° C. for one hour to obtain blocked polyisocyanate compositions BL3-5a and BL3-6a. The effective NCO content and the non-volatile fraction for each of the obtained blocked polyisocyanate compositions are shown below in Table 3.

(2) Production of Coating Material Compositions T3-5a and T3-6a (Blending Method 1)

Subsequently, using the blocked polyisocyanate compositions obtained above in (1), the same method as that described for (2) of Example 3-1 was used to produce coating material compositions T3-5a and T3-6a. The storage stability of each of the obtained coating material compositions T3-5a and T3-6a was evaluated in accordance with the evaluation method described above. The results are shown below in Table 3.

(3) Production of Coating Films

Subsequently, for each of the coating material compositions obtained above in (2), the same method as that described for (3) of Example 3-1 was used to produce coating films. Each of the obtained coating films was evaluated for low-temperature curability (gel fraction) in accordance with the evaluation method described above. The results are shown below in Table 3.

Examples 3-7 to 3-11

(1) Production of Blocked Polyisocyanate Compositions BL3-7a to BL3-11a

With the exceptions of altering the types and masses of polyisocyanates and blocking agents as shown in Table 3, and not adding the solvent 2 (n-butanol, isobutanol or 2-propanol), the same method as that described for (1) of Example 3-1 was used to produce blocked polyisocyanate compositions BL3-7a to BL3-11a. The effective NCO content and the non-volatile fraction for each of the obtained blocked polyisocyanate compositions are shown below in Table 3.

(2) Production of Coating Material Compositions T3-7a to T3-11a (Blending Method 2)

First, an acrylic polyol (Setalux 1767 (product name) manufactured by Nuplex Resin Inc., resin fraction hydroxyl value: 150 mgKOH/g, resin fraction: 65%) was diluted with butyl acetate. Subsequently, a mass of an active hydrogen compound (isobutanol, 2-propanol or 1,3-butanediol) shown in Table 3 was added to each of the blocked polyisocyanate compositions BL3-7a to BL3-11a obtained above in (1), and with each of the resulting mixtures undergoing constant stirring, the acrylic polyol was added gradually to obtain coating material compositions T3-7a to T3-11a having a total resin fraction of 45%. The blend amounts were adjusted to achieve equivalence between the blocked NCO groups of the blocked polyisocyanate compositions BL3-7a to BL3-11a and the hydroxyl groups of the acrylic polyol. The storage stability of the obtained coating material compositions was evaluated in accordance with the evaluation method described above. The results are shown below in Table 3.

(3) Production of Coating Films

Subsequently, for each of the coating material compositions obtained above in (2), the same method as that described for (3) of Example 3-1 was used to produce coating films. Each of the obtained coating films was evaluated for low-temperature curability (gel fraction) in accordance with the evaluation method described above. The results are shown below in Table 3.

Example 3-121

(1) Production of Blocked Polyisocyanate Composition BL3-12a

With the exceptions of altering the types and masses of polyisocyanate and blocking agent as shown in Table 3, and not adding the solvent 2 (n-butanol, isobutanol or 2-propanol), the same method as that described for (1) of Example 3-1 was used to produce a blocked polyisocyanate composition BL3-12a. The effective NCO content and the non-volatile fraction for the obtained blocked polyisocyanate composition are shown below in Table 3.

(2) Production of Coating Material Composition T3-12a (Blending Method 3)

Subsequently, the blocked polyisocyanate composition BL3-12a obtained above in (1) and an acrylic polyol (Setalux 1767 (product name) manufactured by Nuplex Resin Inc., resin fraction hydroxyl value: 150 mgKOH/g, resin fraction: 65%) were blended so as to achieve equivalence between the blocked NCO groups and the hydroxyl groups of the acrylic polyol. Butyl acetate was then added and mixed, and then finally, the mass of active hydrogen compound (2-propanol) shown in Table 3 was added, thus obtaining a coating material composition T3-12a with a total resin fraction of 45%. The storage stability of the obtained coating material composition was evaluated in accordance with the evaluation method described above. The result is shown below in Table 3.

(3) Production of Coating Films

Subsequently, using the coating material composition obtained above in (2), the same method as that described for (3) of Example 3-1 was used to produce a coating film. The obtained coating film was evaluated for low-temperature curability (gel fraction) in accordance with the evaluation method described above. The result is shown below in Table 3.

Comparative Examples 3-1 and 3-2

(1) Production of Blocked Polyisocyanate Compositions BL3-11b and BL3-2b

With the exceptions of altering the types and masses of polyisocyanates and blocking agents and the reaction conditions as shown in Table 3, the same method as that described for (1) of Example 3-1 was used to conduct blocking reactions. Subsequently, a solvent 2 (n-butanol) was added to the product of the blocking reaction in a mass shown in Table 3, and the mixture was mixed at 80° C. for one hour to obtain blocked polyisocyanate compositions BL3-1b and BL3-2b. The effective NCO content and the non-volatile fraction for each of the obtained blocked polyisocyanate compositions BL3-1b and BL3-2b are shown below in Table 3.

(2) Production of Coating Material Compositions T3-1b and T3-2b (Blending Method 1)

Subsequently, using the blocked polyisocyanate compositions BL3-1b and BL3-2b obtained above in (1), the same method as that described for (2) of Example 3-1 was used to produce coating material compositions T3-1b and T3-2b. The storage stability of each of the obtained coating material compositions was evaluated in accordance with the evaluation method described above. The results are shown below in Table 3.

(3) Production of Coating Films

Subsequently, for each of the coating material compositions T3-1b and T3-2b obtained above in (2), the same method as that described for (3) of Example 3-1 was used to produce coating films. Each of the obtained coating films was evaluated for low-temperature curability (gel fraction) in accordance with the evaluation method described above. The results are shown below in Table 3.

TABLE 3

|  |  |  | Example 3-1 | Example 3-2 | Example 3-3 | Example 3-4 | Example 3-5 | Example 3-6 | Example 3-7 | Example 3-8 |
|---|---|---|---|---|---|---|---|---|---|---|
| Blocking | Polyisocyanate |  | P3-1 100 parts | P3-1 100 parts | P3-1 100 parts | P3-1 100 parts | P3-1 100 parts | P3-1 100 parts | P3-1 100 parts | P3-1 100 parts |
|  | Blocking agent | di-t-butyl malonate | 112 parts | 112 parts | 112 parts |  | 112 parts | 112 parts | 112 parts | 112 parts |
|  |  | t-butylethyl malonate |  |  |  | 98 parts |  |  |  |  |
|  |  | Diethyl malonate |  |  |  |  |  |  |  |  |
|  |  | Ethyl acetoacetate |  |  |  |  |  |  |  |  |
|  | 28% sodium methylate solution |  | 0.9 parts | 0.9 parts | 0.9 parts | 0.8 parts | 0.9 parts | 0.9 parts | 0.9 parts | 0.9 parts |
|  | Solvent 1 | Butyl acetate | 141 parts | 141 parts | 141 parts | 131 parts | 318 parts | 849 parts | 141 parts | 141 parts |
|  | Blocking reaction | Temperature, time | 40° C. 4 h | 40° C. 4 h | 40° C. 4 h | 40° C. 4 h | 40° C. 4 h | 40° C. 4 h | 40° C. 4 h | 40° C. 4 h |
|  | Solvent removal step |  |  |  |  |  |  | performed | performed |  |
| Mixing | Solvent 2 (active hydrogen group-containing compound) | n-butanol | 177 parts |  |  |  | 177 parts | 177 parts |  |  |
|  |  | Isobutanol |  | 177 parts |  |  |  |  |  |  |
|  |  | 2-propnaol |  |  | 177 parts | 165 parts |  |  |  |  |
|  | Mixing | Temperature, time | 40° C. 1 h | 40° C. 1 h | 40° C. 1 h | 40° C. 1 h | 40° C. 1 h | 40° C. 1 h |  |  |
| Physical properties | Effective NCO content |  | 4.1% | 4.1% | 4.1% | 4.4% | 4.1% | 4.1% | 6.2% | 6.2% |
|  | Non-volatile fraction |  | 40% | 40% | 40% | 40% | 40% | 40% | 60% | 60% |
|  | Methane tetracarbonyl fraction |  | 5.1% | 4.7% | 4.7% | 4.8% | 1.2% | 0.5% | 5.2% | 5.0% |
| Material blending | Material blending method |  | Blending method 1 | Blending method 1 | Blending method 1 | Blending method 1 | Blending method 1 | Blending method 1 | Blending method 2 | Blending method 2 |
|  | Active hydrogen group-containing compound | Isobutanol |  |  |  |  |  |  | 165 parts | 300 parts |
|  |  | 2-propnaol |  |  |  |  |  |  |  |  |
|  |  | 1,3-butanediol |  |  |  |  |  |  |  |  |
|  | Alcohol | mol %/NCO | 461% | 461% | 568% | 529% | 461% | 461% | 521% | 932% |
| Evaluation results | Gel fraction | 70° C. | 75% | 76% | 78% | 72% | 71% | 70% | 79% | 69% |
|  |  | 80° C. | 81% | 80% | 81% | 81% | 79% | 77% | 82% | 80% |
|  |  | 90° C. | 88% | 87% | 90% | 88% | 88% | 87% | 90% | 87% |
|  | Storage stability | Viscosity increase | ○ 1.2-fold | ○ 1.3-fold | ○ 1.4-fold | ○ 1.4-fold | ○ 1.3-fold | ○ 1.2-fold | ○ 1.3-fold | ○ 1.2-fold |

|  |  |  | Example 3-9 | Example 3-10 | Example 3-11 | Example 3-12 | Comparative Example 3-1 | Comparative Example 3-2 |
|---|---|---|---|---|---|---|---|---|
| Blocking | Polyisocyanate |  | P3-1 100 parts | P3-1 100 parts | P3-1 100 parts | P3-1 100 parts | P3-1 100 parts | P3-1 100 parts |
|  | Blocking agent | di-t-butyl malonate | 112 parts | 112 parts | 112 parts | 112 parts |  | 112 parts |
|  |  | t-butylethyl malonate |  |  |  |  |  |  |
|  |  | Diethyl malonate |  |  |  |  | 61 parts |  |
|  |  | Ethyl acetoacetate |  |  |  |  | 21 parts |  |
|  | 28% sodium methylate solution |  | 0.9 parts | 0.9 parts | 0.9 parts | 0.9 parts | 0.8 parts | 0.9 parts |
|  | Solvent 1 | Butyl acetate | 141 parts | 141 parts | 141 parts | 141 parts | 45 parts | 37 parts |
|  | Blocking reaction | Temperature, time | 40° C. 4 h | 40° C. 4 h | 40° C. 4 h | 40° C. 4 h | 80° C. 3 h | 80° C. 4 h |
|  | Solvent removal step |  |  |  |  |  |  |  |
| Mixing | Solvent 2 (active hydrogen group-containing compound) | n-butanol |  |  |  |  | 76 parts | 104 parts |
|  |  | Isobutanol |  |  |  |  |  |  |
|  |  | 2-propnaol |  |  |  |  |  |  |
|  | Mixing | Temperature, time |  |  |  |  | 80° C. 1 h | 40° C. 1 h |
| Physical properties | Effective NCO content |  | 6.2% | 6.2% | 6.2% | 6.2% | 7.5% | 6.2% |
|  | Non-volatile fraction |  | 60% | 60% | 60% | 60% | 60% | 60% |
|  | Methane tetracarbonyl fraction |  | 5.3% | 4.8% | 4.9% | 5.4% | 0.0% | 19.5% |
| Material blending | Material blending method |  | Blending method 2 | Blending method 2 | Blending method 2 | Blending method 3 | Blending method 1 | Blending method 1 |
|  | Active hydrogen group-containing compound | Isobutanol |  |  | 100 parts |  |  |  |
|  |  | 2-propnaol | 15 parts | 100 parts |  | 165 parts |  |  |
|  |  | 1,3-butanediol |  |  |  | 165 parts |  |  |
|  | Alcohol | mol %/NCO | 46% | 561% | 521% | 521% |  | 271% |
| Evaluation results | Gel fraction | 70° C. | 81% | 80% | 76% | 80% | 0% | 79% |
|  |  | 80° C. | 86% | 84% | 80% | 84% | 51% | 82% |
|  |  | 90° C. | 91% | 90% | 88% | 90% | 80% | 91% |
|  | Storage stability | Viscosity increase | ○ 2.5-fold | ○ 1.3-fold | ○ 1.6-fold | ○ 1.8-fold | ○ 1.2-fold | Δ 3.2-fold |

The coating films produced using the coating material compositions containing a blocked polyisocyanate composition and an active hydrogen group-containing compound (Examples 3-1 to 3-12) exhibited excellent low-temperature curability, with a gel fraction of at least 87% by mass at a curing temperature of 90° C., a gel fraction of at least 77% by mass at a curing temperature of 80° C., and a gel fraction of at least 69% by mass at a curing temperature of 70° C. Further, the coating material compositions also exhibited excellent storage stability upon storage at 40° C. for 10 days.

In contrast, in Comparative Examples 3-1 and 3-2, a combination of favorable low-temperature curability and favorable storage stability could not be achieved.

The above results confirmed that the coating material composition of an embodiment of the present invention exhibited excellent low-temperature curability and storage stability.

Examples 4-1 to 4-13, and Comparative Example 4-1

<Test Items>

The blocked polyisocyanate compositions produced in the examples and comparative example, the coating material compositions containing those blocked polyisocyanate compositions, and the coating films obtained from the coating material compositions were each subjected to measurement and evaluation of various physical properties in accordance with the methods described below.

[Physical Property 4-1] Isocyanate Group (NCO) Content of Polyisocyanate

First, 1 to 3 g of the polyisocyanate was weighed accurately into a conical flask (W g). Next, 20 mL of toluene was added, and the polyisocyanate was dissolved. Subsequently, 10 mL of a 2N toluene solution of di-n-butylamine was added, and following mixing, the mixture was left to stand for 15 minutes at room temperature. Next, 70 mL of isopropyl alcohol was added and mixed. The resulting liquid was then titrated with a 1N hydrochloric acid solution (factor F) using an indicator. The thus obtained titer was deemed V2 mL. Subsequently, the same operation was repeated without the polyisocyanate, and the obtained titer was deemed V1 mL. The formula (1) shown below was then used to calculate the isocyanate group (NCO) content of the polyisocyanate.

$$\text{NCO content [\% by mass]} = (V1-V2) \times F \times 42/(W \times 1000) \times 100 \quad (1)$$

[Physical Property 4-2] Number Average Molecular Weight of Polyisocyanate

Using the polyisocyanate as a sample, the number average molecular weight of the polyisocyanate was determined as the polystyrene-equivalent number average molecular weight by measurement with a gel permeation chromatograph using the apparatus and conditions described below.

(Measurement Conditions)

Apparatus: HLC-802A (manufactured by Tosoh Corporation)

Columns: 1 G1000HXL (manufactured by Tosoh Corporation), 1×G2000HXL (manufactured by Tosoh Corporation), and 1×G3000HXL (manufactured by Tosoh Corporation)

Carrier: tetrahydrofuran

Flow rate: 0.6 mL/minute

Sample concentration: 1.0% by mass

Injection volume: 20 μL

Temperature: 40° C.

Detection method: refractive index detector

[Physical Property 4-3] Average Isocyanate Number of Polyisocyanate

Using the polyisocyanate as a sample, the average isocyanate number was determined using formula (2) shown below.

$$\text{Average isocyanate number} = (\text{number average molecular weight (Mn) of polyisocyanate} \times \text{NCO content (\% by mass)} \times 0.01)/42 \quad (2)$$

[Physical Property 4-4] Non-Volatile Fraction (Solid Fraction Amount) of Blocked Polyisocyanate Composition The non-volatile fraction (solid fraction amount) of the blocked polyisocyanate composition was determined in the following manner.

First, an aluminum dish with a base diameter of 38 mm was weighed accurately. About 1 g of the blocked polyisocyanate composition produced in the example or comparative example was then weighed accurately onto the aluminum dish (W1). Subsequently, the blocked polyisocyanate composition was adjusted to a uniform thickness. The blocked polyisocyanate composition mounted on the aluminum dish was then placed in a 105° C. oven for one hour. The aluminum dish was then returned to room temperature, and the blocked polyisocyanate composition remaining on the aluminum dish was weighed accurately (W2). The non-volatile fraction (solid fraction) of the blocked polyisocyanate composition was then calculated from formula (3) shown below.

$$\text{Solid fraction amount of blocked polyisocyanate composition [\% by mass]} = W2/W1 \times 100 \quad (3)$$

[Physical Property 4-5] Effective Isocyanate Group (NCO) Content of Blocked Polyisocyanate Composition The effective isocyanate group (NCO) content of the blocked polyisocyanate compositions produced in the examples and comparative example was determined in the following manner.

Here, the expression "effective isocyanate group (NCO) content" is a quantification of the amount of blocked isocyanate groups capable of participating in crosslinking reactions that exist within the blocked polyisocyanate composition following the blocking reaction, and is expressed as a % by mass value of the isocyanate groups.

The effective NCO content was calculated using formula (4) shown below. In formula (4), the "NCO content of the polyisocyanate" and the "non-volatile fraction of the blocked polyisocyanate composition" used the values calculated above for the physical property 4-1 and the physical property 4-4 respectively. In those cases where the sample was diluted with a solvent or the like, the effective NCO content value was calculated in the diluted state.

$$\text{Effective NCO Content [\% by mass]} = [(\text{solid fraction amount of blocked polyisocyanate composition [\% by mass]}) \times \{(\text{mass of polyisocyanate used in blocking reaction}) \times (\text{NCO content of polyisocyanate [\% by mass]})\}]/(\text{mass of blocked polyisocyanate composition following blocking reaction}) \quad (4)$$

[Physical Property 4-6] Amount of Isocyanurate Trimer in Blocked Polyisocyanate Composition Using the blocked polyisocyanate composition as a sample, and using the same measurement method as that described for the number average molecular weight of the polyisocyanate determined above in "physical property 4-2", the blocked polyisocyanate composition was subjected to a gel permeation chromatography measurement. The obtained measurement results were then used to determine the ratio of the surface area for the isocyanurate trimer blocked with three molecules of the blocking agent relative to the surface area for the entire blocked polyisocyanate composition, and this ratio was deemed to represent the amount of the isocyanurate trimer within the blocked polyisocyanate composition.

[Physical Property 4-7] a/(a+b+c+d+e+f)

Using a Biospin Avance 600 (product name) manufactured by Bruker Corporation, a $^{13}$C-NMR measurement was conducted under the conditions listed below, and the molar amounts of allophanate groups, isocyanurate groups, uretdione groups, iminooxadiazinedione groups, urethane groups and biuret groups were each determined.

(Measurement Conditions)

$^{13}$C-NMR apparatus: AVANCE 600 (manufactured by Bruker Corporation)

CryoProbe CPDUL 600S3-C/H-D-05Z (manufactured by Bruker Corporation)

Resonance frequency: 150 MHz
Concentration: 60 wt/vol %
Shift reference: CDCl$_3$ (77 ppm)
Accumulation number: 10.000
Pulse program: zgpg 30 (proton perfect decoupling method, waiting time: 2 sec)

Subsequently, based on the obtained measurement results, the following signal integral values were divided by the number of measured carbons, and the resulting values were used to determine the molar amount of each functional group.

Uretdione group: integral value near 157 ppm÷2
Iminooxadiazinedione group: integral value near 144 ppm÷1
Isocyanurate group: integral value near 148 ppm÷3
Allophanate group: integral value near 154 ppm÷1
Urethane group: integral value near 156.5 ppm÷1–allophanate group integral value
Biuret group: integral value near 156 ppm÷2

Subsequently, the molar amounts determined for the allophanate groups, uretdione groups, iminooxadiazinedione groups, isocyanurate groups, urethane groups and biuret groups were labeled a, b, c, d, e and f respectively, and the ratio (a/a+b+c+d+e+f) of the molar amount of allophanate groups (a) relative to the total molar amount of allophanate groups, uretdione groups, iminooxadiazinedione groups, isocyanurate groups, urethane groups and biuret groups (a+b+c+d+e+f) was determined.

[Physical Property 4-8] Amount of Methane Tetracarbonyl Structures in Blocked Polyisocyanate Composition The amount of methane tetracarbonyl structures relative to the total molar amount within the blocked polyisocyanate composition of polyisocyanates having the compound (I) bonded thereto was calculated using the method described below.

Specifically, based on the results of an $^1$H-NMR measurement performed using an Avance 600 (product name) manufactured by Bruker BioSpin Corporation, the ratio of the molar amount of methane tetracarbonyl structures relative to the total molar amount of methane tetracarbonyl structures, the keto forms of methane tricarbonyl structures and the enol forms of methane tricarbonyl structures (methane tetracarbonyl structures/(methane tetracarbonyl structures+methane tricarbonyl structure keto forms+methane tricarbonyl structure enol forms)) was determined, and this ratio was deemed the amount of methane tetracarbonyl structures. The measurement conditions were as follows.

(Measurement Conditions)

Apparatus: Avance 600 (product name) manufactured by Bruker BioSpin Corporation

Solvent: deuterated chloroform
Accumulation number: 256
Sample concentration: 5.0% by mass
Chemical shift reference: tetramethylsilane was deemed 0 ppm Further, the signal integral values described below were divided by the number of measured carbons, and the resulting values were used to determine the molar amounts of the various structures.

NH protons of methane tetracarbonyl structure represented by general formula (II) shown below: near 8.0 ppm, integral value÷2

[Chemical formula 20]

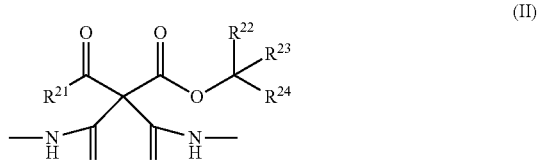

(II)

(In general formula (II), R$^{21}$, R$^{22}$, R$^{23}$ and R$^{24}$ are the same as R$^{11}$, R$^{12}$, R$^{13}$ and R$^{14}$ respectively described above.)

NH proton of keto form of methane tricarbonyl structure represented by general formula (III) shown below and enol form of methane tricarbonyl structure represented by general formula (IV) shown below: near 9.8 ppm, integral value÷1

[Chemical formula 21]

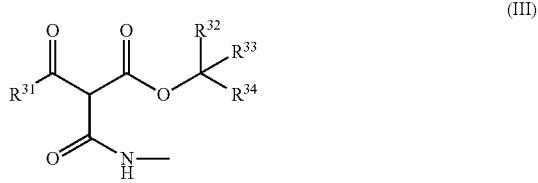

(III)

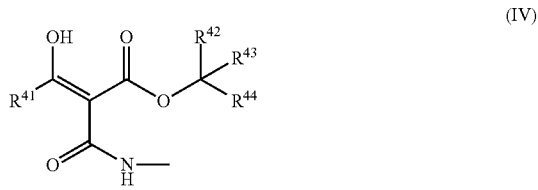

(IV)

(In general formula (III), R$^{31}$, R$^{32}$, R$^{33}$ and R$^{34}$ are the same as R$^{11}$, R$^{12}$, R$^{13}$ and R$^{14}$ respectively described above.

In general formula (IV), R$^{41}$, R$^{42}$, R$^{43}$ and R$^{44}$ are the same as R$^{11}$, R$^{12}$, R$^{13}$ and R$^{14}$ respectively described above.)

NH proton of enol form of methane tricarbonyl structure represented by general formula (V) shown below: near 7.3 ppm integral value÷1

[Chemical formula 22]

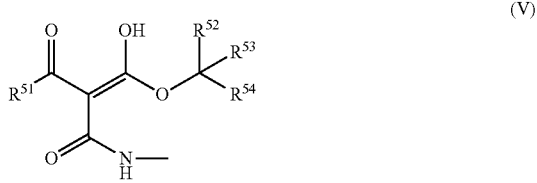

(In general formula (V), $R^{51}$, $R^{52}$, $R^{53}$ and $R^{54}$ are the same as $R^{11}$, $R^{12}$, $R^{13}$ and $R^{14}$ respectively described above.)

[Physical Property 4-9] Amount of Nonionic Hydrophilic Groups in Blocked Polyisocyanate Composition The ratio of the mass of the compound having a nonionic hydrophilic group that was used relative to the mass of the non-volatile fraction (solid fraction amount) of the blocked polyisocyanate composition was determined, and this ratio was deemed the amount of nonionic hydroxyl groups within the blocked polyisocyanate composition.

[Evaluation 4-1] Low-Temperature Curability of Coating Film

An acrylic dispersion (product name: SETAQUA 6510, manufactured by Nuplex Resin Inc., resin fraction concentration: 42%, hydroxyl group concentration: 4.2% (relative to resin)) was blended with each of the polyisocyanate compositions so as to achieve a ratio (isocyanate group/hydroxyl group) of the molar amount of isocyanate groups relative to the molar amount of hydroxyl groups of 0.8, and a mixed solution having a ratio of the mass of water relative to the mass of dipropylene glycol monomethyl ether (water/dipropylene glycol monomethyl ether) of 90/10 was then added to adjust the solid fraction to 37% by mass, thus obtaining a series of coating material compositions. Subsequently, each of the obtained coating material compositions was applied to a polypropylene plate in an amount sufficient to form a dried film thickness of 40 μm, and the applied composition was then heated and dried at 80° C. for 30 minutes, thus obtaining a cured coating film. The low-temperature curability was evaluated by measuring the gel fraction of the obtained coating film. The gel fraction was determined by immersing the coating film in acetone at 23° C. for 24 hours, and was calculated as the value of the mass of the insoluble portion divided by the mass prior to immersion, expressed as a percentage (% by mass).

The obtained gel fraction was used to evaluate the low-temperature curability against the following evaluation criteria.

(Evaluation Criteria)
OO: gel fraction of at least 80% by mass
O: gel fraction of at least 60% by mass but less than 80% by mass
Δ: gel fraction of less than 60% by mass

[Evaluation 4-2] Water Dispersion Stability of Coating Material Composition

Various coating material compositions were prepared using the same method as that described above for "evaluation 4-1". Subsequently, 20 g of each of the obtained coating material compositions was stored in a 20 mL glass vial at 23° C., the external appearance of the composition was inspected, and the occurrence or absence of precipitation and/or separation was evaluated over time. The water dispersion stability was evaluated against the following evaluation criteria.

(Evaluation Criteria)
OO: neither precipitation nor separation occurred
O: precipitation or separation occurred at a time exceeding 10 days
Δ: precipitation or separation occurred at a time prior to 10 days

[Evaluation 4-3] Viscosity Stability of Coating Material Composition

Various coating material compositions were prepared using the same method as that described above for "evaluation 4-1". Subsequently, the viscosity of a 20 g sample of each of the obtained coating material compositions that had been stored in a 20 mL glass vial at 40° C. for 10 days was measured (viscometer: RE-85R manufactured by Toki Sangyo Co., Ltd.). The viscosity stability was evaluated against the following evaluation criteria.

(Evaluation Criteria)
OO: change in viscosity after storage relative to initial viscosity of less than ±30%
O: change in viscosity after storage relative to initial viscosity of at least ±30% but less than ±50%
Δ: change in viscosity after storage relative to initial viscosity of at least ±50%, or a solid formed

[Evaluation 4-4] Coating Film Hardness Retention for Coating Material Composition Various coating material compositions were prepared using the same method as that described above for "evaluation 4-1". Subsequently, 20 g of each coating material composition was stored in a 20 mL glass vial at 40° C. for 10 days. The coating material composition following initial preparation and the coating material composition following storage were each applied to a glass plate in an amount sufficient to generate a dried film thickness of 40 μm, and the applied composition was then heated and dried at 100° C. for 30 minutes, thus obtaining a cured coating film. The Konig hardness of each of the obtained coating films was measured, and the coating film hardness retention was evaluated based on the change in the hardness following storage relative to the initial hardness.

The specific evaluation criteria for the coating film hardness retention were as follows.

(Evaluation Criteria)
OO: ratio of hardness following storage to initial hardness (hardness following storage/initial hardness) of less than 1.2
O: hardness following storage/initial hardness of at least 1.2 but less than 1.5
Δ: hardness following storage/initial hardness of 1.5 or greater

[Evaluation 4-5] Water Resistance of Coating Film

Various coating material compositions were prepared using the same method as that described above for "evaluation 4-1". Subsequently, each of the obtained coating material compositions was applied to a glass plate in an amount sufficient to generate a dried film thickness of 40 μm, and the applied composition was then heated and dried at 100° C. for 30 minutes, thus obtaining a cured coating film. The obtained coating film was immersed in water at 23° C., and after 24 hours, the external appearance of the coating film was inspected and evaluated for the occurrence of coating film cloudiness or blistering. The evaluation criteria for the water resistance were as follows.

(Evaluation Criteria)
O: no occurrence of coating film cloudiness or blistering
Δ: coating film cloudiness or blistering occurred

[Synthesis Example 4-1] Production of Polyisocyanate P4-1

A four-neck flask fitted with a thermometer, a stirring blade and a reflux condenser was charged with 1,000 g of HDI and 33 g of trimethylolpropane under a stream of nitrogen, and the internal temperature of the flask was held at 70° C. while the contents were stirred. Tetramethylammonium hydroxide was then added to the flask, and when the yield reached 48%, phosphoric acid was added to halt the reaction. Following filtering of the reaction liquid, the unreacted HDI was removed using a thin-film distillation device, thus obtaining an isocyanurate polyisocyanate (hereafter sometimes referred to as the "polyisocyanate P4-1").

The NCO content of the obtained polyisocyanate P4-1 was 19.9% by mass, the number average molecular weight was 1,080, and the average isocyanate group number was 5.1.

[Synthesis Example 4-2] Production of Polyisocyanate P4-2

A four-neck flask fitted with a thermometer, a stirring blade and a reflux condenser was charged with 800 g of HDI, 200 g of IPDI and 75 g of trimethylolpropane under a stream of nitrogen, and the internal temperature of the flask was held at 70° C. while the contents were stirred. Tetramethylammonium hydroxide was then added to the flask, and when the yield reached 46%, phosphoric acid was added to halt the reaction. Following filtering of the reaction liquid, the unreacted HDI and IPDI were removed using a thin-film distillation device, thus obtaining an isocyanurate polyisocyanate (hereafter sometimes referred to as the "polyisocyanate P4-2").

The NCO content of the obtained polyisocyanate P4-2 was 18.5% by mass, the number average molecular weight was 1,200, and the average isocyanate group number was 5.3.

[Synthesis Example 4-3] Production of Polyisocyanate P4-3

A four-neck flask fitted with a thermometer, a stirring blade and a reflux condenser was charged with 1,000 g of HDI and 2 g of 2-ethylhexane-1,3-diol under a stream of nitrogen, and the internal temperature of the flask was held at 70° C. while the contents were stirred. Tetramethylammonium hydroxide was then added to the flask, and when the yield reached 40%, phosphoric acid was added to halt the reaction. Following filtering of the reaction liquid, the unreacted HDI was removed using a thin-film distillation device, thus obtaining an isocyanurate polyisocyanate (hereafter sometimes referred to as the "polyisocyanate P4-3").

The NCO content of the obtained polyisocyanate P4-3 was 21.8% by mass, the number average molecular weight was 655, and the average isocyanate group number was 3.4.

[Example 4-1] Production of Blocked Polyisocyanate Composition BL4-1a

A four-neck flask fitted with a thermometer, a stirring blade and a reflux condenser was charged, under a stream of nitrogen, with 100 g of the polyisocyanate P4-1 obtained in Synthesis Example 4-1 and 33 g of a polyethylene oxide (product name: MPG-081, manufactured by Nippon Nyukazai Co., Ltd., number average molecular weight: 690) as a hydrophilic compound, and the mixture was stirred under heating at 120° C. for 4 hours. Subsequently, the reaction liquid was cooled to room temperature, 80 g of diisopropyl malonate and 142 g of dipropylene glycol dimethyl ether (DPDM) were added, 0.9 parts of a methanol solution containing sodium methylate (28% by mass) was then added at room temperature, and a blocking reaction was conducted at 40° C. for 4 hours, thus obtaining a blocked polyisocyanate composition BL4-1a. The obtained blocked polyisocyanate composition BL4-1a had a non-volatile fraction of 60% by mass, an effective NCO content of 5.0% by mass, an amount of isocyanurate trimer of 12% by mass, a value for a/(a+b+c+d+e+f) of 0.28, an amount of methane tetracarbonyl structures of 3.1 mol %, and an amount of nonionic hydrophilic groups of 15.4% by mass.

The low-temperature curability of a coating film obtained using the blocked polyisocyanate composition BL4-1a was evaluated OO, the water dispersion stability of the coating material composition was evaluated OO, the viscosity change for the coating material composition was evaluated OO, the coating film hardness retention for the coating material composition was evaluated OO, and the coating film water resistance was evaluated O. The above physical properties and evaluations are also shown in Table 4.

[Examples 4-2 to 4-13, and Comparative Example 4-1] Production of Blocked Polyisocyanate Compositions BL4-2a to BL4-13a and BL4-1b With the exceptions of using the types and amounts of polyisocyanates, hydrophilic compounds and blocking agents and the amounts of solvent shown in Table 4, the same method as that described for Example 4-1 was used to produce blocked polyisocyanate compositions.

The types of hydrophilic compounds and blocking agents shown in Table 4 are as follows.

(Hydrophilic Compounds)

H4-1: a polyethylene oxide (product name: MPG-081, manufactured by Nippon Nyukazai Co., Ltd., number average molecular weight: 690)

H4-2: a polyethylene oxide (product name: MPG-130U, manufactured by Nippon Nyukazai Co., Ltd., number average molecular weight: 420)

H4-3: hydroxypivalic acid (HPA) (number average molecular weight: 119)

(Blocking Agents)

B4-1: diisopropyl malonate

B4-2: di-sec-butyl malonate

B4-3: di-tert-butyl malonate

B4-4: di-tert-pentyl malonate

B4-5: tert-butylethyl malonate

B4-6: isopropylethyl malonate

B4-7: diethyl malonate

B4-8: isopropyl acetoacetate

Further, evaluation of various physical properties of the obtained blocked polyisocyanate compositions, and evaluations of the coating material compositions and coating films obtained using the blocked polyisocyanate compositions were conducted using the methods described above. The results are shown in Table 4.

TABLE 4

|  | Example 4-1 | Example 4-2 | Example 4-3 | Example 4-4 | Example 4-5 | Example 4-6 | Example 4-7 |
|---|---|---|---|---|---|---|---|
| Blocked polyisocyanate composition | BL4-1a | BL4-2a | BL4-3a | BL4-4a | BL4-5a | BL4-6a | BL4-7a |
| Polyisocyanate | P4-1 | P4-1 | P4-1 | P4-1 | P4-1 | P4-1 | P4-1 |
|  | 100 g | 100 g | 100 g | 100 g | 100 g | 100 g | 100 g |
| Hydrophilic compound | H4-1 | H4-1 | H4-1 | H4-1 | H4-1 | H4-1 | H4-1 |
|  | 33 g | 33 g | 33 g | 33 g | 33 g | 33 g | 33 g |
| Blocking agent | B4-1 | B4-2 | B4-3 | B4-4 | B4-5 | B4-6 | B4-1 |
|  | 80 g | 92 g | 92 g | 104 g | 74 g | 68 g | 71 g |
|  |  |  |  |  |  |  | B4-8 |
|  |  |  |  |  |  |  | 14 g |
| Solvent: DPDM | 142 g | 150 g | 150 g | 158 g | 138 g | 134 g | 145 g |
| [Physical property 4-4] Non-volatile fraction [% by mass] | 60 | 60 | 60 | 60 | 60 | 60 | 60 |
| [Physical property 4-5] Effective NCO content [% by mass] | 5.0 | 4.8 | 4.8 | 4.5 | 5.2 | 5.3 | 4.9 |
| [Physical property 4-6] Amount of isocyanurate trimer [% by mass] | 12 | 13 | 12 | 13 | 13 | 13 | 14 |
| [Physical property 4-7] a/(a + b + c + d + e + f) | 0.28 | 0.27 | 0.28 | 0.29 | 0.28 | 0.28 | 0.26 |
| [Physical property 4-8] Amount of methane tetracarbonyl structures [% by mass] | 3.1 | 2.9 | 3.5 | 3.1 | 3.3 | 3.5 | 2.8 |
| [Physical property 4-9] Amount of nonionic hydrophilic groups [% by mass] | 15.4 | 14.5 | 14.5 | 13.8 | 15.8 | 16.3 | 15.0 |
| [Evaluation 4-1] Low-temperature curability of coating film | ⊙ | ⊙ | ⊙ | ⊙ | ○ | ○ | ○ |
| [Evaluation 4-2] Water dispersion stability of coating material composition | ⊙ | ⊙ | ⊙ | ⊙ | ⊙ | ⊙ | ⊙ |
| [Evaluation 4-3] Viscosity stability of coating material composition | ⊙ | ⊙ | ○ | ○ | ○ | ○ | ⊙ |
| [Evaluation 4-4] Coating film hardness retention for coating material composition | ⊙ | ⊙ | ○ | ○ | ○ | ○ | ⊙ |
| [Evaluation 4-5] Water resistance of coating film | ○ | ○ | ○ | ○ | ○ | ○ | ○ |

|  | Example 4-8 | Example 4-9 | Example 4-10 | Example 4-11 | Example 4-12 | Example 4-13 | Comparative Example 4-1 |
|---|---|---|---|---|---|---|---|
| Blocked polyisocyanate composition | BL4-8a | BL4-9a | BL4-10a | BL4-11a | BL4-12a | BL4-13a | BL4-1b |
| Polyisocyanate | P4-2 | P4-3 | P4-1 | P4-1 | P4-1 | P4-1 | P4-1 |
|  | 100 g | 100 g | 100 g | 100 g | 100 g | 100 g | 100 g |
| Hydrophilic compound | H4-1 | H4-1 | H4-2 | H4-3 | H4-2 | H4-2 | H4-1 |
|  | 30 g | 36 g | 20 g | 14 g | 10 g | 6 g | 33 g |
| Blocking agent | B4-1 | B4-1 | B4-1 | B4-1 | B4-1 | B4-1 | B4-7 |
|  | 75 g | 88 g | 80 g | 67 g | 85 g | 86 g | 68 g |
| Solvent: DPDM | 137 g | 149 g | 133 g | 121 g | 130 g | 128 g | 134 g |
| [Physical property 4-4] Non-volatile fraction [% by mass] | 60 | 60 | 60 | 60 | 60 | 60 | 60 |
| [Physical property 4-5] Effective NCO content [% by mass] | 4.9 | 5.3 | 5.4 | 5.9 | 5.5 | 5.6 | 5.3 |
| [Physical property 4-6] Amount of isocyanurate trimer [% by mass] | 11 | 46 | 18 | 20 | 20 | 22 | 13 |
| [Physical property 4-7] a/(a + b + c + d + e + f) | 0.31 | 0.10 | 0.28 | 0.29 | 0.29 | 0.30 | 0.28 |
| [Physical property 4-8] Amount of methane tetracarbonyl structures [% by mass] | 3.0 | 3.5 | 3.0 | 3.1 | 3.1 | 2.9 | 0.0 |
| [Physical property 4-9] Amount of nonionic hydrophilic groups [% by mass] | 14.8 | 16.0 | 9.9 | — | 5.1 | 3.1 | 16.3 |
| [Evaluation 4-1] Low-temperature curability of coating film | ⊙ | ○ | ⊙ | ⊙ | ⊙ | ⊙ | Δ |
| [Evaluation 4-2] Water dispersion stability of coating material composition | ⊙ | ⊙ | ⊙ | ⊙ | ⊙ | ○ | Δ |
| [Evaluation 4-3] Viscosity stability of coating material composition | ⊙ | ⊙ | ⊙ | ⊙ | ⊙ | ⊙ | Δ |
| [Evaluation 4-4] Coating film hardness retention for coating material composition | ⊙ | ⊙ | ⊙ | ⊙ | ⊙ | ⊙ | Δ |
| [Evaluation 4-5] Water resistance of coating film | ○ | ○ | ○ | ⊙ | ⊙ | ⊙ | ○ |

Table 4 reveals that for the blocked polyisocyanate compositions BL4-1a to BL4-13a containing a blocked polyisocyanate obtained from a polyisocyanate, the compound (I) as a blocking agent, and a hydrophilic compound (Examples 4-1 to 4-13), coating material compositions of excellent water dispersion stability, viscosity stability and coating film hardness retention were able to be obtained. Further, by using these coating material compositions, coating films having excellent low-temperature curability and water resistance were able to be obtained.

In contrast, for the blocked polyisocyanate composition BL4-1b containing a blocked polyisocyanate obtained from a polyisocyanate, a blocking agent other than the compound (I), and a hydrophilic compound (Comparative Example 4-1), a combination of favorable water dispersion stability, viscosity stability and coating film hardness retention when used as a coating material composition, and favorable low-temperature curability and water resistance when used as a coating film could not be achieved.

Further, in the blocked polyisocyanate compositions BL4-1a to BL4-13a (Examples 4-1 to 4-13), as the amount of the hydrophilic compound was increased, a tendency for improved water dispersion stability of the coating material composition was observed.

Furthermore, in the blocked polyisocyanate compositions BL4-1a, BL4-2a, and BL4-7a to BL4-13a that used either B4-1 (diisopropyl malonate) or B4-2 (di-sec-butyl malonate) as the blocking agent (Examples 4-1, 4-2, and 4-7 to 4-13), the viscosity stability and coating film hardness retention when used as a coating material composition were particularly superior compared with the blocked polyisocyanate compositions BL4-3a to BL4-6a that used the blocking agents B4-3 to B4-6 (Examples 4-3 to 4-6).

Further, the blocked polyisocyanate compositions BL4-11a to BL4-13a in which the amount of nonionic hydrophilic groups was 5.1% by mass or less (Examples 4-11 to 4-13) exhibited particularly favorable water resistance as a coating film compared with the blocked polyisocyanate compositions BL4-1a to BL4-10a in which the amount of nonionic hydrophilic groups was greater than the above value (Examples 4-1 to 4-10).

Examples 5-1 to 5-13, and Comparative Example 5-1

The polyisocyanates synthesized in the synthesis examples, the blocked polyisocyanate compositions produced in the production examples, the adhesive compositions produced in the examples and comparative example, and the easy adhesion treated laminate containing an easy adhesion treated layer obtained by applying the adhesive composition to an adherend were each subjected to measurement and evaluation of various physical properties in accordance with the methods described below.

[Physical Property 5-1] Isocyanate Group (NCO) Content of Polyisocyanate

First, 1 to 3 g of the polyisocyanate was weighed accurately into a conical flask (W g). Next, 20 mL of toluene was added, and the polyisocyanate was dissolved. Subsequently, 10 mL of a 2N toluene solution of di-n-butylamine was added, and following mixing, the mixture was left to stand for 15 minutes at room temperature. Next, 70 mL of isopropyl alcohol was added and mixed. The resulting liquid was then titrated with a 1N hydrochloric acid solution (factor F) using an indicator. The thus obtained titer was deemed V2 mL. Subsequently, the same operation was repeated without the polyisocyanate, and the obtained titer was deemed V1 mL. The formula (1) shown below was then used to calculate the isocyanate group (NCO) content of the polyisocyanate.

$$\text{NCO content [\% by mass]} = (V1-V2) \times F \times 42/(W \times 1000) \times 100 \qquad (1)$$

[Physical Property 5-2] Number Average Molecular Weight (Mn) of Polyisocyanate

Using the polyisocyanate as a sample, the number average molecular weight (Mn) of the polyisocyanate was determined as the polystyrene-equivalent number average molecular weight by measurement with a gel permeation chromatograph using the apparatus and conditions described below.

(Measurement Conditions)
Apparatus: HLC-802A (manufactured by Tosoh Corporation)
Columns: 1×G1000HXL (manufactured by Tosoh Corporation), 1×G2000HXL (manufactured by Tosoh Corporation), and 1×G3000HXL (manufactured by Tosoh Corporation)
Carrier: tetrahydrofuran
Flow rate: 0.6 mL/minute
Sample concentration: 1.0% by mass
Injection volume: 20 μL
Temperature: 40° C.
Detection method: refractive index detector

[Physical Property 5-3] Average Isocyanate Number of Polyisocyanate

Using the polyisocyanate as a sample, the average isocyanate number was determined using formula (2) shown below.

$$\text{Average isocyanate number} = (\text{number average molecular weight (Mn) of polyisocyanate} \times \text{NCO content (\% by mass)} \times 0.01)/42 \qquad (2)$$

[Physical Property 5-4] Solid Fraction Amount of Blocked Polyisocyanate Composition The solid fraction amount of the blocked polyisocyanate composition was determined in the following manner.

First, an aluminum dish with a base diameter of 38 mm was weighed accurately. About 1 g of the blocked polyisocyanate composition produced in the example or comparative example was then weighed accurately onto the aluminum dish (W1). Subsequently, the blocked polyisocyanate composition was adjusted to a uniform thickness. The blocked polyisocyanate composition mounted on the aluminum dish was then placed in a 105° C. oven for one hour. The aluminum dish was then returned to room temperature, and the blocked polyisocyanate composition remaining on the aluminum dish was weighed accurately (W2). The solid fraction amount (% by mass) of the blocked polyisocyanate composition was then calculated from formula (3) shown below.

$$\text{Solid fraction amount of blocked polyisocyanate composition [\% by mass]} = W2/W1 \times 100 \qquad (3)$$

[Physical Property 5-5] Effective Isocyanate Group (NCO) Content of Blocked Polyisocyanate Composition The effective isocyanate group (NCO) content of the blocked polyisocyanate composition was determined in the following manner.

Here, the expression "effective isocyanate group (NCO) content" is a quantification of the amount of blocked isocyanate groups capable of participating in crosslinking reactions that exist within the blocked polyisocyanate composition following the blocking reaction, and is expressed as a % by mass value of the isocyanate groups.

The effective NCO content was calculated using formula (4) shown below. In formula (4), the "NCO content of the polyisocyanate" and the "solid fraction amount of the blocked polyisocyanate composition" used the values calculated above for the physical property 5-1 and the physical property 5-4 respectively. In those cases where the sample was diluted with a solvent or the like, the effective NCO content value was calculated in the diluted state.

$$\text{Effective NCO Content [\% by mass]} = [(\text{solid fraction amount of blocked polyisocyanate composition [\% by mass]}) \times \{(\text{mass of polyisocyanate used in blocking reaction}) \times (\text{NCO content of polyisocyanate [\% by mass]})\}]/(\text{mass of blocked polyisocyanate composition following blocking reaction}) \qquad (4)$$

[Physical Property 5-6] Amount of Isocyanurate Trimer Blocked with Three Molecules of Blocking Agent in Blocked Polyisocyanate Composition Using the blocked polyisocyanate composition as a sample, and using the same measurement method as that described for the number average molecular weight of the polyisocyanate determined above in "physical property 5-2", the blocked polyisocyanate composition was subjected to a gel permeation chromatography measurement. The obtained measurement results were then used to determine the ratio of the surface area for the isocyanurate trimer blocked with three molecules of the blocking agent relative to the surface area for the entire blocked polyisocyanate composition, and this ratio was deemed to represent the amount of the isocyanurate trimer blocked with three molecules of the blocking agent within the blocked polyisocyanate composition.

[Physical Property 5-7] Ratio of Molar Amount of Allophanate groups Relative to Total Molar Amount of Allophanate Groups, Uretdione Groups, Iminooxadiazinedione Groups, Isocyanurate Groups, Urethane groups and Biuret Groups a/(a+b+c+d+e+f)

Using a Biospin Avance 600 (product name) manufactured by Bruker Corporation, a $^{13}$C-NMR measurement was conducted under the conditions listed below, and the molar amounts of allophanate groups, isocyanurate groups, uretdione groups, iminooxadiazinedione groups, urethane groups and biuret groups in the blocked isocyanate component were each determined.

(Measurement Conditions)

$^{13}$C-NMR apparatus: AVANCE 600 (manufactured by Bruker Corporation)

CryoProbe CPDUL 600S3-C/H-D-05Z (manufactured by Bruker Corporation)

Resonance frequency: 150 MHz

Concentration: 60 wt/vol %

Shift reference: CDCl$_3$ (77 ppm)

Accumulation number: 10,000

Pulse program: zgpg 30 (proton perfect decoupling method, waiting time: 2 sec)

Subsequently, based on the obtained measurement results, the following signal integral values were divided by the number of measured carbons, and the resulting values were used to determine the molar amount of each functional group.

Uretdione group: integral value near 157 ppm÷2

Iminooxadiazinedione group: integral value near 144 ppm÷1

Isocyanurate group: integral value near 148 ppm÷3

Allophanate group: integral value near 154 ppm÷1

Urethane group: integral value near 156.5 ppm÷1–allophanate group integral value Biuret group: integral value near 156 ppm÷2

Subsequently, the molar amounts determined for the allophanate groups, uretdione groups, iminooxadiazinedione groups, isocyanurate groups, urethane groups and biuret groups were labeled a, b, c, d, e and f respectively, and the ratio (a/a+b+c+d+e+f) of the molar amount of allophanate groups (a) relative to the total molar amount of allophanate groups, uretdione groups, iminooxadiazinedione groups, isocyanurate groups, urethane groups and biuret groups (a+b+c+d+e+f) was determined.

[Physical Property 5-8] Amount of Methane Tetracarbonyl Structures in Blocked Polyisocyanate Composition The amount of methane tetracarbonyl structures relative to the total molar amount within the blocked polyisocyanate composition of polyisocyanates having the compound (1) bonded thereto was calculated using the method described below.

Specifically, based on the results of an $^1$H-NMR measurement performed using an Avance 600 (product name) manufactured by Bruker BioSpin Corporation, the ratio of the molar amount of methane tetracarbonyl structures relative to the total molar amount of methane tetracarbonyl structures, the keto forms of methane tricarbonyl structures and the enol forms of methane tricarbonyl structures (methane tetracarbonyl structures/(methane tetracarbonyl structures+methane tricarbonyl structure keto forms+methane tricarbonyl structure enol forms)) was determined, and this ratio was deemed the amount of methane tetracarbonyl structures. The measurement conditions were as follows.

(Measurement Conditions)

Apparatus: Avance 600 (product name) manufactured by Bruker BioSpin Corporation

Solvent: deuterated chloroform

Accumulation number: 256

Sample concentration: 5.0% by mass

Chemical shift reference: tetramethylsilane was deemed 0 ppm

Further, the signal integral values described below were divided by the number of measured carbons, and the resulting values were used to determine the molar amounts of the various structures.

NH protons of methane tetracarbonyl structure represented by general formula (II) shown below: near 8.0 ppm, integral value÷2

[Chemical formula 23]

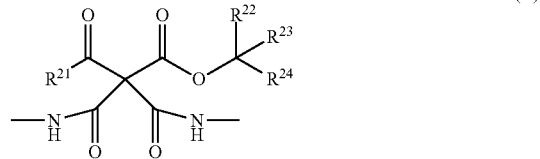

(II)

(In general formula (II), $R^{21}$, $R^{22}$, $R^{23}$ and $R^{24}$ are the same as $R^{11}$, $R^{12}$, $R^{13}$ and $R^{14}$ respectively described above.)

NH proton of keto form of methane tricarbonyl structure represented by general formula (III) shown below and enol form of methane tricarbonyl structure represented by general formula (IV) shown below: near 9.8 ppm, integral value÷1

[Chemical formula 24]

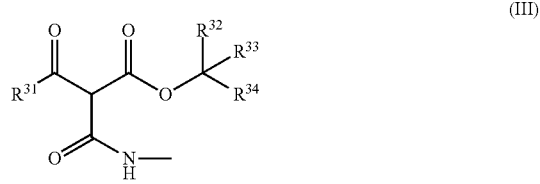

(III)

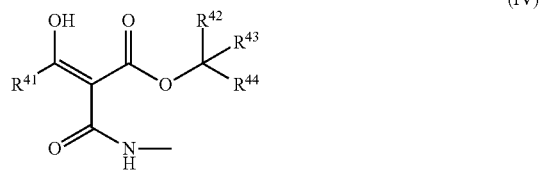

(IV)

(In general formula (III), $R^{31}$, $R^{32}$, $R^{33}$ and $R^{34}$ are the same as $R^{11}$, $R^{12}$, $R^{13}$ and $R^{14}$ respectively described above.

In general formula (IV), $R^{41}$, $R^{42}$, $R^{43}$ and $R^{44}$ are the same as $R^{11}$, $R^{12}$, $R^{13}$ and $R^{14}$ respectively described above.)

NH proton of enol form of methane tricarbonyl structure represented by general formula (V) shown below: near 7.3 ppm, integral value÷1

[Chemical formula 25]

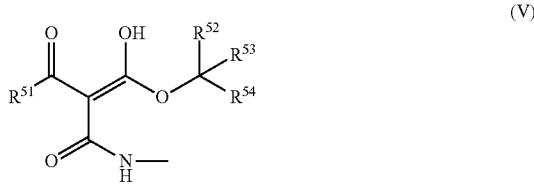

(V)

(In general formula (V), $R^{51}$, $R^{52}$, $R^{53}$ and $R^{54}$ are the same as $R^{11}$, $R^{12}$, $R^{13}$ and $R^{14}$ respectively described above.)

[Physical Property 5-9] Amount of Nonionic Hydrophilic Groups in Blocked Polyisocyanate Composition The ratio of the mass of the compound having a nonionic hydrophilic group that was used relative to the mass of the solid fraction amount of the blocked polyisocyanate composition was determined, and this ratio was deemed the amount of nonionic hydroxyl groups within the blocked polyisocyanate composition.

[Production of Laminated Polyester Plate]

A polyethylene terephthalate plate (product name: Super PET Plate PET-6010, film thickness: 4 mm) manufactured by TAXIRON Corporation was used as a polyester plate.

Each of the adhesive compositions prepared with a resin solid fraction of 10% by mass was applied to the surface of an aforementioned polyethylene terephthalate plate with an applicator, and was then dried at 90° C. for 30 minutes. Subsequently, a heat treatment step was conducted at 200° C. for one minute, and the resulting structure was then cooled to obtain an easy adhesion treated polyester plate having an easy adhesion treated layer with a thickness of 0.1 μm.

Further, with the exception of performing the heat treatment step under conditions of 180° C. for one minute, a separate easy adhesion treated polyester plate was produced using the same method as that described above.

Moreover, an ultraviolet-curable acrylic resin having the composition described below was applied to the surface of the easy adhesion treated layer using an applicator, and the plate surface of the resulting structure was then irradiated for 5 minutes with ultraviolet rays having a cumulative dose of 900 mJ/cm² using an ultraviolet lamp, thus obtaining a laminated polyester plate having an ultraviolet-cured acrylic resin layer with a thickness of 20 μm.

(Ultraviolet-Curable Acrylic Resin Composition)

2,2-bis(4-(acryloxydiethoxy)phenyl)propane (NK Ester A-BPE-4 (product name), manufactured by Shin-Nakamura Chemical Co., Ltd.): 50% by mass Tetrahydrofurfuryl acrylate (Viscoat #150 (product name), manufactured by Osaka Organic Chemistry Industry Ltd.): 40% by mass Photopolymerization initiator (IRGACURE (a registered trademark) 184 (product name), manufactured by Ciba Specialty Chemicals Inc.): 10% by mass

[Evaluation 5-1] Initial Adhesion

Using a cutting guide with a spacing interval of 2 mm, the ultraviolet-cured acrylic resin layer surface of each of the obtained laminated polyester plates was cut to a depth that only penetrated through the ultraviolet-cured acrylic resin layer to form 100 grid squares. Subsequently, a cellophane adhesive tape (No. 405 manufactured by Nichiban Co., Ltd., width: 24 mm) was affixed to the grid-shaped cut surface and rubbed with an eraser to ensure complete adhesion. The cellophane adhesive tape was then pulled rapidly from ultraviolet-cured acrylic resin layer surface of the laminated polyester plate at a peel angle of 180°, the peeled surface was inspected, and the number of peeled grid squares was counted. The evaluation criteria for the initial adhesion were as follows.

(Evaluation Criteria)

OO: number of peeled grid squares was 0

O: number of peeled grid squares was at least 1 but not more than 20

Δ: number of peeled grid squares was at least 21 but not more than 40 x: number of peeled grid squares was 41 or greater

[Evaluation 5-2] Adhesion Following Humidity and Heat Resistance Test

Each of the obtained laminated polyester plates was left to stand in a high-temperature high-humidity chamber in an environment of 80° C. and 95% RH for 48 hours. Subsequently, the laminated polyester plate was removed and left to stand at normal temperature for 10 hours. Using the same method as the initial adhesion evaluation, the adhesion following a humidity and heat resistance test was then evaluated against the following evaluation criteria (Evaluation Criteria)

OO: number of peeled grid squares was 0

O: number of peeled grid squares was at least 1 but not more than 20

Δ: number of peeled grid squares was at least 21 but not more than 40 x: number of peeled grid squares was 41 or greater

Synthesis of Polyisocyanates

[Synthesis Example 5-1] Synthesis of Polyisocyanate P5-1

A four-neck flask fitted with a thermometer, a stirring blade and a reflux condenser was charged with 1.000 g of HDI and 33 g of trimethylolpropane under a stream of nitrogen, and the internal temperature of the flask was held at 70° C. while the contents were stirred. Tetramethylammonium hydroxide was then added to the flask, and when the yield reached 48%, phosphoric acid was added to halt the reaction. Following filtering of the reaction liquid, the unreacted HDI was removed using a thin-film distillation device, thus obtaining an isocyanurate polyisocyanate (hereafter sometimes referred to as the "polyisocyanate P5-1").

The NCO content of the obtained polyisocyanate P5-1 was 19.9% by mass, the number average molecular weight was 1,080, and the average isocyanate group number was 5.1.

[Synthesis Example 5-2] Synthesis of Polyisocyanate P5-2

A four-neck flask fitted with a thermometer, a stirring blade and a reflux condenser was charged with 800 g of HDI, 200 g of IPDI and 75 g of trimethylolpropane under a stream of nitrogen, and the internal temperature of the flask was held at 70° C. while the contents were stirred. Tetramethylammonium hydroxide was then added to the flask, and when the yield reached 46%, phosphoric acid was added to halt the reaction. Following filtering of the reaction liquid, the unreacted HDI and IPDI were removed using a thin-film distillation device, thus obtaining an isocyanurate polyisocyanate (hereafter sometimes referred to as the "polyisocyanate P5-2").

The NCO content of the obtained polyisocyanate P5-2 was 18.5% by mass, the number average molecular weight was 1,200, and the average isocyanate group number was 5.3.

[Synthesis Example 5-3] Synthesis of Polyisocyanate P5-3

A four-neck flask fitted with a thermometer, a stirring blade and a reflux condenser was charged with 1,000 g of HDI and 2 g of 2-ethylhexane-1,3-diol under a stream of nitrogen, and the internal temperature of the flask was held at 70° C. while the contents were stirred. Tetramethylammonium hydroxide was then added to the flask, and when the yield reached 40%, phosphoric acid was added to halt the reaction. Following filtering of the reaction liquid, the unreacted HDI was removed using a thin-film distillation device, thus obtaining an isocyanurate polyisocyanate (hereafter sometimes referred to as the "polyisocyanate P5-3").

The NCO content of the obtained polyisocyanate P5-3 was 21.8% by mass, the number average molecular weight was 655, and the average isocyanate group number was 3.4.

Production of Blocked Isocyanate Component

[Production Example 5-1] Production of Blocked Polyisocyanate Composition BL5-1a A four-neck flask fitted with a thermometer, a stirring blade and a reflux condenser was charged, under a stream of nitrogen, with 100 g of the polyisocyanate P5-1 obtained in Synthesis Example 5-1 and 33 g of a polyethylene oxide (product name: MPG-081, manufactured by Nippon Nyukazai Co., Ltd., number average molecular weight: 690) as a hydrophilic compound, and the mixture was stirred under heating at 120° C. for 4 hours. Subsequently, the reaction liquid was cooled to room temperature, 80 g of diisopropyl malonate and 142 g of dipropylene glycol dimethyl ether (DPDM) were added, 0.9 parts of a methanol solution containing sodium methylate (28% by mass) was then added at room temperature, and a blocking reaction was conducted at 40° C. for 4 hours, thus obtaining a blocked polyisocyanate composition BL5-1a. The obtained blocked polyisocyanate composition BL5-1a had a solid fraction of 60% by mass, an effective NCO content of 5.0% by mass, an amount of isocyanurate trimer of 12% by mass, a value for a/(a+b+c+d+e+f) of 0.28, an amount of methane tetracarbonyl structures of 3.1 mol %, and an amount of nonionic hydrophilic groups of 15.4% by mass.

[Production Examples 5-2 to 5-14] Production of Blocked Polyisocyanate Compositions BL5-2a to BL5-13a and BL5-1b With the exceptions of using the types and amounts of polyisocyanates, hydrophilic compounds and blocking agents and the amounts of solvent shown in Table 5, the same method as that described for Production Example 5-1 was used to produce blocked polyisocyanate compositions BL5-2a to BL5-13a and BL5-1 b.

The composition and physical properties of each of the obtained blocked polyisocyanate compositions BL5-2a to BL5-13a and BL5-1b are shown in Table 5. In Table 5, the types of hydrophilic compounds and blocking agents are as follows.

(Hydrophilic Compounds)
H5-1: a polyethylene oxide (product name: MPG-081, manufactured by Nippon Nyukazai Co., Ltd., number average molecular weight: 690)
H5-2: a polyethylene oxide (product name: MPG-130U, manufactured by Nippon Nyukazai Co., Ltd., number average molecular weight: 420)
H5-3: hydroxypivalic acid (HPA) (number average molecular weight: 119)
(Blocking Agents)
B5-1: diisopropyl malonate
B5-2: di-sec-butyl malonate
B5-3: di-tert-butyl malonate
B5-4: di-tert-pentyl malonate
B5-5: tert-butylethyl malonate
B5-6: isopropylethyl malonate
B5-7: diethyl malonate
B5-8: isopropyl acetoacetate

TABLE 5

| Blocked polyisocyanate composition | | Production Example 5-1 BL5-1a | Production Example 5-2 BL5-2a | Production Example 5-3 BL5-3a | Production Example 5-4 BL5-4a | Production Example 5-5 BL5-5a | Production Example 5-6 BL5-6a | Production Example 5-7 BL5-7a |
|---|---|---|---|---|---|---|---|---|
| Composition | Polyisocyanate | P5-1 100 g | P5-1 100 g | P5-1 100 g | P5-1 100 g | P5-1 100 g | P5-1 100 g | P5-1 100 g |
| | Hydrophilic compound | H5-1 33 g | H5-1 33 g | H5-1 33 g | H5-1 33 g | H5-1 33 g | H5-1 33 g | H5-1 33 g |
| | Blocking agent | B5-1 80 g | B5-2 92 g | B5-3 92 g | B5-4 104 g | B5-5 74 g | B5-6 68 g | B5-1 71 g B5-8 14 g |
| | Solvent: DPDM | 142 g | 150 g | 150 g | 158 g | 138 g | 134 g | 145 g |
| Physical properties | [Physical property 5-4] Solid fraction [% by mass] | 60 | 60 | 60 | 60 | 60 | 60 | 60 |
| | [Physical property 5-5] Effective NCO content [% by mass] | 5 | 4.8 | 4.8 | 4.5 | 5.2 | 5.3 | 4.9 |
| | [Physical property 5-6] Amount of isocyanurate trimer [% by mass] | 12 | 13 | 12 | 13 | 13 | 13 | 14 |
| | [Physical property 5-7] a/(a + b + c + d + e + f) | 0.28 | 0.27 | 0.28 | 0.29 | 0.28 | 0.28 | 0.26 |
| | [Physical properly 5-8] Amount of methane tetracarbonyl structures [% by mass] | 3.1 | 2.9 | 3.5 | 3.1 | 3.3 | 3.5 | 2.8 |

TABLE 5-continued

| | | | | | | | | |
|---|---|---|---|---|---|---|---|---|
| [Physical property 4-9] Amount of nonionic hydrophilic groups [% by mass] | | 15.4 | 14.5 | 14.5 | 13.8 | 15.8 | 16.3 | 15 |

| | | Production Example 5-8 BL5-8a | Production Example 5-9 BL5-9a | Production Example 5-10 BL5-10a | Production Example 5-11 BL5-11a | Production Example 5-12 BL5-12a | Production Example 5-13 BL5-13a | Production Example 5-14 BL5-1b |
|---|---|---|---|---|---|---|---|---|
| Blocked polyisocyanate composition | | | | | | | | |
| Composition | Polyisocyanate | P5-2 | P5-3 | P5-1 | P5-1 | P5-1 | P5-1 | P5-1 |
| | | 100 g | 100 g | 100 g | 100 g | 100 g | 100 g | 100 g |
| | Hydrophilic compound | H5-1 | H5-1 | H5-2 | H5-3 | H5-2 | H5-2 | H5-1 |
| | | 30 g | 36 g | 20 g | 14 g | 10 g | 6 g | 33 g |
| | Blocking agent | B5-1 | B5-1 | B5-1 | B5-1 | B5-1 | B5-1 | B5-7 |
| | | 75 g | 88 g | 80 g | 67 g | 85 g | 86 g | 68 g |
| | Solvent: DPDM | 137 g | 149 g | 133 g | 121 g | 130 g | 128 g | 134 g |
| Physical properties | [Physical property 5-4] Solid fraction [% by mass] | 60 | 60 | 60 | 60 | 60 | 60 | 60 |
| | [Physical property 5-5] Effective NCO content [% by mass] | 4.9 | 5.3 | 5.4 | 5.9 | 5.5 | 5.6 | 5.3 |
| | [Physical property 5-6] Amount of isocyanurate trimer [% by mass] | 11 | 46 | 18 | 20 | 20 | 22 | 13 |
| | [Physical property 5-7] a/(a + b + c + d + e + f) | 0.31 | 0.1 | 0.28 | 0.29 | 0.29 | 0.3 | 0.28 |
| | [Physical property 5-8] Amount of methane tetracarbonyl structures [% by mass] | 3 | 3.5 | 3 | 3.1 | 3.1 | 2.9 | 0 |
| | [Physical property 4-9] Amount of nonionic hydrophilic groups [% by mass] | 14.8 | 16 | 9.9 | — | 5.1 | 3.1 | 16.3 |

<Production of Binder Resin Component>

A resin composed of 80 parts of a polycarbonate formed from 1,6-hexanediol and diethyl carbonate and having a number average molecular weight of 2,000, 4 parts of a polyethylene glycol having a number average molecular weight of 400, 8 parts of 4,4'-dicyclohexylmethane diisocyanate and 3 parts of dimethylolpropionic acid was neutralized with triethylamine to obtain a polycarbonate resin 1.

Production of Adhesive Compositions

[Example 5-1] Production of Adhesive Composition S5-1a

First, 7.0 parts of the polycarbonate resin 1, 3.0 parts of the blocked polyisocyanate BL5-1a obtained in Production Example 1, 5.0 parts of diethylene glycol dimethyl ether and 85.0 parts of water were added to a flask and mixed under constant stirring. Following addition of all of these components, stirring was continued for a further 10 minutes, thus obtaining an adhesive composition S5-1a with a solid fraction of 10% by mass. The components and proportions in the obtained adhesive composition S5-1a are shown below in Table 6. Using the thus obtained adhesive composition S5-1a, a laminated polyester plate was produced using the method described above, and various evaluations were then conducted. The results are shown below in Table 6.

[Examples 5-2 to 5-13, and Comparative Example 5-1] Production of Adhesive Compositions S5-2a to S5-13a and S5-1b With the exception of altering the composition as shown in Table 6, adhesive compositions S5-2a to S5-13a and S5-1b were produced using the same method as Example 5-1. The components and proportions in the obtained adhesive compositions S5-2a to S5-13a and S5-1b are shown below in Table 6. Further, using the thus obtained adhesive compositions S5-2a to S5-13a and S5-1b, laminated polyester plates were produced using the method described above, and various evaluations were then conducted. The results are shown below in Table 6.

TABLE 6

| | | | Example 5-1 S5-1a | Example 5-2 S5-2a | Example 5-3 S5-3a | Example 5-4 S5-4a | Example 5-5 S5-5a | Example 5-6 S5-6a | Example 5-7 S5-7a |
|---|---|---|---|---|---|---|---|---|---|
| | Adhesive composition | | | | | | | | |
| Composition | Binder resin component | Polycarbonate resin 1 amount [parts] | 7 | 7 | 7 | 7 | 7 | 7 | 7 |
| | Crosslinking agent component | Type | BL5-1a | BL5-2a | BL5-3a | BL5-4a | BL5-5a | BL5-6a | BL5-7a |
| | | Amount [parts] | 3 | 3 | 3 | 3 | 3 | 3 | 3 |
| | Water | Amount [parts] | 85 | 85 | 85 | 85 | 85 | 85 | 85 |
| | Diethylene glycol dimethyl ether | Amount [parts] | 5 | 5 | 5 | 5 | 5 | 5 | 5 |
| Evaluations | [Evaluation 5-1] Initial adhesion | 200° C. × 1 min | ○○ | ○○ | ○○ | ○○ | ○○ | ○○ | ○○ |
| | | 180° C. × 1 min | ○○ | ○○ | ○○ | ○○ | ○○ | ○ | ○ |
| | [Evaluation 5-2] Adhesion following humidity and heat resistance test | 200° C. × 1 min | ○ | ○ | ○○ | ○○ | ○ | Δ | ○ |
| | | 180° C. × 1 min | Δ | Δ | ○○ | ○○ | Δ | Δ | Δ |

TABLE 6-continued

| | Adhesive composition | | Example 5-8 S5-8a | Example 5-8 S5-9a | Example 5-10 S5-10a | Example 5-11 S5-11a | Example 5-12 S5-12a | Example 5-13 S5-13a | Comparative Example 5-1 S5-1b |
|---|---|---|---|---|---|---|---|---|---|
| Composition | Binder resin component | Polycarbonate resin 1 amount [parts] | 7 | 7 | 7 | 7 | 7 | 7 | 7 |
| | Crosslinking agent component | Type | BL5-8a | BL5-9a | BL5-10a | BL5-11a | BL5-12a | BL5-13a | BL5-1b |
| | | Amount [parts] | 3 | 3 | 3 | 3 | 3 | 3 | 3 |
| | Water | Amount [parts] | 85 | 85 | 85 | 85 | 85 | 85 | 85 |
| | Diethylene glycol dimethyl ether | Amount [parts] | 5 | 5 | 5 | 5 | 5 | 5 | 5 |
| Evaluations | [Evaluation 5-1] | 200° C. × 1 min | ○○ | ○○ | ○○ | ○○ | ○○ | ○○ | Δ |
| | Initial adhesion | 180° C. × 1 min | ○○ | ○○ | ○○ | ○○ | ○○ | ○○ | Δ |
| | [Evaluation 5-2] Adhesion | 200° C. × 1 min | ○ | ○ | ○ | ○ | ○ | ○ | × |
| | following humidity and heat resistance test | 180° C. × 1 min | ○ | Δ | Δ | Δ | ○ | ○ | × |

Table 6 reveals that the easy adhesion treated layers obtained by applying the adhesive compositions S5-1a to S5-13a containing a blocked polyisocyanate composition using the compound (I) described above as a blocking agent (Examples 5-1 to 5-13) exhibited both favorable initial adhesion and favorable adhesion following a humidity and heat resistance test, even in those cases where a heat treatment was performed for one minute at a temperature of either 180° C. or 200° C.

Further, in the adhesive compositions S5-1a to S5-7a containing blocked polyisocyanate compositions obtained using different types of blocking agents, the easy adhesion treated layers obtained by applying the adhesive compositions S5-1a to S5-5a containing a blocked polyisocyanate composition that used a single blocking agent B5-1 to B5-5 respectively, exhibited particularly favorable initial adhesion, even in the case of the heat treatment at 200° C. for one minute, compared with the easy adhesion treated layers obtained by applying the adhesive composition S5-6a containing a blocked polyisocyanate composition that used the blocking agent B5-6 and the adhesive composition S5-7a containing a blocked polyisocyanate composition that used a combination of the blocking agents B5-1 and B5-8.

Furthermore, in the adhesive compositions S5-1a to S5-6a containing blocked polyisocyanate compositions obtained using different types of blocking agents, the easy adhesion treated layers obtained by applying the adhesive compositions S5-3a and S5-4a containing a blocked polyisocyanate composition that used the blocking agent B5-3 to B5-4 respectively exhibited particularly favorable adhesion following the humidity and heat resistance test, even in those cases where a heat treatment was performed for one minute at a temperature of either 180° C. or 200° C., compared with the easy adhesion treated layers obtained by applying the adhesive compositions S5-1a, S5-2a, S5-5a and S5-6a containing a blocked polyisocyanate composition that used a different blocking agent.

In contrast, the easy adhesion treated layer obtained by applying the adhesive composition S5-1b containing a blocked polyisocyanate composition that did not use the compound (I) described above as a blocking agent exhibited both inferior initial adhesion and inferior adhesion following the humidity and heat resistance test, even in those cases where a heat treatment was performed for one minute at a temperature of either 180° C. or 200° C.

Examples 6-1 to 6-13, and Comparative Examples 6-1 and 6-2

<Test Items>

The blocked polyisocyanate compositions produced in the examples and comparative examples, the water-based coating material compositions containing those blocked polyisocyanate compositions, and the test plates prepared by coating substrates with coating films obtained from the water-based coating material compositions were each subjected to measurement and evaluation of various physical properties in accordance with the methods described below.

[Physical Property 6-1] Isocyanate Group (NCO) Content of Polyisocyanate

First, 1 to 3 g of the polyisocyanate was weighed accurately into a conical flask (W g). Next, 20 mL of toluene was added, and the polyisocyanate was dissolved. Subsequently, 10 mL of a 2N toluene solution of di-n-butylamine was added, and following mixing, the mixture was left to stand for 15 minutes at room temperature. Next, 70 mL of isopropyl alcohol was added and mixed. The resulting liquid was then titrated with a 1N hydrochloric acid solution (factor F) using an indicator. The thus obtained titer was deemed V2 mL. Subsequently, the same operation was repeated without the polyisocyanate, and the obtained titer was deemed V1 mL. The formula (1) shown below was then used to calculate the isocyanate group (NCO) content of the polyisocyanate.

$$\text{NCO content [\% by mass]} = (V1-V2) \times F \times 42/(W \times 1000) \times 100 \tag{1}$$

[Physical Property 6-2] Number Average Molecular Weight (Mn) of Polyisocyanate

Using the polyisocyanate as a sample, the number average molecular weight (Mn) of the polyisocyanate was determined as the polystyrene-equivalent number average molecular weight by performing measurement by gel permeation chromatography (GPC) using the apparatus and conditions described below.

(Measurement Conditions)

Apparatus: HLC-802A (manufactured by Tosoh Corporation)

Columns: 1×G1000HXL (manufactured by Tosoh Corporation), 1×G2000HXL (manufactured by Tosoh Corporation), and 1×G3000HXL (manufactured by Tosoh Corporation)

Carrier: tetrahydrofuran

Flow rate: 0.6 mL/minute

Sample concentration: 1.0% by mass

Injection volume: 20 μL
Temperature: 40° C.
Detection method: refractive index detector

[Physical Property 6-3] Average Isocyanate Number of Polyisocyanate

Using the polyisocyanate as a sample, the average isocyanate number was determined using formula (2) shown below.

Average isocyanate number=(number average molecular weight (Mn) of polyisocyanate×NCO content (% by mass)×0.01)/42    (2)

[Physical Property 6-4] Solid Fraction Amount of Blocked Polyisocyanate Composition The solid fraction amount of the blocked polyisocyanate composition was determined in the following manner.

First, an aluminum dish with a base diameter of 38 mm was weighed accurately. About 1 g of the blocked polyisocyanate composition produced in the example or comparative example was then weighed accurately onto the aluminum dish (W1).

Subsequently, the blocked polyisocyanate composition was adjusted to a uniform thickness. The blocked polyisocyanate composition mounted on the aluminum dish was then placed in a 105° C. oven for one hour. The aluminum dish was then returned to room temperature, and the blocked polyisocyanate composition remaining on the aluminum dish was weighed accurately (W2). The solid fraction amount (% by mass) of the blocked polyisocyanate composition was then calculated from formula (3) shown below.

Solid fraction amount of blocked polyisocyanate composition [% by mass]=$W2/W1$×100    (3)

[Physical Property 6-5] Effective Isocyanate Group (NCO) Content of Blocked Polyisocyanate Composition The effective isocyanate group (NCO) content of the blocked polyisocyanate composition was determined in the following manner.

Here, the expression "effective isocyanate group (NCO) content" is a quantification of the amount of blocked isocyanate groups capable of participating in crosslinking reactions that exist within the blocked polyisocyanate composition following the blocking reaction, and is expressed as a % by mass value of the isocyanate groups.

The effective NCO content was calculated using formula (4) shown below. In formula (4), the "NCO content of the polyisocyanate" and the "solid fraction amount of the blocked polyisocyanate composition" used the values calculated above for the physical property 6-1 and the physical property 6-4 respectively. In those cases where the sample was diluted with a solvent or the like, the effective NCO content value was calculated in the diluted state.

Effective NCO Content [% by mass]=[(solid fraction amount of blocked polyisocyanate composition [% by mass])×{(mass of polyisocyanate used in blocking reaction)×(NCO content of polyisocyanate [% by mass])}]/(mass of blocked polyisocyanate composition following blocking reaction)    (4)

[Physical Property 6-6] Amount of Isocyanurate Trimer Blocked with Three Molecules of Blocking Agent in Blocked Polyisocyanate Composition Using the blocked polyisocyanate composition as a sample, and using the same measurement method as that described for the number average molecular weight of the polyisocyanate determined above in "physical property 6-2", the blocked polyisocyanate composition was subjected to a GPC measurement. The obtained measurement results were then used to determine the ratio of the surface area for the isocyanurate trimer blocked with three molecules of the blocking agent relative to the surface area for the entire blocked polyisocyanate composition, and this ratio was deemed to represent the amount of the isocyanurate trimer blocked with three molecules of the blocking agent within the blocked polyisocyanate composition.

[Physical Property 6-7] a/(a+b+c+d+e+f)

Using a Biospin Avance 600 (product name) manufactured by Bruker Corporation, a $^{13}$C-NMR measurement was conducted under the conditions listed below, and the molar amounts of allophanate groups, isocyanurate groups, uretdione groups, iminooxadiazinedione groups, urethane groups and biuret groups in the blocked polyisocyanate composition were each determined.

(Measurement Conditions)

$^{13}$C-NMR apparatus: AVANCE 600 (manufactured by Bruker Corporation)

CryoProbe CPDUL 600S3-C/H-D-05Z (manufactured by Bruker Corporation)

Resonance frequency: 150 MHz

Concentration: 60 wt/vol %

Shift reference: $CDCl_3$ (77 ppm)

Accumulation number: 10,000

Pulse program: zgpg 30 (proton perfect decoupling method, waiting time: 2 sec)

Subsequently, based on the obtained measurement results, the following signal integral values were divided by the number of measured carbons, and the resulting values were used to determine the molar amount of each functional group.

Uretdione group: integral value near 157 ppm÷2

Iminooxadiazinedione group: integral value near 144 ppm÷1

Isocyanurate group: integral value near 148 ppm÷3

Allophanate group: integral value near 154 ppm÷1

Urethane group: integral value near 156.5 ppm÷1−allophanate group integral value Biuret group: integral value near 156 ppm÷2

Subsequently, the molar amounts determined for the allophanate groups, uretdione groups, iminooxadiazinedione groups, isocyanurate groups, urethane groups and biuret groups were labeled a, b, c, d, e and f respectively, and the ratio (a/a+b+c+d+e+f) of the molar amount of allophanate groups (a) relative to the total molar amount of allophanate groups, uretdione groups, iminooxadiazinedione groups, isocyanurate groups, urethane groups and biuret groups (a+b+c+d+e+f) was determined.

[Physical Property 6-8] Amount of Methane Tetracarbonyl Structures in Blocked Polyisocyanate Composition The amount of methane tetracarbonyl structures relative to the total molar amount within the blocked polyisocyanate composition of polyisocyanates having the compound (I) bonded thereto was calculated using the method described below.

Specifically, based on the results of an $^1$H-NMR measurement performed using an Avance 600 (product name) manufactured by Bruker BioSpin Corporation, the ratio of the molar amount of methane tetracarbonyl structures relative to the total molar amount of methane tetracarbonyl structures, the keto forms of methane tricarbonyl structures and the enol forms of methane tricarbonyl structures (methane tetracarbonyl structures/(methane tetracarbonyl structures+methane tricarbonyl structure keto forms+methane tricarbonyl structure enol forms)) was determined, and this ratio was deemed the amount of methane tetracarbonyl structures. The measurement conditions were as follows.

(Measurement Conditions)

Apparatus: Avance 600 (product name) manufactured by Bruker BioSpin Corporation

Solvent: deuterated chloroform

Accumulation number: 256

Sample concentration: 5.0% by mass

Chemical shift reference: tetramethylsilane was deemed 0 ppm

Further, the signal integral values described below were divided by the number of measured carbons, and the resulting values were used to determine the molar amounts of the various structures.

NH protons of methane tetracarbonyl structure represented by general formula (II) shown below: near 8.0 ppm, integral value÷2

[Chemical formula 26]

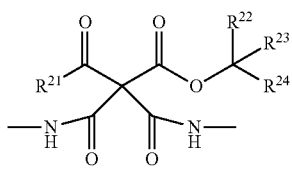

(II)

(In general formula (II), $R^{21}$, $R^{22}$, $R^{23}$ and $R^{24}$ are the same as $R^{11}$, $R^{12}$, $R^{13}$ and $R^{14}$ respectively described above.)

NH proton of keto form of methane tricarbonyl structure represented by general formula (III) shown below and enol form of methane tricarbonyl structure represented by general formula (IV) shown below: near 9.8 ppm, integral value÷1

[Chemical formula 27]

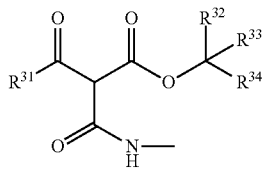

(III)

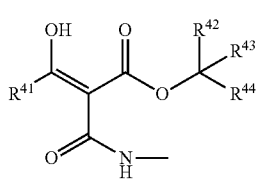

(IV)

(In general formula (III), $R^{31}$, $R^{32}$, $R^{33}$ and $R^{34}$ are the same as $R^{11}$, $R^{12}$, $R^{13}$ and $R^{14}$ respectively described above.

In general formula (IV), $R^{41}$, $R^{42}$, $R^{43}$ and $R^{44}$ are the same as $R^{11}$, $R^{12}$, $R^{13}$ and $R^{14}$ respectively described above.)

NH proton of enol form of methane tricarbonyl structure represented by general formula (V) shown below: near 7.3 ppm, integral value÷1

[Chemical formula 28]

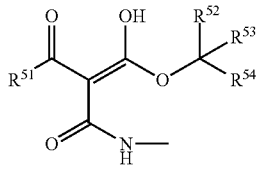

(V)

(In general formula (V), $R^{51}$, $R^{52}$, $R^{53}$ and $R^{51}$ are the same as $R^{11}$, $R^{12}$, $R^{13}$ and $R^{14}$ respectively described above.)

[Physical Property 6-9] Amount of Nonionic Hydrophilic Groups in Blocked Polyisocyanate Composition The ratio of the mass of the compound having a nonionic hydrophilic group that was used relative to the mass of the solid fraction amount of the blocked polyisocyanate composition was determined, and this ratio was deemed the amount of nonionic hydroxyl groups within the blocked polyisocyanate composition.

[Physical Property 6-10] Hydroxyl Value and Acid Value

The hydroxyl value and the acid value of the coating material were measured in accordance with JIS K1557. Specifically, measurements were conducted using the methods described below.

(1) Measurement of Hydroxyl Value

First, an appropriate amount of the sample was weighed into a conical flask (W g). Subsequently, 25 mL of an acetylation reagent was added dropwise to the flask to dissolve the sample. A condenser was fitted to the conical flask, the joint section was sealed with 1 or 2 drops of pyridine, and the mixture was refluxed for 30 minutes. Following refluxing, the conical flask was cooled, and the condenser and the joint section were rinsed with water, with the rinse water being added to the conical flask. The solution was then transferred to a beaker, and the inside of the conical flask was rinsed with water, with the rinse water being added to the beaker. This solution was then titrated with a 0.5 (c) mol/L solution of sodium hydroxide using an indicator. The obtained titer was deemed V2 mL. The same operation was then repeated without the sample, and the obtained titer was deemed V1 mL. The hydroxyl value was then calculated from formula (5) shown below.

$$\text{Hydroxyl value [mgKOH/g]} = ((V1-V2) \times c \times 56.1)/W \quad (5)$$

(2) Measurement of Acid Value

A sample of about 50 g was weighed accurately into a 300 mL beaker (W g). Subsequently, 125 mL of acetone was added to dissolve the sample. A potentiometric titration was performed using a 0.1 (c) mol/L solution of sodium hydroxide, and the inflection point (V1 mL) of the thus obtained titration curve was deemed the end point. The same operation was then repeated without the sample, and an inflection point (V2 mL) was determined. The acid value was then calculated from formula (6) shown below.

$$\text{Acid value [mgKOH/g]} = (5.61 \times (V1-V2) \times c)/W \quad (6)$$

[Evaluation 6-1] Smoothness

Each test plate was measured using a non-contact surface profiler NewView 600s manufactured by Zygo Corporation, using scanning white light interferometry under conditions including an observation field of view of 2.8×2.1 mm and an objective lens of 2.5 times. Based on the measurement results, the smoothness was evaluated against the following evaluation criteria (Evaluation Criteria)
◯: unevenness in perpendicular direction of less than 0.025 μm
×: unevenness in perpendicular direction of 0.025 μm or greater

[Evaluation 6-2] Clarity

Each test plate was scanned with a Wave Scan DOI (product name) manufactured by BYK-Gardner GmbH, and the Wa value was measured. Based on the measured Wa value, the clarity was evaluated against the following evaluation criteria.
(Evaluation Criteria)
◯: Wa value of less than 20
×: Wa value of 20 or greater

[Evaluation 6-3] Water-Resistant Adhesion (Initial)

Each test plate was immersed in 50° C. hot water for 240 hours, and following removal from the water and drying at 20° C. for 12 hours, the multilayer coating film of the test plate was cut into a lattice shape with a cutter to a depth that reached the base substrate, thus forming 100 grid squares with a size of 2 mm×2 mm. A cellophane tape was affixed to the surface, the cellophane tape was then peeled rapidly from the test plate at 20° C., and the number of grid squares of the coating film retained on the test plate was investigated. Based on the number of retained grid squares of the coating film, the water-resistant adhesion (initial) was evaluated against the following evaluation criteria.
(Evaluation Criteria)
◯: number of retained grid squares of the coating film was 100
Δ: number of retained grid squares of the coating film was at least 90 but not more than 99
×: number of retained grid squares of the coating film was 89 or fewer

[Evaluation 6-4] Water-Resistant Adhesion (After Storage)

Using each of the water-based coating material compositions that had been stored at 40° C. for one month, a series of test plates having multilayer coating films were produced. Each test plate was immersed in 50° C. hot water for 240 hours, and following removal from the water and drying at 20° C. for 12 hours, the multilayer coating film of the test plate was cut into a lattice shape with a cutter to a depth that reached the base substrate, thus forming 100 grid squares with a size of 2 mm×2 mm. A cellophane tape was affixed to the surface, the cellophane tape was then peeled rapidly from the test plate at 20° C., and the number of grid squares of the coating film retained on the test plate was investigated. Based on the number of retained grid squares of the coating film, the water-resistant adhesion (after storage) was evaluated against the following evaluation criteria.
(Evaluation Criteria)
◯: number of retained grid squares of the coating film was 100
Δ: number of retained grid squares of the coating film was at least 90 but not more than 99
×: number of retained grid squares of the coating film was 89 or fewer Synthesis of Polyisocyanates

[Synthesis Example 6-1] Production of Polyisocyanate P6-1

A four-neck flask fitted with a thermometer, a stirring blade and a reflux condenser was charged with 1.000 g of HDI and 33 g of trimethylolpropane under a stream of nitrogen, and the internal temperature of the flask was held at 70° C. while the contents were stirred. Tetramethylammonium hydroxide was then added to the flask, and when the yield reached 48%, phosphoric acid was added to halt the reaction. Following filtering of the reaction liquid, the unreacted HDI was removed using a thin-film distillation device, thus obtaining an isocyanurate polyisocyanate (hereafter sometimes referred to as the "polyisocyanate P6-1").

The NCO content of the obtained polyisocyanate P6-1 was 19.9% by mass, the number average molecular weight was 1,080, and the average isocyanate group number was 5.1.

[Synthesis Example 6-2] Production of Polyisocyanate P6-2

A four-neck flask fitted with a thermometer, a stirring blade and a reflux condenser was charged with 800 g of HDI, 200 g of IPDI and 75 g of trimethylolpropane under a stream of nitrogen, and the internal temperature of the flask was held at 70° C. while the contents were stirred. Tetramethylammonium hydroxide was then added to the flask, and when the yield reached 46%, phosphoric acid was added to halt the reaction. Following filtering of the reaction liquid, the unreacted HDI and IPDI were removed using a thin-film distillation device, thus obtaining an isocyanurate polyisocyanate (hereafter sometimes referred to as the "polyisocyanate P6-2").

The NCO content of the obtained polyisocyanate P6-2 was 18.5% by mass, the number average molecular weight was 1,200, and the average isocyanate group number was 5.3.

[Synthesis Example 6-3] Production of Polyisocyanate P6-3

A four-neck flask fitted with a thermometer, a stirring blade and a reflux condenser was charged with 1,000 g of HDI and 2 g of 2-ethylhexane-1,3-diol under a stream of nitrogen, and the internal temperature of the flask was held at 70° C. while the contents were stirred. Tetramethylammonium hydroxide was then added to the flask, and when the yield reached 40%, phosphoric acid was added to halt the reaction. Following filtering of the reaction liquid, the unreacted HDI was removed using a thin-film distillation device, thus obtaining an isocyanurate polyisocyanate (hereafter sometimes referred to as the "polyisocyanate P6-3").

The NCO content of the obtained polyisocyanate P6-3 was 21.8% by mass, the number average molecular weight was 655, and the average isocyanate group number was 3.4.

Synthesis of Raw Materials for Water-Based Coating Material Compositions

[Synthesis Example 6-4] Production of Hydroxyl Group-Containing Acrylic Resin (AC)

A reaction vessel fitted with a thermometer, a thermostat, a stirring device, a reflux condenser and a water separator was charged with 60 parts of ethylene glycol monobutyl ether and 15 parts of isobutyl alcohol, and the contents of the vessel were then heated to 110° C. under a stream of nitrogen. When the temperature of the contents reached 110° C., a mixture containing 10 parts of styrene, 48 parts of methyl methacrylate, 26 parts of n-butyl acrylate, 10 parts of 2-hydroxyethyl methacrylate, 6 parts of acrylic acid and 1 part of azobisisobutyronitrile was added dropwise to the reaction vessel over a period of 3 hours. Following completion of the addition, the reaction liquid was aged at 110° C. for 30 minutes, and a mixture containing 1 part of azobisisobutyronitrile and 15 parts of ethylene glycol monobutyl ether was then added dropwise to the reaction vessel over a period of one hour. Following aging of the reaction liquid at 110° C. for an additional one hour, the reaction liquid was cooled and neutralized with an equivalent amount of dimethylaminoethanol, and deionized water was then added to obtain a solution of a hydroxyl group-containing acrylic resin (AC). The solid fraction of the solution of the hydroxyl group-containing acrylic resin was 50%.

[Synthesis Example 6-5] Production of Water-Based Primer Coating Material

1. Production of Hydroxyl Group-Containing Polyester Resin (PE)

A reaction vessel fitted with a thermometer, a thermostat, a stirring device, a reflux condenser and a water separator was charged with 109 parts of trimethylolpropane, 141 parts of 1,6-hexanediol, 126 parts of 1,2-cyclohexane dicarboxylic anhydride and 120 parts of adipic acid. Subsequently, the temperature of the contents was raised from 160° C. to 230° C. over a period of 3 hours, and the contents were subjected to a condensation reaction at 230° C. for 4 hours while the produced water of condensation was removed by the water separator. In order to add carboxyl groups to the thus obtained condensation reaction product, 38.3 parts of trimellitic anhydride was added to the reaction vessel, and a reaction was conducted at 170° C. for 30 minutes. Subsequently, the contents were diluted with ethylene glycol monobutyl ether, thus obtaining a solution of a hydroxyl group-containing polyester resin (PE) with a solid fraction concentration of 70%. The hydroxyl group-containing polyester resin (PE) had an acid value of 46 mgKOH/g, a hydroxyl value of 150 mgKOH/g, and a number average molecular weight of 1.400.

2. Preparation of Pigment Dispersion

A mixing vessel was charged with 42.9 parts (solid fraction: 30 parts) of the solution of the hydroxyl group-containing polyester resin (PE) obtained above in "1.", 112 parts of JR-806 (product name, a rutile titanium dioxide, manufactured by TAYCA Corporation), 8 parts of Ketchen Black EC600J (product name, a conductive carbon, manufactured by Lion Corporation), and 137.1 parts of deionized water, and the contents were mixed. Subsequently, the pH of the contents was adjusted to 8.0 using 2-(dimethylamino) ethanol. The contents and glass beads having a diameter of about 1.3 mm ø as dispersion media were then placed in a wide-mouth glass container, and the wide-mouth glass container was sealed. The wide-mouth glass container was then shaken for 4 hours using a paint shaker, thus obtaining a pigment dispersion.

3. Production of Water-Based Primer Coating Material

A mixing vessel was charged with 30 parts (solid fraction: 15 parts) of the solution of the hydroxyl group-containing acrylic resin obtained in Synthesis Example 6-4, 50 parts (solid fraction: 15 parts) of TAKELAC WS5000 (product name, a polyurethane dispersion manufactured by Mitsui Takeda Chemicals, Inc., a silanol group-containing self-crosslinking dispersion, solid fraction: 30%), 133.3 parts (solid fraction: 40 parts) of SUPERCHLON E-403 (product name, manufactured by Nippon Paper Industries Co., Ltd., a water dispersion of a chlorinated polypropylene, chlorine content of resin: 15%, solid fraction: 30%), and 300 parts of the pigment dispersion obtained above in "2.", and the contents were mixed. Subsequently, ACRYSOL ASE-60 (product name, a polyacrylic-based thickener, manufactured by Rohm and Haas Co., Ltd.), 2-(dimethylamino)ethanol and deionized water were used to adjust the pH, the concentration and the viscosity of the mixed liquid, thus obtaining a water-based primer coating material having a pH of 8.0, a solid fraction concentration of 45%, and a viscosity of 40 seconds (Ford cup No. 4, 20° C.).

[Synthesis Example 6-6] Production of Water Dispersion of Acrylic-Modified Polyester Resin A reaction vessel fitted with a thermometer, a thermostat, a stirrer, a heating device and a fractionating column was charged with 92.4 parts of hexahbydrophthalic anhydride, 52.6 parts of adipic acid, 82.6 parts of 1,6-hexanediol, 10.5 parts of neopentyl glycol, 32 parts of 2-butyl-2-ethyl-1,3-propanediol, 1.96 parts of maleic anhydride, and 0.12 parts of dibutyltin oxide, and the reaction vessel was heated to 160° C. with the contents undergoing constant stirring. Subsequently, the temperature of the contents was gradually raised from 160° C. to 240° C. over a period of 4 hours, and the produced water of condensation was removed by distillation through the fractionating column. Following continuous reaction at 240° C. for 90 minutes, the fractionating column was replaced with a water separator, about 15 parts of toluene was added to the reaction vessel, and the water of condensation was removed by azeotropic distillation of the water and toluene. One hour after addition of the toluene, measurements of the acid value of the contents were started, and when the acid value of the contents fell to less than 3.5, heating was halted. Subsequently, toluene was removed from the reaction vessel by distillation under reduced pressure, the reaction vessel was cooled, and 58 parts of 2-butyl-2-ethyl-1,3-propanediol was then added to the reaction vessel. Following cooling of the reaction vessel to 130° C. a mixture containing 8.7 parts of styrene, 12.2 parts of acrylic acid, 22.7 parts of 2-ethylhexyl acrylate and 2.2 parts of tert-butylperoxy-2-ethylhexanoate was added dropwise to the reaction vessel over a period of two hours. The 130° C. temperature was maintained for 30 minutes, an additional 0.44 parts of tert-butylperoxy-2-ethylhexanoate was added as additional catalyst to the reaction vessel, and the reaction mixture was aged for one hour. The reaction vessel was then cooled to 85° C., the contents were neutralized with 14.6 parts of dimethylethanolamine, 468.7 parts of deionized water was added to the contents, and the contents were dispersed in the water to obtain a water dispersion of an acrylic-modified water-based polyester resin having a solid fraction of 35%. The thus obtained acrylic-modified water-based polyester resin had an acid value of 35 mgKOH/g, a hydroxyl value of 11 mgKOH/g, and a number average molecular weight of 13,000.

[Synthesis Example 6-7] Production of Water Dispersion of Acrylic-Based Polymer Microparticles 1. Preparation of Monomer Emulsion for Core Portion A monomer emulsion for a core portion was obtained by mixing 54 parts of deionized water, 3.1 parts of ADEKA REASOAP SR-1025, 1 part of allyl methacrylate, 10 parts of styrene, 35 parts of n-butyl acrylate, 10 parts of methyl methacrylate, 20 parts of ethyl acrylate, and 1 part of 2-hydroxyethyl methacrylate.

2. Preparation of Monomer Emulsion for Shell Portion

A monomer emulsion for a shell portion was obtained by mixing 50 parts of deionized water, 1.8 parts of ADEKA REASOAP SR-1025, 0.04 parts of a 6% aqueous solution of ammonium persulfate, 5.3 parts of 2-hydroxyethyl methacrylate, 2.6 parts of methacrylic acid, 8 parts of ethyl acrylate, and 7.1 parts of methyl methacrylate.

3. Production of Water Dispersion of Acrylic-Based Polymer Microparticles

A reaction vessel fitted with a thermometer, a thermostat, a stirring device, a reflux condenser, a nitrogen inlet tube, and a dropping funnel was charged with 120 parts of deionized water and 0.8 parts of ADEKA REASOAP SR-1025 (product name, manufactured by ADEKA Corporation, an emulsifying agent, active ingredient: 25%), and the reaction vessel was heated to 80° C. while the contents were stirred under a stream of nitrogen. Subsequently, 5% of the total mass of the monomer emulsion for a core portion obtained in "1." and 2.5 parts of a 6% aqueous solution of ammonium persulfate were added to the reaction vessel, and the temperature was held at 80° C. for 15 minutes. The remainder of the monomer emulsion for a core portion was then added dropwise to the reaction vessel over a period of 3 hours with the same temperature maintained, and following completion of the dropwise addition, the reaction mixture was aged for one hour. Next, the monomer emulsion for a shell portion obtained in "2." was added dropwise over a period of one hour, and following subsequent aging for an additional one hour, 3.8 parts of a 5% aqueous solution of 2-(dimethylamino)ethanol was added gradually to the reaction container while the container was cooled to 30° C., and the reaction mixture was then discharged and filtered through a 100-mesh nylon cloth, thus obtaining a water dispersion of acrylic-based polymer microparticles having an average particle size of 100 nm and a solid fraction of 30%. The thus obtained acrylic-based polymer microparticles had an acid value of 17.2 mgKOH/g and a hydroxyl value of 27.2 mgKOH/g.

[Synthesis Example 6-8] Production of Luminescent Pigment Dispersion (AL)

1. Preparation of Phosphate Group-Containing Polymerizable Unsaturated Monomer

A reaction vessel fitted with a thermometer, a thermostat, a stirrer, a reflux condenser, a nitrogen inlet tube, and a dropping funnel was charged with 57.5 parts of monobutylphosphoric acid and 41 parts of isobutanol, the temperature of the reaction vessel was then raised to 90° C., 42.5 parts of glycidyl methacrylate was added dropwise to the reaction vessel over a period of two hours, and the contents were then aged for one hour under constant stirring. Subsequently, 59 parts of isopropanol was added to the reaction vessel, thus obtaining a solution of a phosphate group-containing polymerizable unsaturated monomer with a solid fraction concentration of 50%. The thus obtained phosphate group-containing polymerizable unsaturated monomer had an acid value derived from the phosphate groups of 285 mgKOH/g.

2. Preparation of Solution of Phosphate Group-Containing Dispersion Resin

A reaction vessel fitted with a thermometer, a thermostat, a stirrer, a reflux condenser, a nitrogen inlet tube, and a dropping funnel was charged with a mixed solvent containing 27.5 parts of methoxypropanol and 27.5 parts of isobutanol, the reaction vessel was then heated to 110° C., and 121.5 parts of a mixture containing 25 parts of styrene, 27.5 parts of n-butyl methacrylate, 20 parts of isostearyl acrylate (product name, a branched higher alkyl acrylate, manufactured by Osaka Organic Chemical Industry Co., Ltd.), 7.5 parts of 4-hydroxybutyl acrylate, 15 parts of the phosphate group-containing polymerizable unsaturated monomer obtained in "1.", 12.5 parts of 2-methacryloyloxyethyl acid phosphate, 10 parts of isobutanol and 4 parts of tert-butylperoxy octanoate was then added to the reaction vessel over a period of 4 hours. Subsequently, a mixture containing 0.5 parts of tert-butylperoxy octanoate and 20 parts of isopropanol was added dropwise to the reaction vessel over a period of one hour. The contents were then aged for one hour under constant stirring, thus obtaining a solution of a phosphate group-containing dispersion resin with a solid fraction concentration of 50%. The thus obtained phosphate group-containing dispersion resin had an acid value of 83 mgKOH/g, a hydroxyl value of 29 mgKOH/g, and a weight average molecular weight of 10,000.

3. Production of Luminescent Pigment Dispersion (AL)

A mixing vessel was charged with 17.5 parts of an aluminum pigment paste GX-180A (product name, manufactured by Asahi Kasei Metals Ltd., metal content: 74%), 34.8 parts of 2-ethyl-1-hexanol, 10 parts (solid fraction: 5 parts) of the solution of the phosphate group-containing dispersion resin obtained in "2.", and 0.2 parts of 2-(dimethylamino)ethanol, and the contents were mixed uniformly to obtain a luminescent pigment dispersion (AL).

Production of Test Plates

[Example 6-1] Production of Test Plate S6-1a

1. Production of Blocked Polyisocyanate Composition BL6-1a

A four-neck flask fitted with a thermometer, a stirring blade and a reflux condenser was charged, under a stream of nitrogen, with 100 g of the polyisocyanate P6-1 obtained in Synthesis Example 6-1 and 33 g of a polyethylene oxide (product name: MPG-081, manufactured by Nippon Nyukazai Co., Ltd., number average molecular weight: 690) as a hydrophilic compound, and the mixture was stirred under heating at 120° C. for 4 hours. Subsequently, the reaction liquid was cooled to room temperature, 80 g of diisopropyl malonate and 142 g of dipropylene glycol dimethyl ether (DPDM) were added, 0.9 parts of a methanol solution containing sodium methylate (28% by mass) was then added at room temperature, and a blocking reaction was conducted at 40° C. for 4 hours, thus obtaining a blocked polyisocyanate composition BL6-1a. Various physical properties of the obtained blocked polyisocyanate composition BL6-1a were measured using the methods described above, and revealed a solid fraction amount of 60% by mass, an effective NCO content of 5.0% by mass, an amount of isocyanurate trimer of 12% by mass, a value for a/(a+b+c+d+e+f) of 0.28, an amount of methane tetracarbonyl structures of 3.1 mol %, and an amount of nonionic hydrophilic groups of 15.4% by mass.

2. Production of Water-Based Coating Material Composition T6-1a

A mixing vessel was charged with 50.0 parts (solid fraction: 40 parts) of the water dispersion of the acrylic-modified polyester resin obtained in Synthesis Example 6-4, 33.3 parts (solid fraction: 20 parts) of the solution of the blocked polyisocyanate composition BL6-1a obtained in "1.", 133.3 parts (solid fraction: 35 parts) of the water dispersion of the acrylic-based polymer microparticles obtained in Synthesis Example 6-7, 67.5 parts (resin solid fraction: 5 parts) of the luminescent pigment dispersion (AL) obtained in Synthesis Example 6-8, and 10 parts of 2-ethyl-1-hexanol, and the contents were uniformly mixed.

Subsequently, ACRYSOL ASE-60, 2-(dimethylamino)ethanol and deionized water were used to adjust the pH, the solid fraction concentration and the viscosity of the mixed liquid, thus obtaining a water-based coating material composition T6-1a having a pH of 8.0, a solid fraction concentration of 25%, and a viscosity of 40 seconds (Ford cup No. 4, 20° C.).

3. Production of Test Plate S6-1a

The primer coating liquid obtained in Synthesis Example 6-5 was applied by air spraying to a degreased polypropylene plate (PP plate) in an amount sufficient to generate a cured film thickness of 15 µm, thereby forming an uncured primer coating film on the PP plate. The PP plate having the uncured primer coating film was left to stand for 3 minutes, and was then preheated at 60° C. for 3 minutes. Subsequently, the water-based coating material composition T6-a1 was applied by air spraying to the PP plate having the uncured primer coating film in an amount sufficient to generate a cured film thickness of 15 µm, thereby forming an uncured basecoat coating film on top of the uncured primer coating film. The PP plate having the uncured basecoat coating film was left to stand for 5 minutes, and was then preheated at 60° C. for 5 minutes. Subsequently, a clear coating material "Soflex #520 Clear" (product name, manufactured by Kansai Paint Co., Ltd., a two-component acrylic urethane organic solvent-based clear coating material containing a polyisocyanate compound) was applied by air spraying to the PP plate having the uncured basecoat coating film in an amount sufficient to generate a cured film thickness of 35 µm, thereby forming an uncured clear coating film on top of the uncured basecoat coating film. The PP plate having the uncured clear coating film was left to stand for 7 minutes, and was then heated at 80° C. for 30 minutes, thereby simultaneously curing the primer coating film, the basecoat coating film and the clear coating film, and completing production of a test plate S6-1a. Using the obtained test plate S6-1a, various evaluations were conducted using the methods described above. The results are shown below in Table 7.

[Examples 6-2 to 6-13, and Comparative Example 6-1] Production of Multilayer Coating Film Laminates S6-2a to S6-13a and S6-1b 1. Production of Blocked Polyisocyanate Compositions BL6-2a to BL6-13a and BL6-1b With the exceptions of using the types and amounts of polyisocyanates, hydrophilic compounds and blocking agents and the amounts of solvent shown in Table 7, the same method as that described for Example 6-1 was used to produce blocked polyisocyanate compositions BL6-2a to BL6-13a and BL6-1b. Various physical properties of each of the blocked polyisocyanate compositions were measured using the methods described above. The results are shown below in Table 7.

2. Production of Water-Based Coating Material Compositions T6-2a to T6-13a and T6-1b Subsequently, with the exception of using each of the blocked polyisocyanate compositions BL6-2a to BL6-13a and BL6-1 b obtained in "1." instead of the blocked polyisocyanate composition BL6-1a, the same method as that described for Example 6-1 was used to produce water-based coating material compositions T6-2a to T6-13a and T6-1b.

3. Production of Test Plates S6-2a to S6-13a and S6-1b

Next, with the exception of using each of the water-based coating material compositions T6-2a to T6-13a and T6-1b obtained in "2." instead of the water-based coating material composition T6-1a, the same method as that described for Example 6-1 was used to produce test plates S6-2a to S6-13a and S6-1b. Using the thus obtained test plates S6-2a to S6-13a and S6-1b, various evaluations were conducted using the methods described above. The results are shown below in Table 7.

[Comparative Example 2] Production of Test Plate S6-2b

1. Production of Blocked Polyisocyanate Composition BL6-2b

A four-neck flask fitted with a thermometer, a stirring blade and a reflux condenser was charged, under a stream of nitrogen, with 100 g of the polyisocyanate P6-3 obtained in Synthesis Example 6-3 and 17 g of a polyethylene oxide (product name: MPG-130U, manufactured by Nippon Nyukazai Co., Ltd., number average molecular weight: 420) as a hydrophilic compound, and the mixture was stirred under heating at 120° C. for 4 hours. Subsequently, the reaction liquid was cooled to room temperature, 70 g of diisopropyl malonate and 34 g of DPDM were added, 0.9 parts of a methanol solution containing sodium methylate (28% by mass) was then added at room temperature, and a blocking reaction was conducted at 65° C. for 8 hours. Subsequently, 189 parts of 4-methyl-2-pentanol was added to the reaction liquid, and solvent was removed by distillation at 80° C. over a period of 3 hours, thus obtaining a blocked polyisocyanate composition BL6-2b. Various physical properties of the obtained blocked polyisocyanate composition BL6-2b were measured using the methods described above, and revealed a solid fraction amount of 60% by mass, an effective NCO content of 6.5% by mass, an amount of isocyanurate trimer of 47% by mass, a value for a/(a+b+c+d+e+f) of 0.10, an amount of methane tetracarbonyl structures of 13 mol %, and an amount of nonionic hydrophilic groups of 9.1% by mass.

2. Production of Water-Based Coating Material Composition T6-2b

Subsequently, with the exception of using the blocked polyisocyanate composition BL6-2b obtained in "1." instead of the blocked polyisocyanate composition BL6-1a, the same method as that described for Example 6-1 was used to produce a water-based coating material composition T6-2b.

3. Production of Test Plate S6-2b

Next, with the exception of using the water-based coating material composition T6-2b obtained in "2." instead of the water-based coating material composition T6-1a, the same method as that described for Example 6-1 was used to produce a test plate S6-2b. Using the thus obtained test plate S6-2b, various evaluations were conducted using the methods described above. The results are shown below in Table 7.

The types of hydrophilic compounds and blocking agents shown in Table 7 are as follows.

(Hydrophilic Compounds)

H6-1: a polyethylene oxide (product name: MPG-081, manufactured by Nippon Nyukazai Co., Ltd., number average molecular weight: 690)

H6-2: a polyethylene oxide (product name: MPG-130U, manufactured by Nippon Nyukazai Co., Ltd., number average molecular weight: 420)

H6-3: hydroxypivalic acid (HPA) (number average molecular weight: 119)

(Blocking Agents)

B6-1: diisopropyl malonate

B6-2: di-sec-butyl malonate

B6-3: di-tert-butyl malonate
B6-4: di-tert-pentyl malonate
B6-5: tert-butylethyl malonate B6-6: isopropylethyl malonate
B6-7: diethyl malonate
B6-8: isopropyl acetoacetate

TABLE 7

|  |  | Example 6-1 | Example 6-2 | Example 6-3 | Example 6-4 | Example 6-5 | Example 6-6 | Example 6-7 | Example 6-8 |
|---|---|---|---|---|---|---|---|---|---|
|  | Water-based coating material composition | T6-1a | T6-2a | T6-3a | T6-4a | T6-5a | T6-6a | T6-7a | T6-8a |
|  | Blocked polyisocyanate composition | BL6-1a | BL6-2a | BL6-3a | BL6-4a | BL6-5a | BL6-6a | BL6-7a | BL6-8a |
| Raw materials of blocked polyisocyanate composition | Polyisocyanate | P6-1 100 g | P6-1 100 g | P6-1 100 g | P6-1 100 g | P6-1 100 g | P6-1 100 g | P6-1 100 g | P6-2 100 g |
|  | Hydrophilic compound | H6-1 33 g | H6-1 33 g | H6-1 33 g | H6-1 33 g | H6-1 33 g | H6-1 33 g | H6-1 33 g | H6-1 30 g |
|  | Blocking agent | B6-1 80 g | B6-2 92 g | B6-3 92 g | B6-4 104 g | B6-5 74 g | B6-6 68 g | B6-1 71 g B6-8 14 g | B6-1 75 g |
|  | 4-methyl-2-pentanol Solvent: DPDM | 142 g | 150 g | 150 g | 158 g | 138 g | 134 g | 145 g | 137 g |
| Physical properties | [Physical property 6-4] Solid fraction amount [% by mass] | 60 | 60 | 60 | 60 | 60 | 60 | 60 | 60 |
|  | [Physical property 6-5] Effective NCO content [% by mass] | 5 | 4.8 | 4.8 | 4.5 | 5.2 | 5.3 | 4.9 | 4.9 |
|  | [Physical property 6-6] Amount of isocyanurate trimer [% by mass] | 12 | 13 | 12 | 13 | 13 | 13 | 14 | 11 |
|  | [Physical property 6-7] a/(a + b + c + d + e + f) | 0.28 | 0.27 | 0.28 | 0.29 | 0.28 | 0.28 | 0.26 | 0.31 |
|  | [Physical property 6-8] Amount of methane tetracarbonyl structures [mol %] | 3.1 | 1.9 | 3.5 | 3.1 | 3.3 | 3.5 | 2.8 | 3 |
|  | [Physical property 6-9] Amount of nonionic hydrophilic groups [% by mass] | 15.4 | 14.5 | 14.5 | 13.8 | 15.8 | 16.3 | 15 | 14.8 |
| Evaluations | [Evaluation 6-1] Smoothness | ○ | ○ | ○ | ○ | ○ | ○ | ○ | ○ |
|  | [Evaluation 6-2] Clarity | ○ | ○ | ○ | ○ | ○ | ○ | ○ | ○ |
|  | [Evaluation 6-3] Water-resistant adhesion (initial) | ○ | ○ | ○ | ○ | ○ | ○ | ○ | ○ |
|  | [Evaluation 1-4] Water-resistant adhesion (after storage) | ○ | ○ | ○ | ○ | ○ | ○ | ○ | ○ |

|  |  | Example 6-9 | Example 6-10 | Example 6-11 | Example 6-12 | Example 6-13 | Comparative Example 6-1 | Comparative Example 6-2 |
|---|---|---|---|---|---|---|---|---|
|  | Water-based coating material composition | T6-9a | T6-10a | T6-11a | T6-12a | T6-13a | T6-1b | T6-2b |
|  | Blocked polyisocyanate composition | BL6-9a | BL6-10a | BL6-11a | BL6-12a | BL6-13a | BL6-1b | BL6-2b |
| Raw materials of blocked polyisocyanate composition | Polyisocyanate | P6-3 100 g | P6-1 100 g | P6-1 100 g | P6-1 100 g | P6-1 100 g | P6-1 100 g | P6-3 100 g |
|  | Hydrophilic compound | H6-1 36 g | H6-2 20 g | H6-3 14 g | H6-2 10 g | H6-2 6 g | H6-1 33 g | H6-2 17 g |
|  | Blocking agent | B6-1 88 g | B6-1 80 g | B6-1 67 g | B6-1 85 g | B6-1 86 g | B6-7 68 g | B6-1 70 g |
|  | 4-methyl-2-pentanol Solvent: DPDM | 149 g | 133 g | 121 g | 130 g | 128 g | 134 g | 189 g 34 g |
| Physical properties | [Physical property 6-4] Solid fraction amount [% by mass] | 60 | 60 | 60 | 60 | 60 | 60 | 60 |
|  | [Physical property 6-5] Effective NCO content [% by mass] | 5.3 | 5.4 | 5.9 | 5.5 | 5.6 | 5.3 | 6.5 |
|  | [Physical property 6-6] Amount of isocyanurate trimer [% by mass] | 46 | 18 | 20 | 20 | 22 | 13 | 47 |
|  | [Physical property 6-7] a/(a + b + c + d + e + f) | 0.1 | 0.28 | 0.29 | 0.29 | 0.3 | 0.28 | 0.1 |
|  | [Physical property 6-8] Amount of methane tetracarbonyl structures [mol %] | 3.5 | 3 | 3.1 | 3.1 | 2.9 | — | 13 |
|  | [Physical property 6-9] Amount of nonionic hydrophilic groups [% by mass] | 16 | 9.9 | — | 5.1 | 3.1 | 16.3 | 9.1 |
| Evaluations | [Evaluation 6-1] Smoothness | ○ | ○ | ○ | ○ | ○ | × | ○ |
|  | [Evaluation 6-2] Clarity | ○ | ○ | ○ | ○ | ○ | × | ○ |
|  | [Evaluation 6-3] Water-resistant adhesion (initial) | ○ | ○ | ○ | ○ | ○ | Δ | Δ |
|  | [Evaluation 1-4] Water-resistant adhesion (after storage) | ○ | ○ | ○ | ○ | ○ | Δ | Δ |

Table 7 reveals that the test plates S6-1a to S6-13a that used the water-based coating material compositions containing blocked polyisocyanate compositions that used the compound (I) as the blocking agent and has an amount of methane tetracarbonyl structures of not more than 10 mol % (Examples 6-1 to 6-13) exhibited favorable results for all of the smoothness, the clarity, and the water-resistant adhesion, both initially and following storage.

In contrast, the test plate S6-1 b that used a water-based coating material composition containing a blocked polyisocyanate composition that used a blocking agent other than the compound (I) (Comparative Example 6-1) exhibited inferior results for each of the smoothness, the clarity, and the water-resistant adhesion, both initially and following storage. Further, the test plate S6-2b that used a water-based coating material composition containing a blocked polyisocyanate composition for which the amount of methane tetracarbonyl structures exceeded 10 mol % (Comparative Example 6-2) exhibited favorable results for the external appearance properties such as the smoothness and the clarity, but exhibited poor water-resistant adhesion, both initially and following storage.

INDUSTRIAL APPLICABILITY

The blocked polyisocyanate composition of an embodiment of the present invention can be used favorably as the curing agent for a coating material composition. A coating material composition of an embodiment of the present invention exhibits excellent viscosity stability, and superior low-temperature curability, hardness retention and water resistance when used as a coating film, and can therefore be used favorably for coating materials having low heat resistance.

An adhesive composition of an embodiment of the present invention can provide an adhesive composition having excellent initial adhesion to adherends and excellent adhesion following a humidity and heat resistance test. An easy adhesion treated laminate of an embodiment of the present invention contains an easy adhesion treated layer formed from the above adhesive composition, and exhibits excellent adhesion to adherends and excellent adhesion following a humidity and heat resistance test.

A multilayer coating film laminate of an embodiment of the present invention can be cured at low temperature, exhibits excellent coating film external appearance, adhesion and water resistance, and can be used favorably for exterior plate components for automobile bodies or automobile components or the like.

The invention claimed is:
1. A blocked polyisocyanate composition comprising a blocked polyisocyanate obtained from a polyisocyanate and at least one blocking agent, wherein
the blocking agent comprises a compound represented by general formula (I) shown below, and an amount of methane tetracarbonyl structures represented by general formula (II) shown below, relative to a total molar amount within the blocked polyisocyanate of bonded structures in which the compound represented by general formula (I) is bonded to the polyisocyanate, is at least 0.5 mol % but not more than 10 mol %:

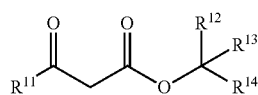
(I)

wherein in general formula (I), $R^{11}$ represents a hydroxyl group; an alkyl group which may contain at least one substituent selected from the group consisting of a hydroxyl group and an amino group; an amino group which may contain at least one substituent selected from the group consisting of a hydroxyl group and an alkyl group; an aryl group which may contain at least one substituent selected from the group consisting of a hydroxyl group and an amino group; or an alkoxy group which may contain at least one substituent selected from the group consisting of a hydroxyl group and an amino group, and in the amino group, two of the substituents may be linked together to form a ring, each of $R^{12}$, $R^{13}$ and $R^{14}$ independently represents a hydrogen atom; a hydroxyl group; an alkyl group which may contain at least one substituent selected from the group consisting of a hydroxyl group and an amino group; an amino group which may contain at least one substituent selected from the group consisting of a hydroxyl group and an alkyl group; an aryl group which may contain at least one substituent selected from the group consisting of a hydroxyl group and an amino group; or an alkoxy group which may contain at least one substituent selected from the group consisting of a hydroxyl group and an amino group, and in the amino group, two of the substituents may be linked together to form a ring, but structures in which two or more of $R^{12}$, $R^{13}$ and $R^{14}$ represent hydrogen atoms are excluded,

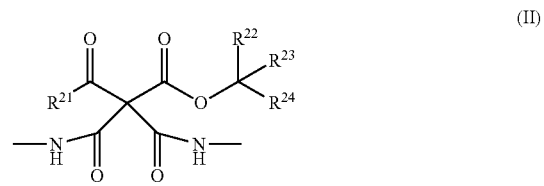
(II)

wherein in general formula (II), $R^{21}$ represents a hydroxyl group; an alkyl group which may contain at least one substituent selected from the group consisting of a hydroxyl group and an amino group; an amino group which may contain at least one substituent selected from the group consisting of a hydroxyl group and an alkyl group; an aryl group which may contain at least one substituent selected from the group consisting of a hydroxyl group and an amino group; or an alkoxy group which may contain at least one substituent selected from the group consisting of a hydroxyl group and an amino group, and in the amino group, two of the substituents may be linked together to form a ring, each of $R^{22}$, $R^{23}$ and $R^{24}$ independently represents a hydrogen atom; a hydroxyl group; an alkyl group which may contain at least one substituent selected from the group consisting of a hydroxyl group and an amino group; an amino group which may contain at least one substituent selected from the group consisting of a hydroxyl group and an alkyl group; an aryl group which may contain at least one substituent selected from the group consisting of a hydroxyl group and an amino group; or an alkoxy group which may contain at least one substituent selected from the group consisting of a hydroxyl group and an amino group, and in the amino group, two of the substituents may be linked together to form a ring, but structures in which two or more of $R^{22}$, $R^{23}$ and $R^{24}$ represent hydrogen atoms are excluded, wherein a portion of, or all of, the blocked polyisocyanate comprises a structural unit derived from a hydrophilic compound, the hydrophilic compound comprises at least one group selected from the group consisting of nonionic hydrophilic groups and anionic hydrophilic groups, and an amount of the nonionic hydrophilic group relative to a solid fraction mass of the blocked polyisocyanate composition is 5.1% by mass or less.

2. The blocked polyisocyanate composition according to claim 1, wherein an amount of methane tetracarbonyl structures represented by general formula (II) shown above, relative to a total molar amount within the blocked polyisocyanate of bonded structures in which the compound represented by the general formula (I) is bonded to the polyisocyanate, is at least 0.5 mol % but not more than 8 mol %.

3. The blocked polyisocyanate composition according to claim 1, wherein an amount of methane tetracarbonyl structures represented by general formula (II) shown above, relative to a total molar amount within the blocked polyisocyanate of bonded structures in which the compound represented by the general formula (I) is bonded to the polyisocyanate, may be at least 0.5 mol % but not more than 6 mol %.

4. The blocked polyisocyanate composition according to claim 1, wherein each of $R^{12}$, $R^{13}$ and $R^{14}$ independently represents a hydrogen atom; an alkyl group which may contain at least one substituent selected from the group consisting of a hydroxyl group and an amino group; or an aryl group which may contain at least one substituent selected from the group consisting of a hydroxyl group and an amino group; provided that structures in which two or more of $R^{12}$, $R^{13}$ and $R^{14}$ represent hydrogen atoms are excluded.

5. The blocked polyisocyanate composition according to claim 1, wherein $R^{11}$ represents an alkoxy group, $R^{12}$ represents a hydrogen atom or an alkyl group, and $R^{13}$ and $R^{14}$ represent alkyl groups.

6. The blocked polyisocyanate composition according to claim 1, wherein an amount of the compound represented by the general formula (I), relative to a total molar amount of the blocking agent, is at least 80 mol % but not more than 100 mol %.

7. The blocked polyisocyanate composition according to claim 1, wherein the blocked polyisocyanate comprises a blocked isocyanurate trimer, and an amount of the blocked isocyanurate trimer, relative to a solid fraction amount of the blocked polyisocyanate composition, is at least 10% by mass.

8. The blocked polyisocyanate composition according to claim 1, wherein the blocked polyisocyanate contains an allophanate group and at least one functional group selected from the group consisting of an uretdione group, an iminooxadiazinedione group, an isocyanurate group, a urethane group and a biuret group, and if molar amounts of allophanate groups, uretdione groups, iminooxadiazinedione groups, isocyanurate groups, urethane groups and biurets groups are labelled a, b, c, d, e and f respectively, then a value of a/(a+b+c+d+e+f) is 0.05 or greater.

9. The blocked polyisocyanate composition according to claim 1, further comprising an active hydrogen group-containing compound.

10. The blocked polyisocyanate composition according to claim 9, wherein the active hydrogen group-containing compound comprises a monoalcohol.

11. The blocked polyisocyanate composition according to claim 10, wherein the monoalcohol is a secondary monoalcohol.

12. The blocked polyisocyanate composition according to claim 10, wherein the monoalcohol is 2-propanol or isobutyl alcohol.

13. The blocked polyisocyanate composition according to claim 9, wherein a molar amount of the active hydrogen group-containing compound, relative to a total molar amount of blocked isocyanate groups in the blocked polyisocyanate composition, is at least 10 mol % but not more than 1,000 mol %.

14. The blocked polyisocyanate composition according to claim 9, wherein a molar amount of the active hydrogen group-containing compound, relative to a total molar amount of blocked isocyanate groups in the blocked polyisocyanate composition, is at least 50 mol % but not more than 800 mol %.

15. The blocked polyisocyanate composition according to claim 1, wherein the polyisocyanate is a polyisocyanate obtained from at least one diisocyanate selected from the group consisting of aliphatic diisocyanates and alicyclic diisocyanates.

16. The blocked polyisocyanate composition according to claim 15, wherein the diisocyanate comprises hexamethylene diisocyanate.

17. The blocked polyisocyanate composition according to claim 1, wherein an average number of isocyanate groups in the polyisocyanate is at least 3.3.

18. A coating material composition comprising the blocked polyisocyanate composition according to claim 1, and a polyhydric hydroxy compound.

19. A coating film obtained by curing the coating material composition according to claim 18.

20. A method for forming a coating film, comprising curing the coating material composition according to claim 18 by heating at a temperature of 80° C. or lower.

21. An article comprising a resin substrate having a melting point of not more than 120° C., and a coating film obtained by curing the coating material composition according to claim 18 on top of the resin substrate.

22. An adhesive composition comprising the blocked polyisocyanate composition according to claim 1.

23. An easy adhesion treated laminate comprising an adherend, and an easy adhesion treated layer obtained by applying the adhesive composition according to claim 22 to the adherend.

24. The easy adhesion treated laminate according to claim 23, wherein the adherend is a film or a plate.

25. A multilayer coating film laminate obtained by laminating a plurality of coating films to a substrate, wherein among the plurality of coating films, at least one coating film is obtained by curing a water-based coating material composition comprising the blocked polyisocyanate composition according to claim 1.

26. A method for forming a coating film, comprising forming a coating film by applying a water-based coating material composition comprising the blocked polyisocyanate composition according to claim 1 to a substrate.

27. The blocked polyisocyanate composition according to claim 9, wherein an average number of isocyanate groups in the polyisocyanate is at least 3.3.

28. The blocked polyisocyanate composition according to claim 1, wherein a lower limit of the amount of the nonionic hydrophilic group relative to the solid fraction mass of the blocked polyisocyanate composition is 1% by mass.

\* \* \* \* \*